US008120490B2

(12) United States Patent  (10) Patent No.: US 8,120,490 B2
Takeda et al.  (45) Date of Patent: Feb. 21, 2012

(54) RFID TAG INFORMATION SYSTEM

(75) Inventors: Michihiro Takeda, Kiyosu (JP);
Tsuyoshi Ohashi, Hashima (JP)

(73) Assignee: Brother Kogyo Kabushiki Kaisha,
Nagoya-Shi, Aichi-Ken (JP)

( * ) Notice: Subject to any disclaimer, the term of this patent is extended or adjusted under 35 U.S.C. 154(b) by 500 days.

(21) Appl. No.: 12/454,465

(22) Filed: May 18, 2009

(65) Prior Publication Data

US 2009/0278663 A1 Nov. 12, 2009

Related U.S. Application Data

(63) Continuation-in-part of application No. PCT/JP2007/072858, filed on Nov. 27, 2007.

(30) Foreign Application Priority Data

Nov. 28, 2006 (JP) .................................. 2006-320606
Nov. 28, 2006 (JP) .................................. 2006-320607
Nov. 29, 2006 (JP) .................................. 2006-321384

(51) Int. Cl.
*G08B 13/14* (2006.01)
(52) U.S. Cl. .................. 340/572.4; 340/572.1; 340/10.3
(58) Field of Classification Search ............... 340/572.1, 340/572.4, 572.7, 572.8, 539.11, 10.1, 10.3; 235/381, 384, 385; 342/357.25, 357.48; 370/256, 328, 338; 714/11, 12, 13
See application file for complete search history.

(56) References Cited

U.S. PATENT DOCUMENTS

| 7,212,122 B2 * | 5/2007 | Gloekler et al. ........... 340/572.1 |
| 7,539,897 B2 * | 5/2009 | Mizutani ....................... 714/11 |
| 7,633,889 B2 * | 12/2009 | Higashitaniguchi et al. . 370/256 |
| 7,899,006 B2 * | 3/2011 | Boyd ............................ 370/328 |
| 2007/0018792 A1 * | 1/2007 | Taki et al. .................... 340/10.1 |
| 2007/0096842 A1 * | 5/2007 | Hyun et al. .................... 333/1.1 |
| 2007/0262864 A1 | 11/2007 | Yasui et al. |

FOREIGN PATENT DOCUMENTS

| JP | 2001148637 |  | 5/2001 |
| JP | 2002353716 |  | 12/2002 |
| JP | 2003098912 | A | 4/2003 |
| JP | 2004082432 |  | 3/2004 |
| JP | 2005186567 |  | 7/2005 |
| JP | 2005298100 |  | 10/2005 |
| JP | 2006025172 | A | 1/2006 |
| JP | 2006203944 | A | 3/2006 |
| JP | 2006099443 | A | 4/2006 |
| JP | 2006178713 | A | 7/2006 |

OTHER PUBLICATIONS

Communication from foreign Patent Office (JP).

* cited by examiner

*Primary Examiner* — Van T. Trieu
(74) *Attorney, Agent, or Firm* — Day Pitney LLP

(57) ABSTRACT

An RFID tag information system comprises a transmission/reception antenna configured to carry out information transmission/reception via radio communication with a RFID circuit element. An access information processing device configured to carry out predetermined processing relating to information for access that accesses the RFID circuit element or access acquisition information. And a selection processing portion for select and process one transmission path among a plurality of transmission paths that transmit the information for access from the access information processing device or that transmit the access acquisition information to the access information processing device.

24 Claims, 54 Drawing Sheets

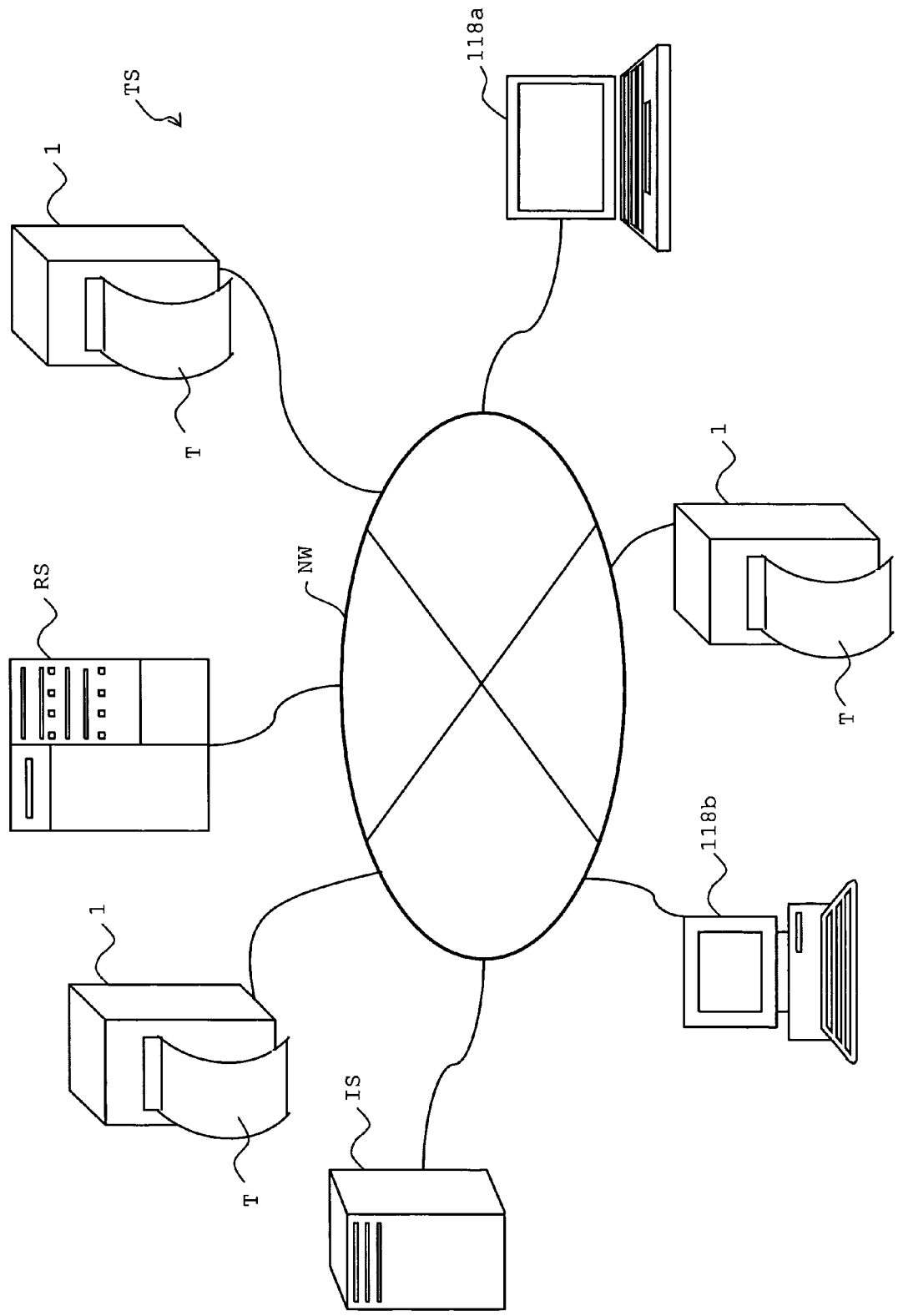
[FIG. 1]

[FIG. 2]
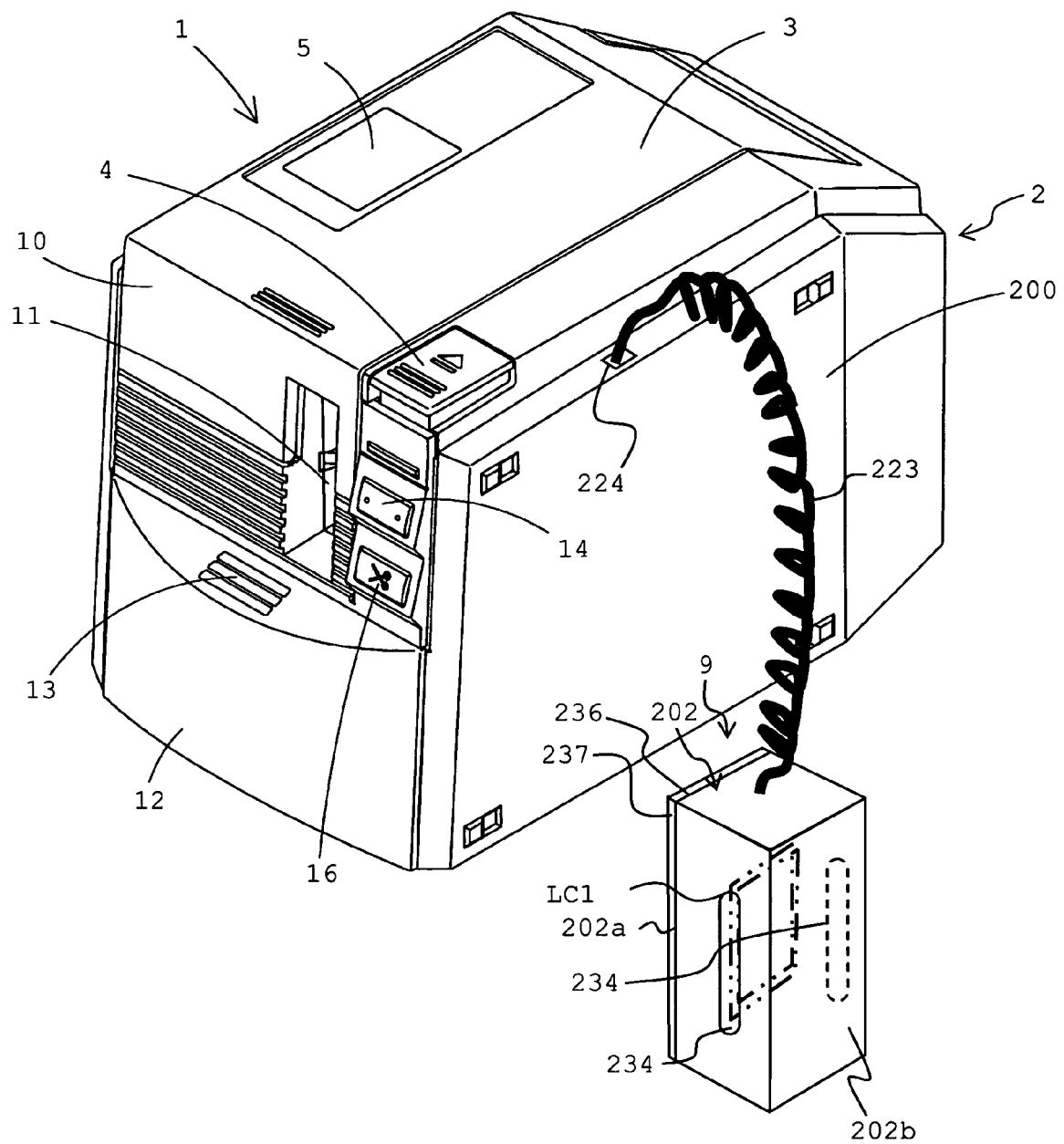

[FIG. 3]
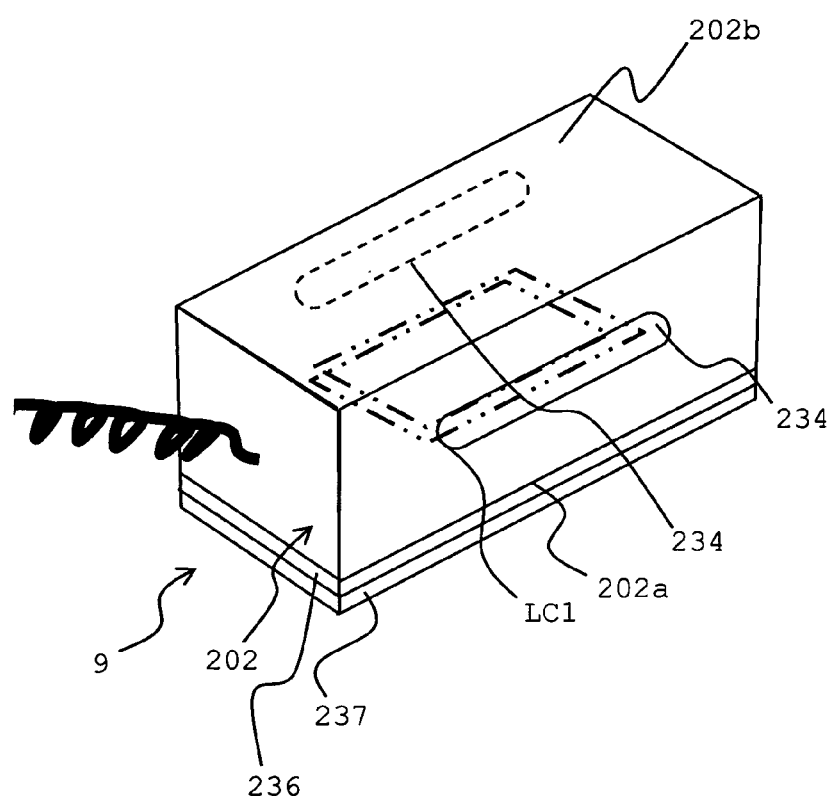

[FIG. 4]

[FIG. 5]
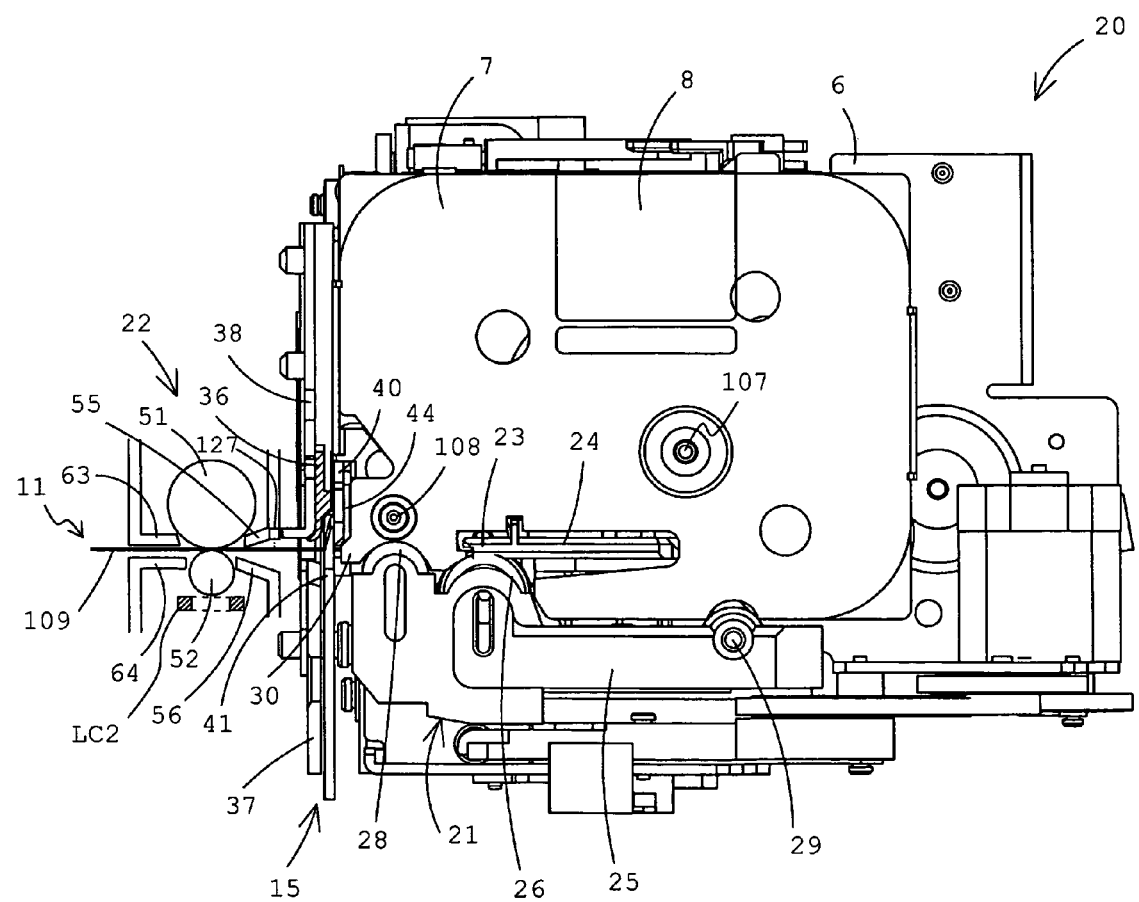

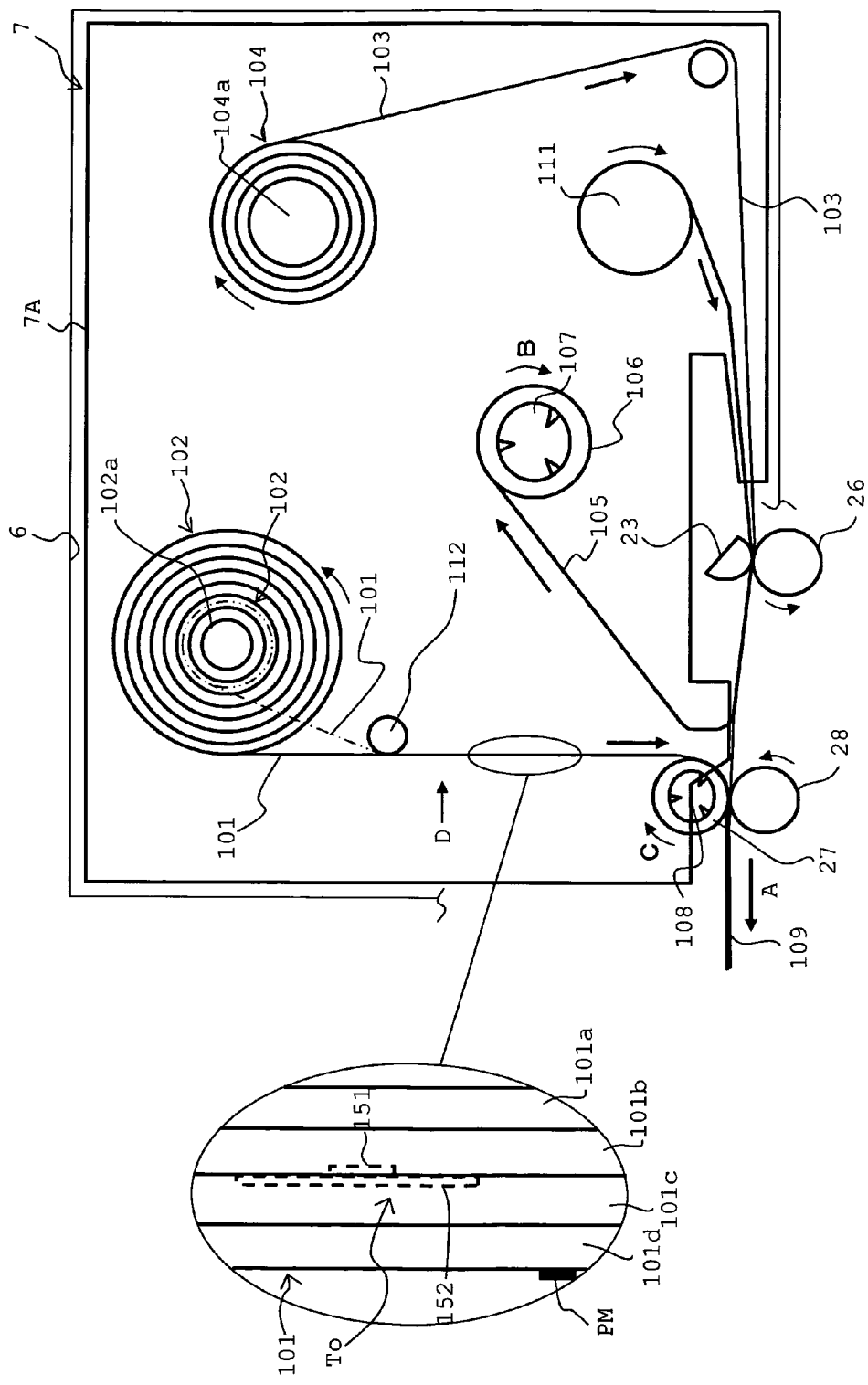
[FIG. 6]

[FIG. 7]
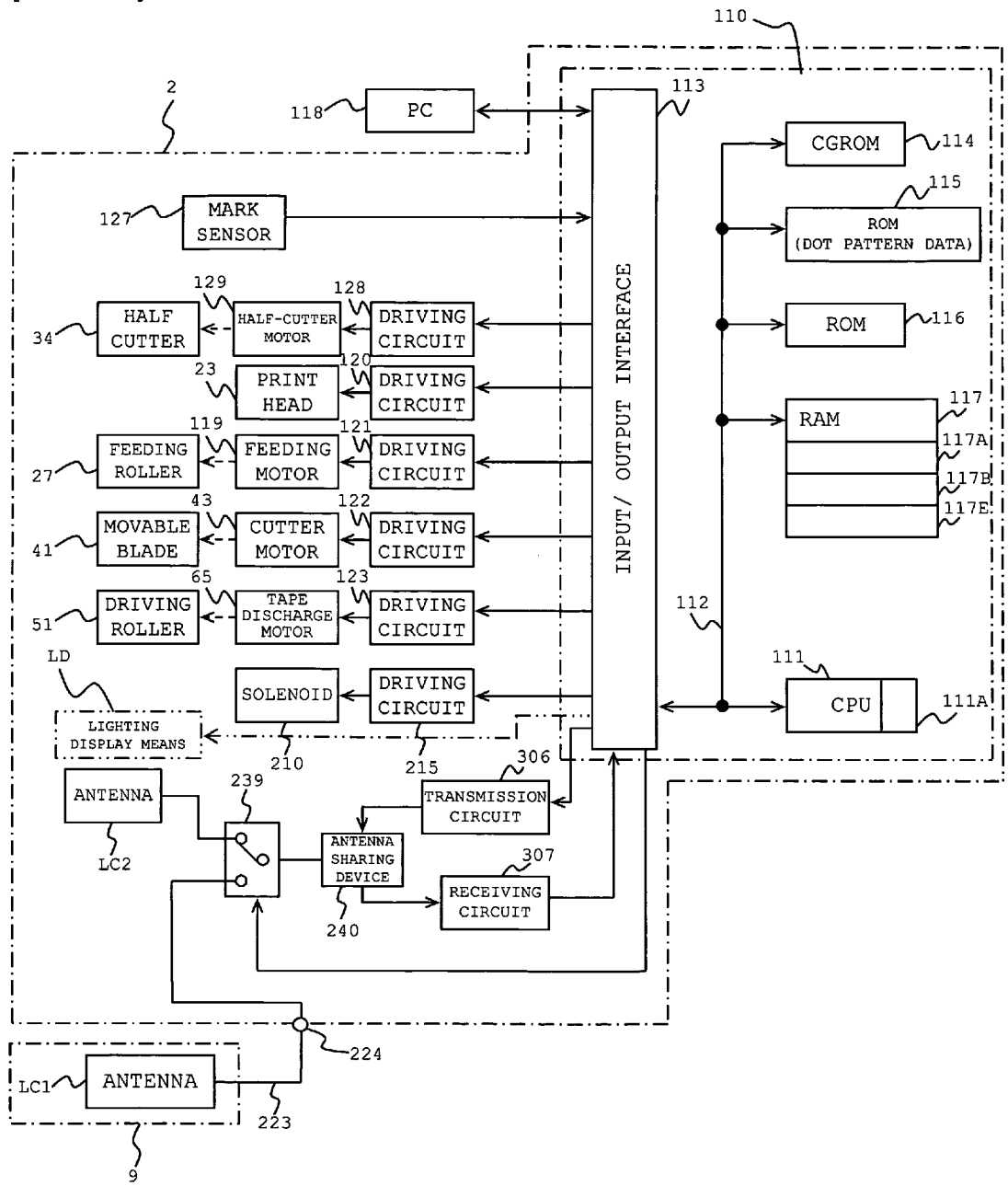

[FIG. 8]
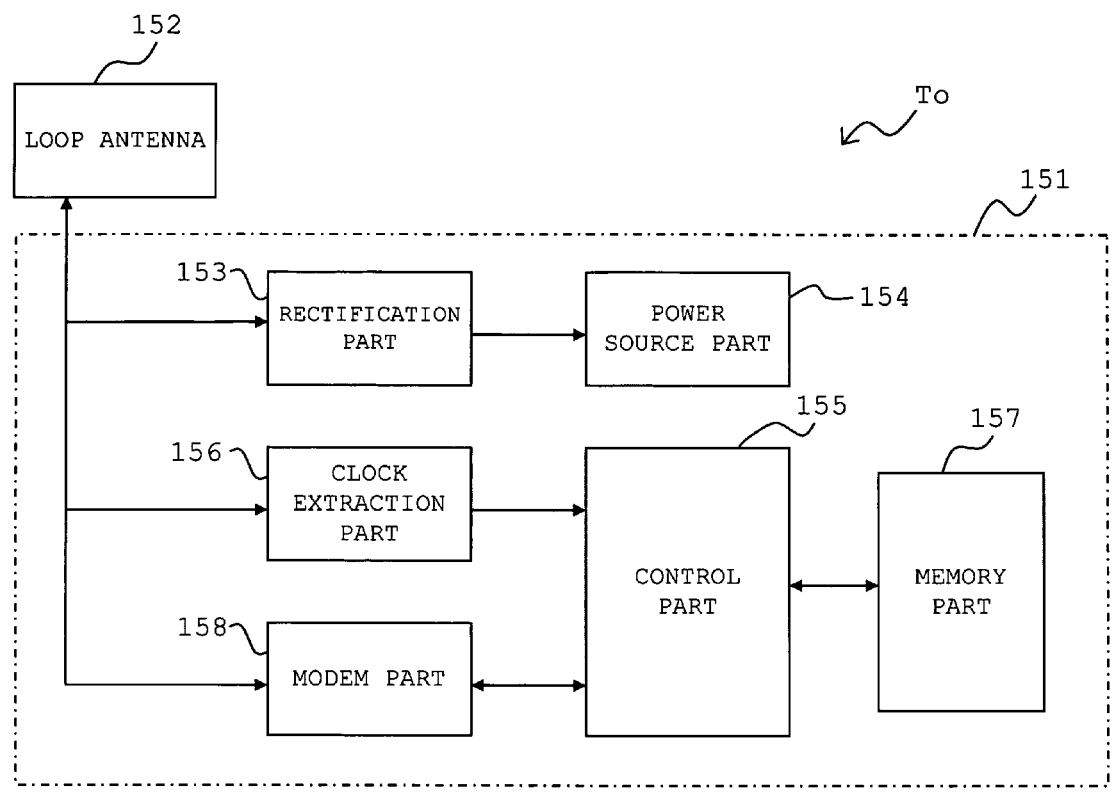

[FIG. 9A]
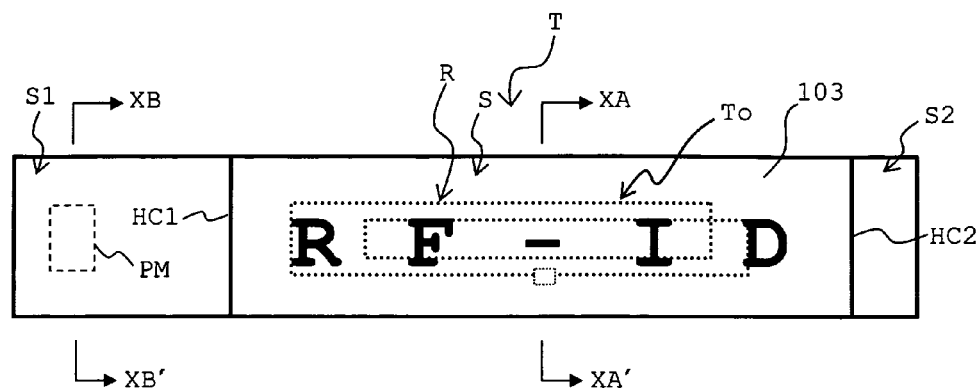
[FIG. 9B]
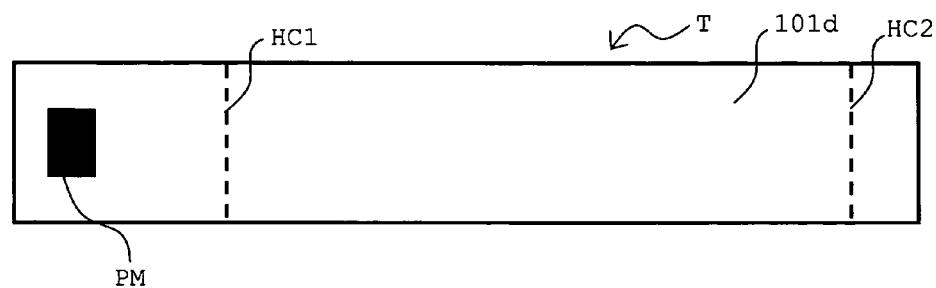

[FIG. 10A]
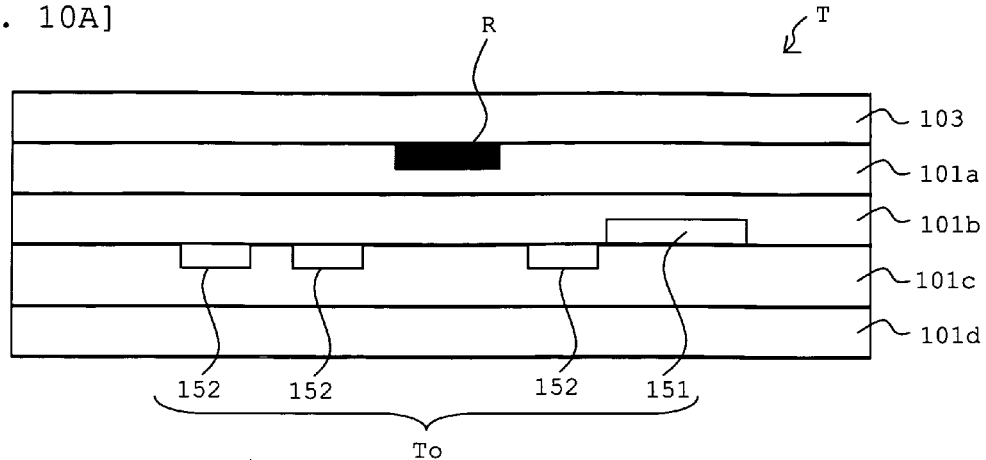
[FIG. 10B]
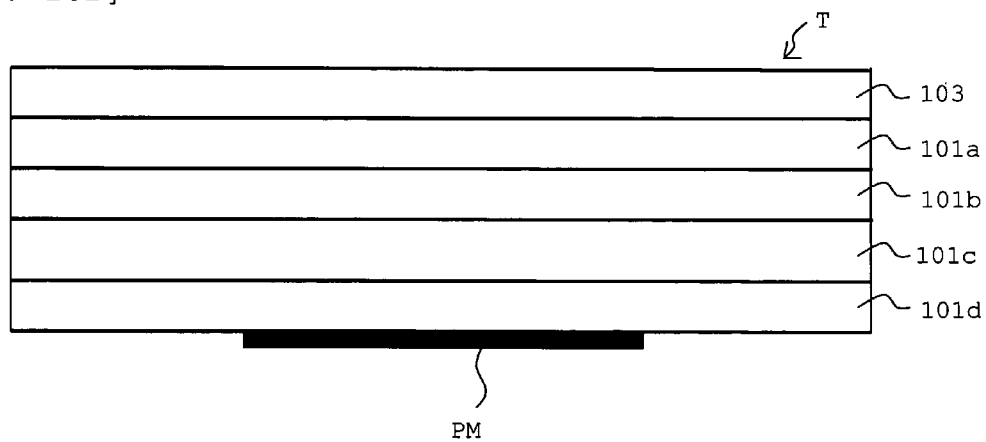
[FIG. 10C]
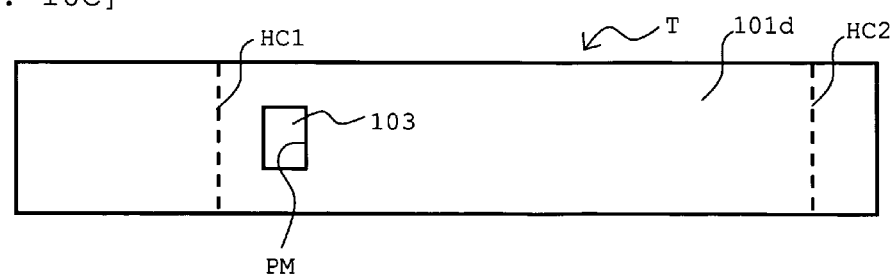

[FIG. 11]
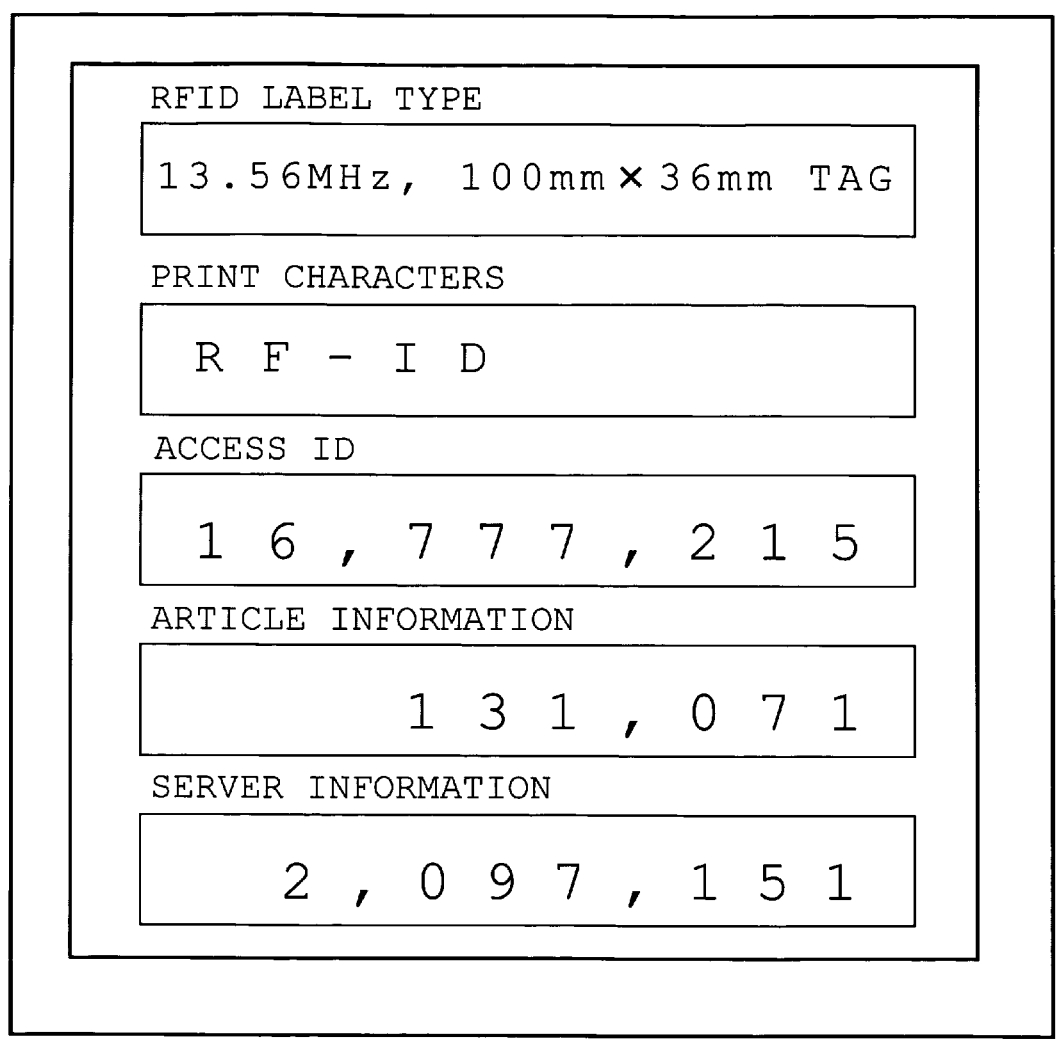

[FIG. 12]
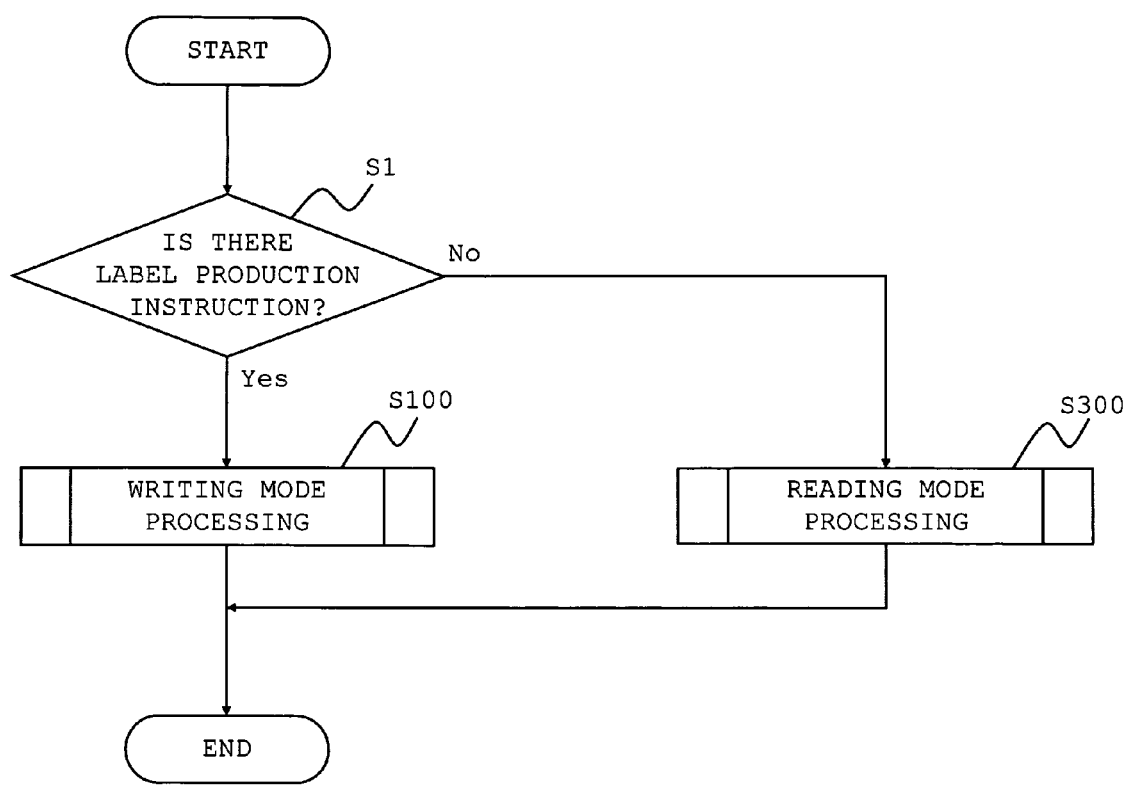

[FIG. 13]
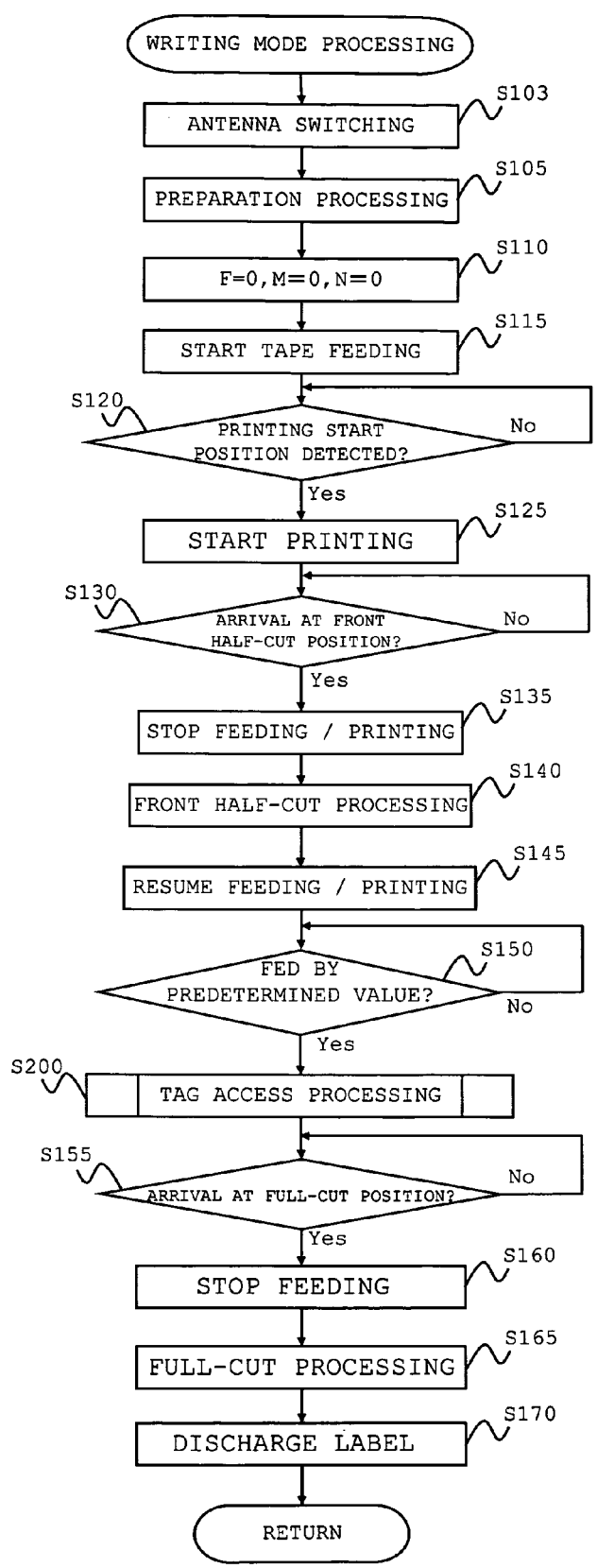

[FIG. 14]
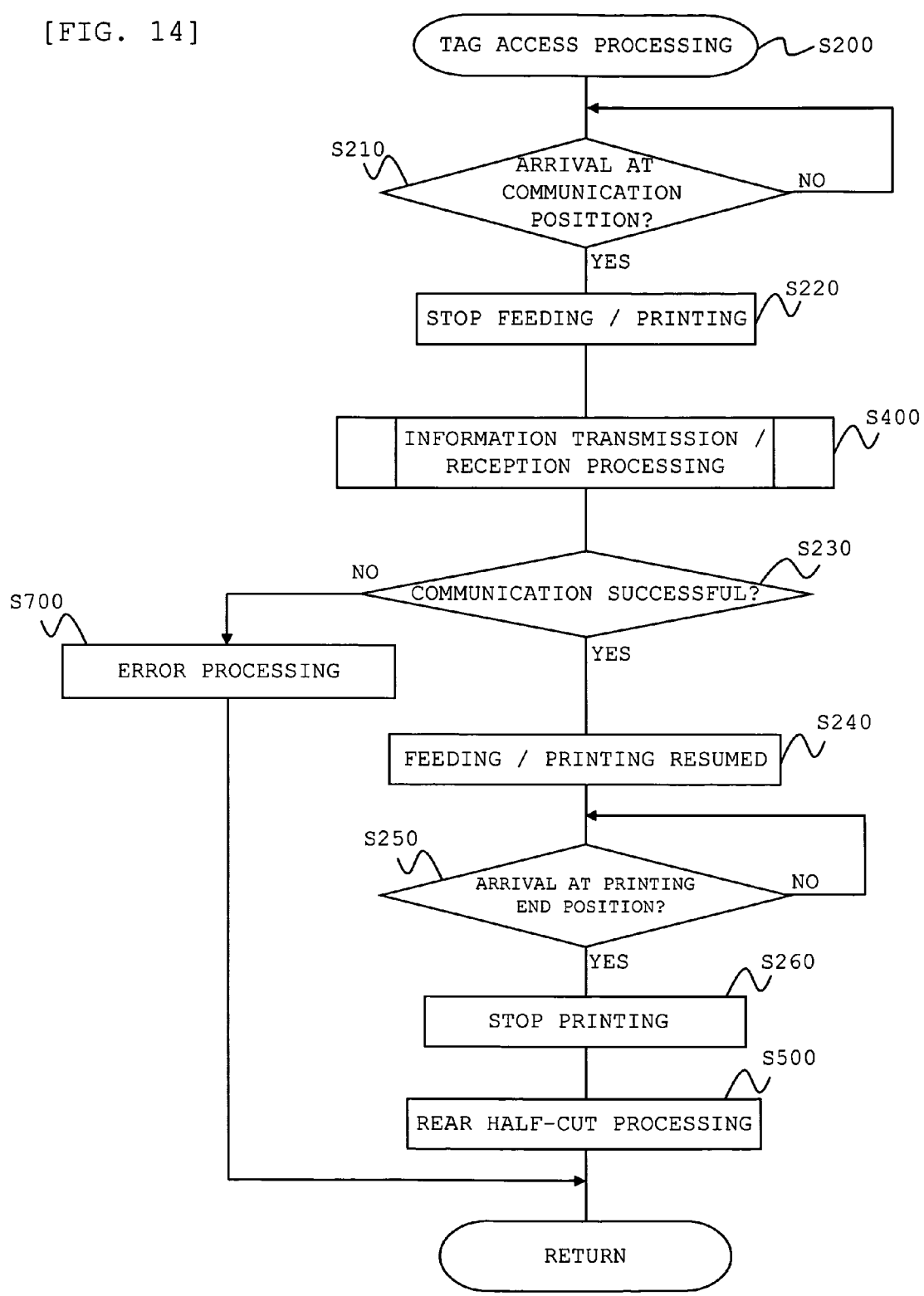

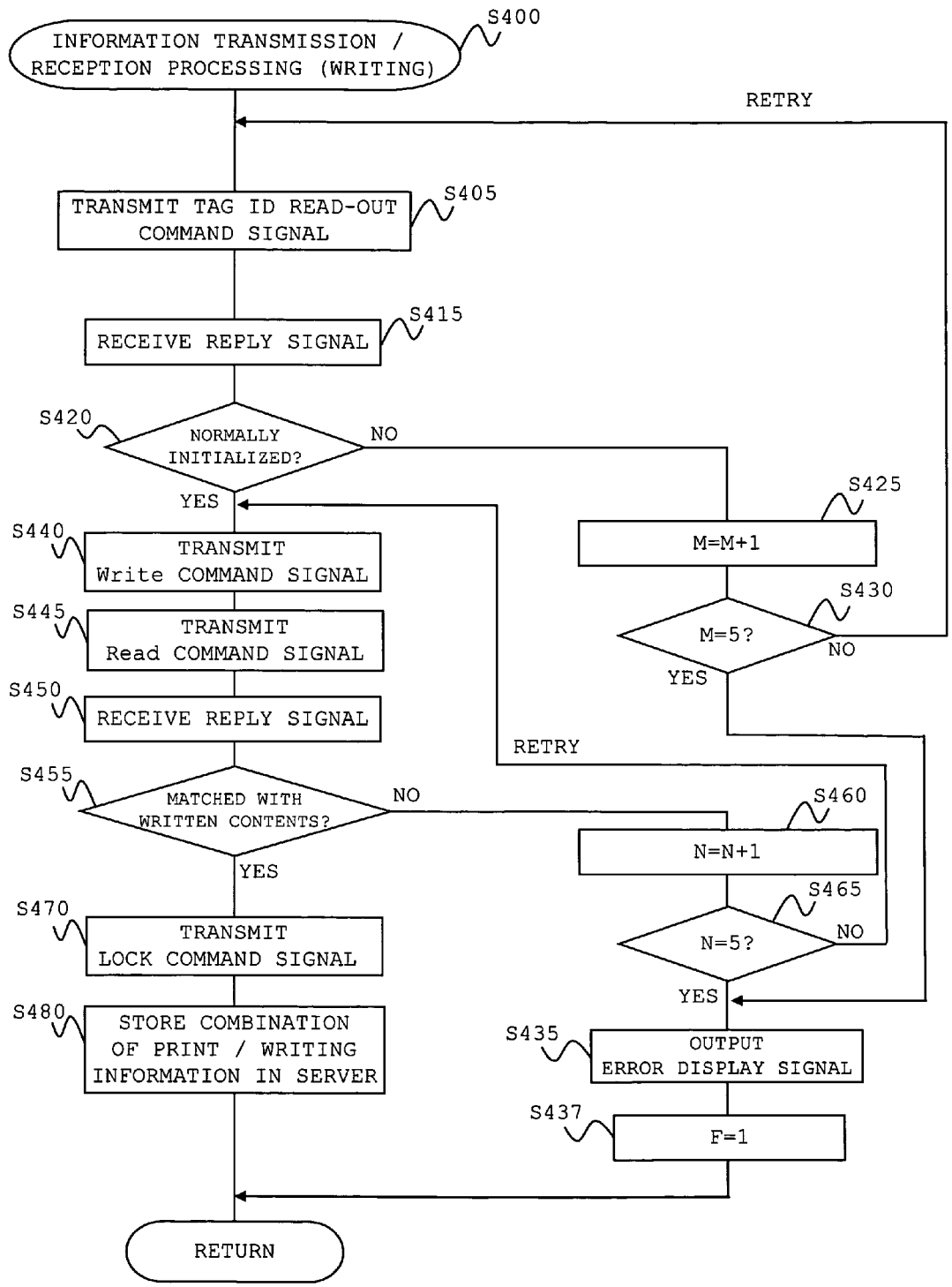
[FIG. 15]

[FIG. 16]
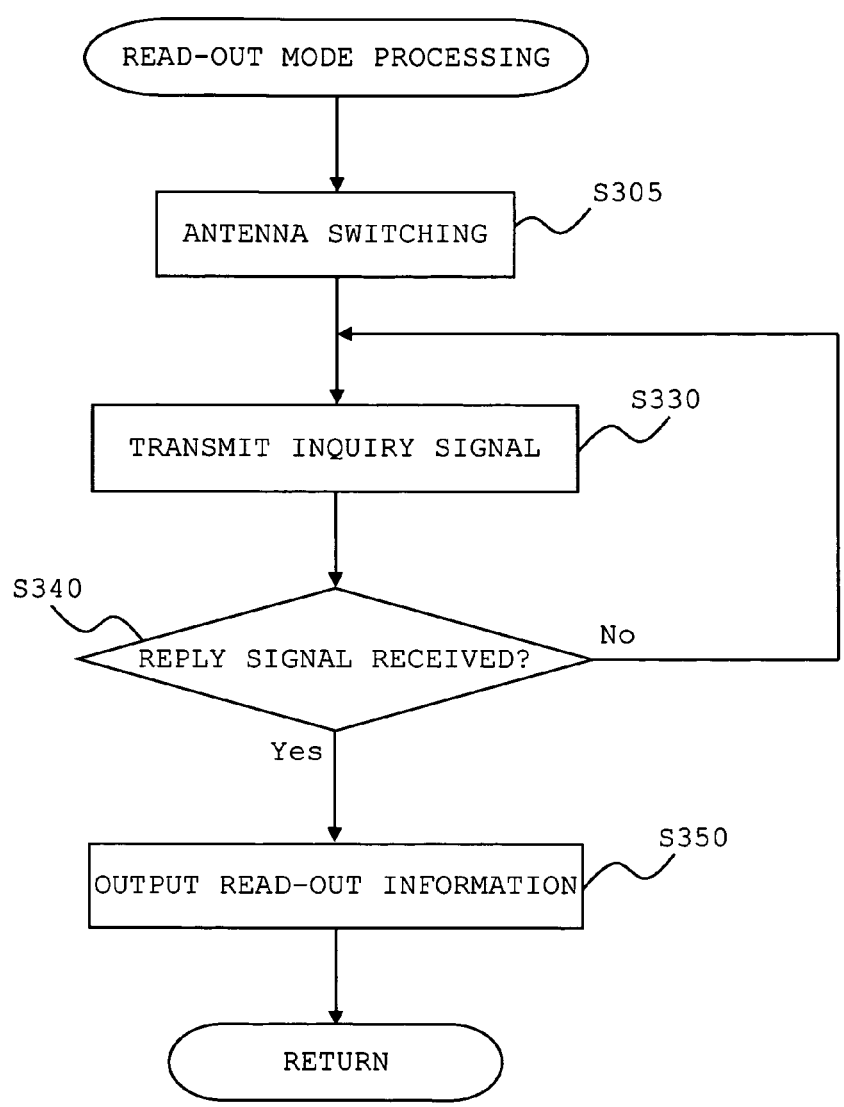

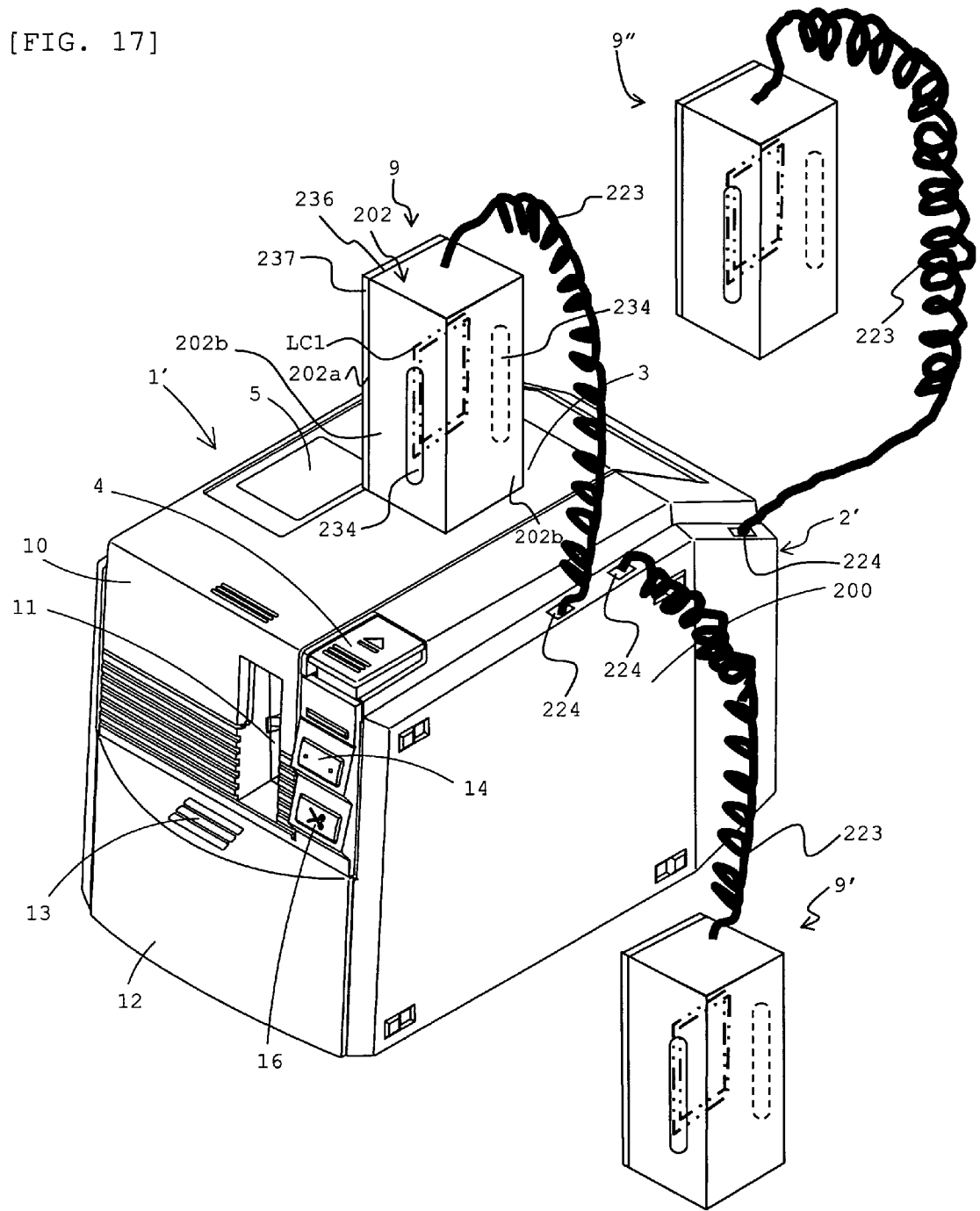
[FIG. 17]

[FIG. 18]
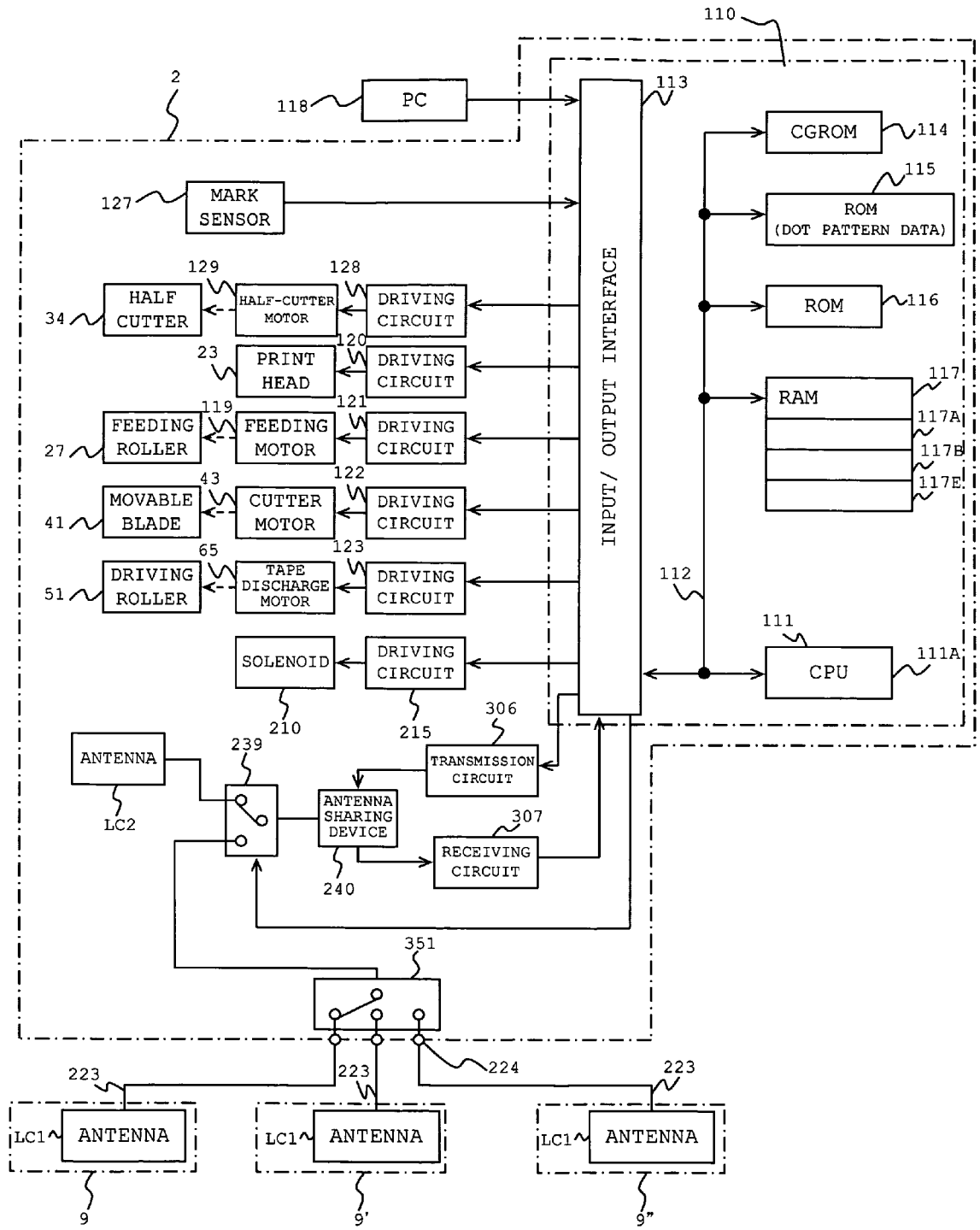

[FIG. 19]
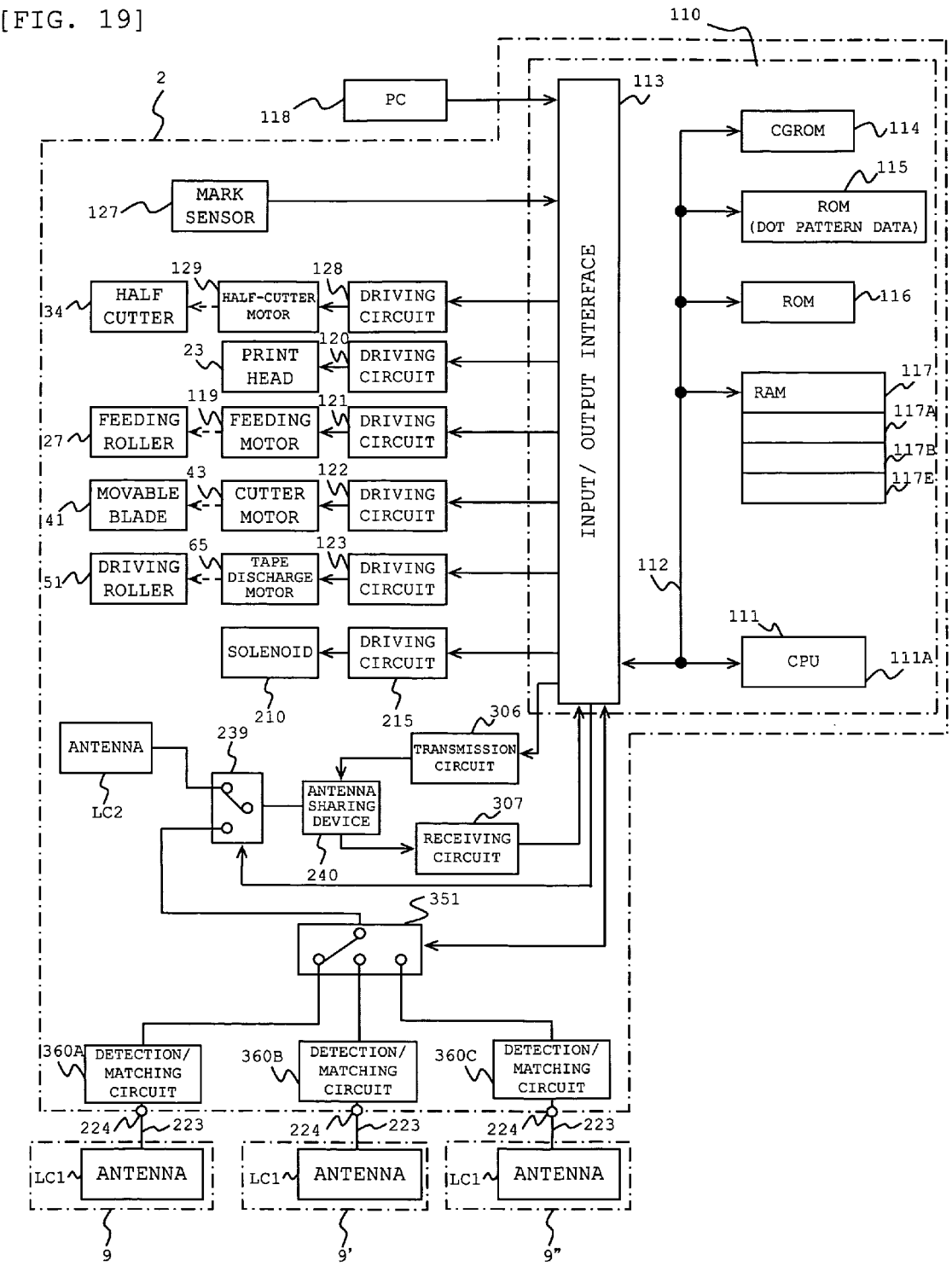

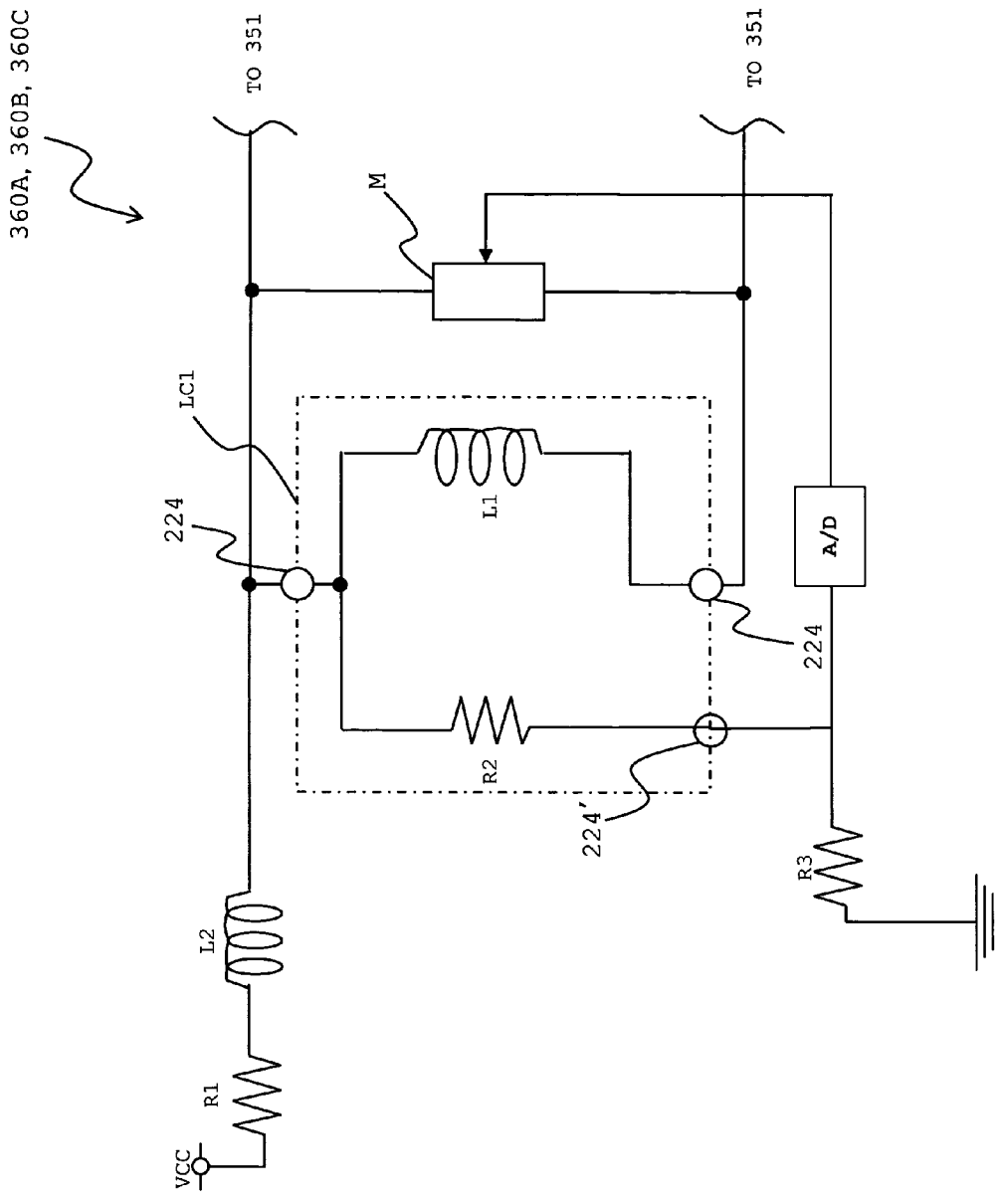
[FIG. 20]

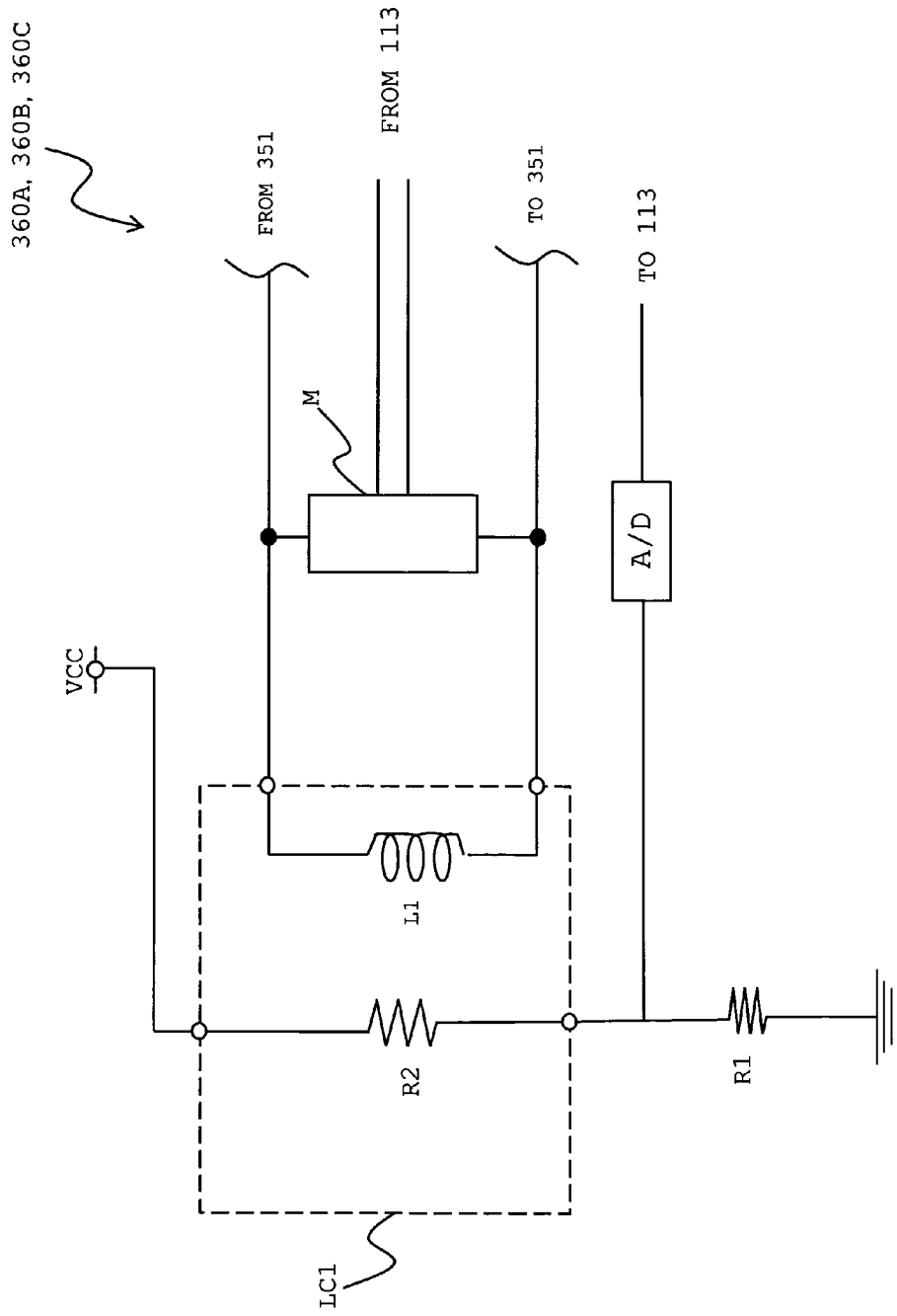
[FIG. 21]

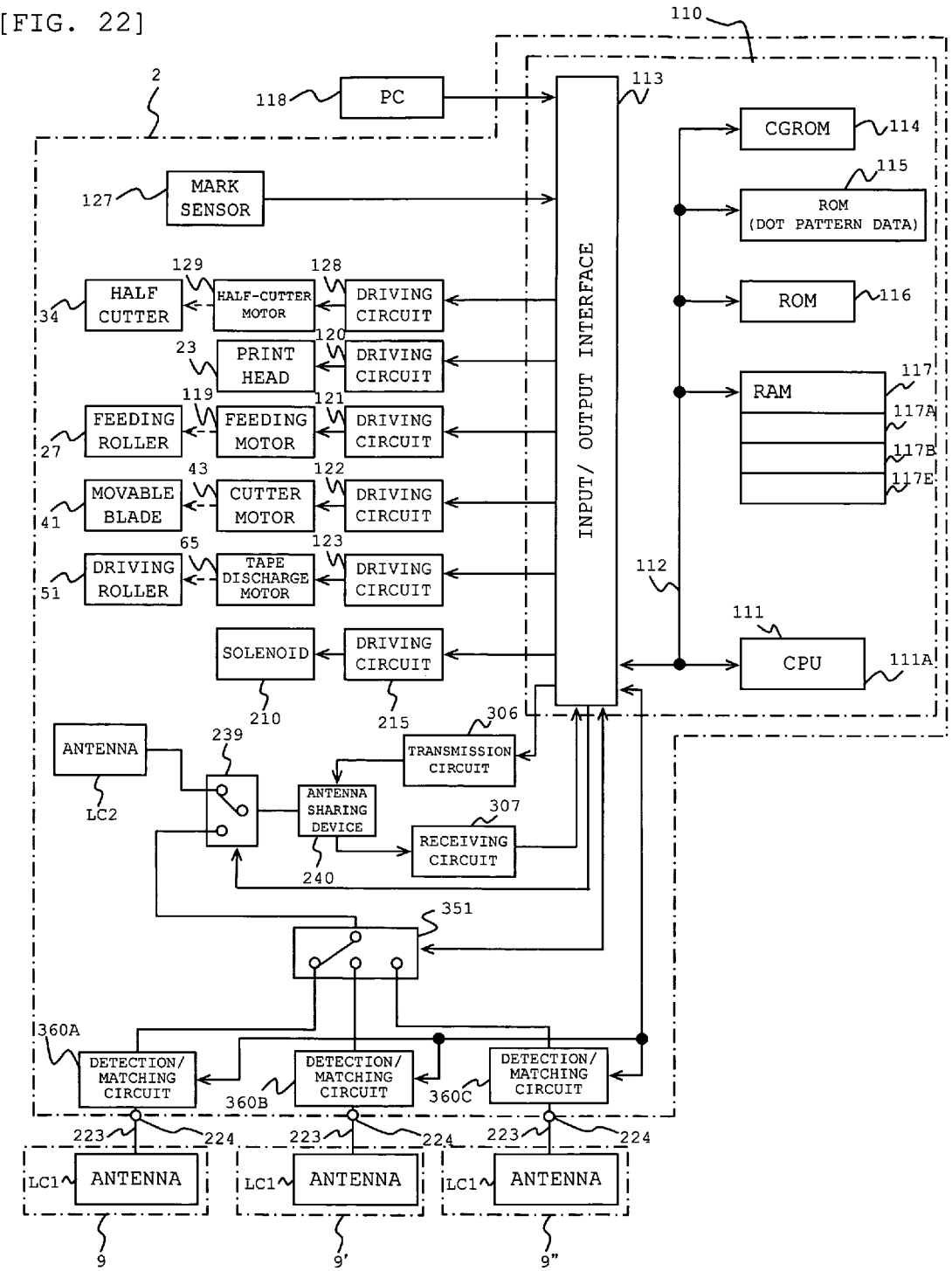
[FIG. 22]

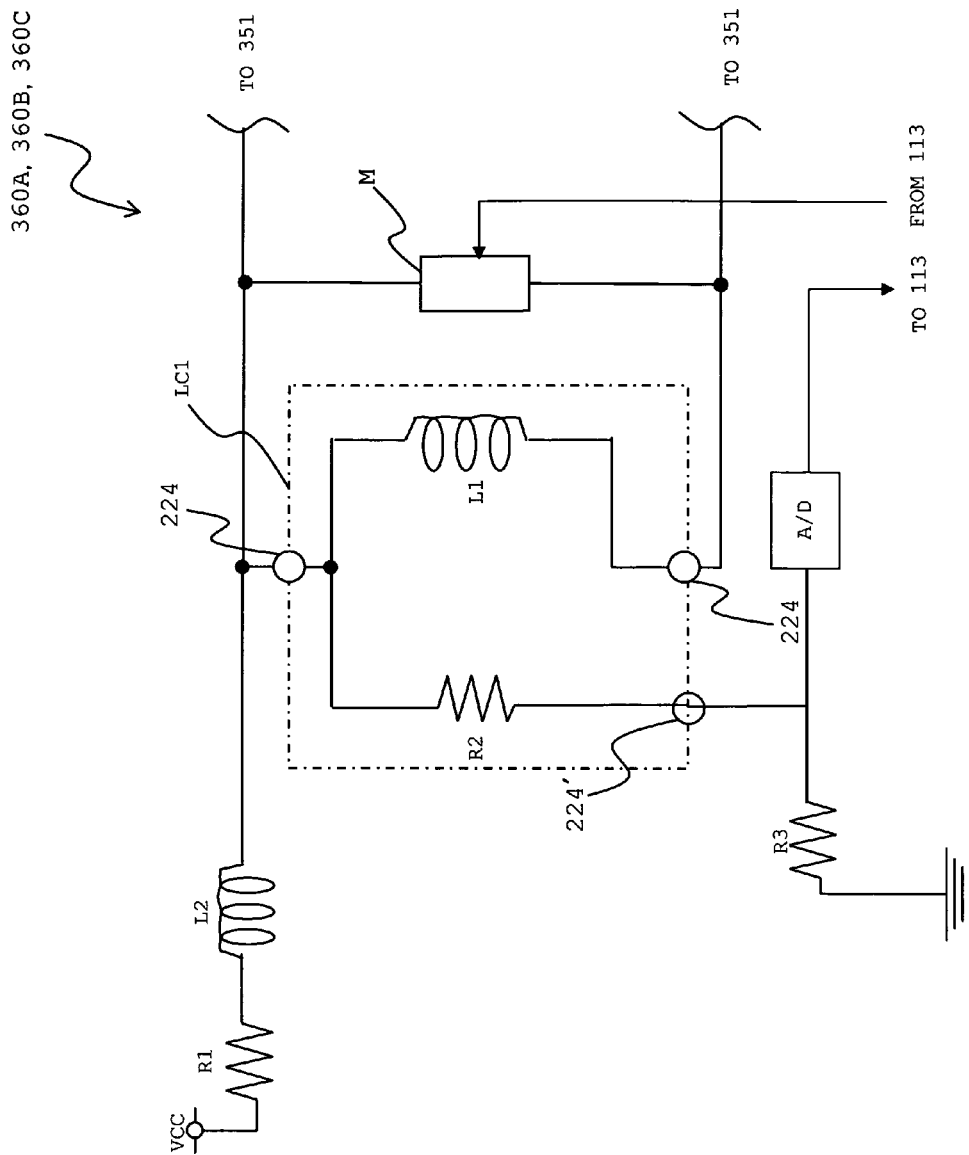
[FIG. 23]

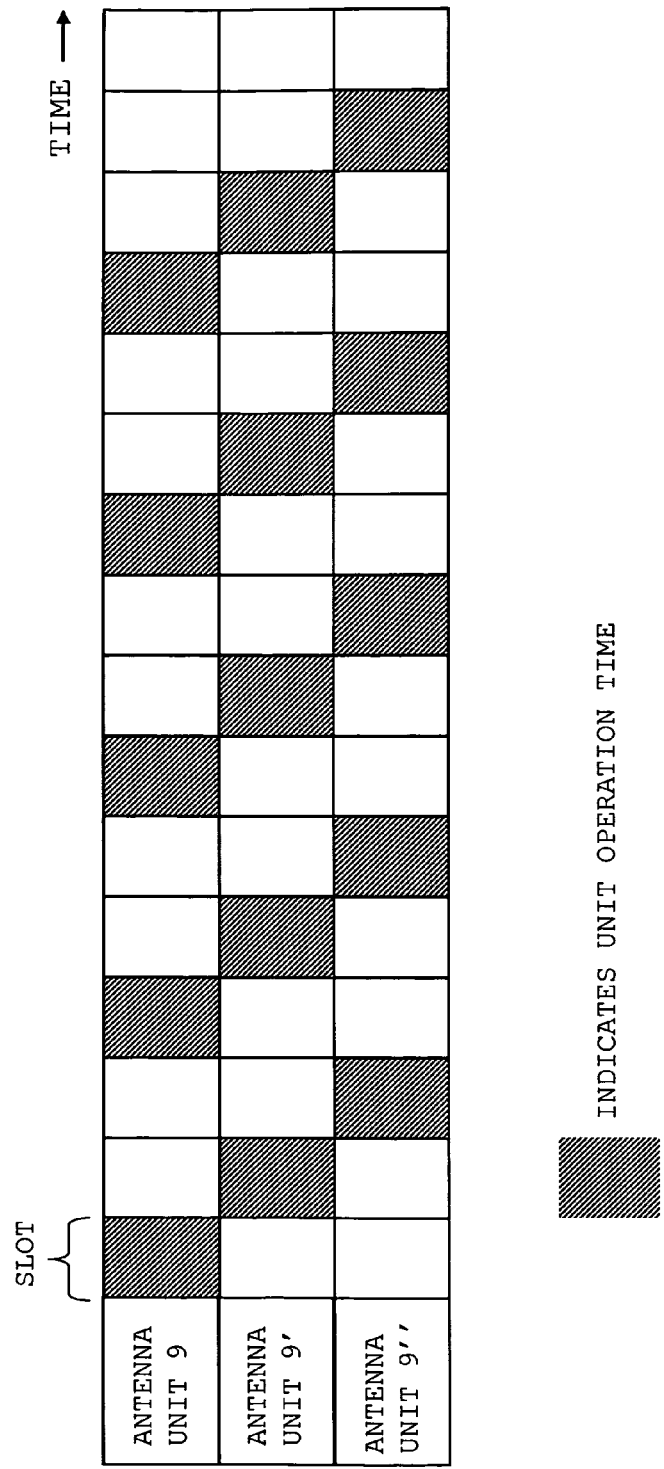

[FIG. 25]
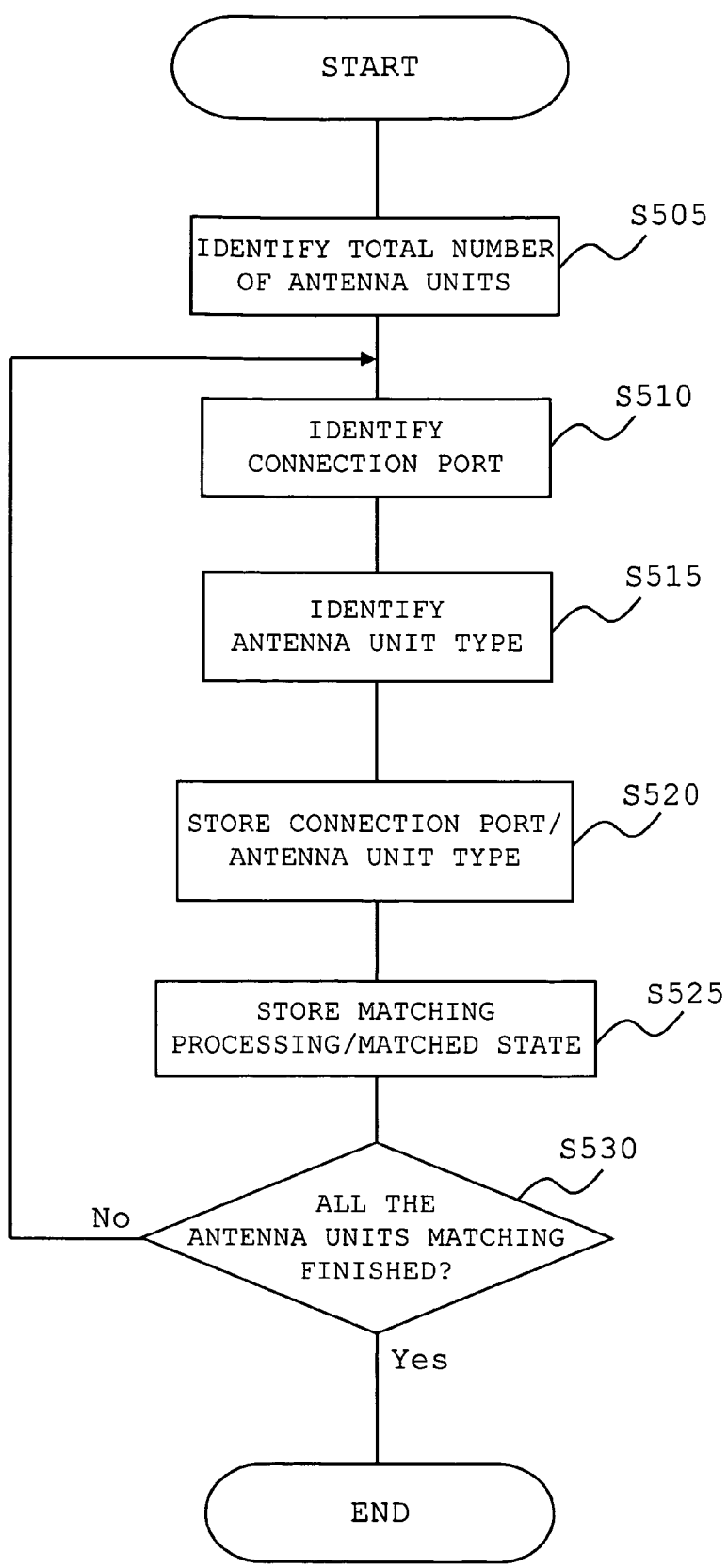

[FIG. 26]
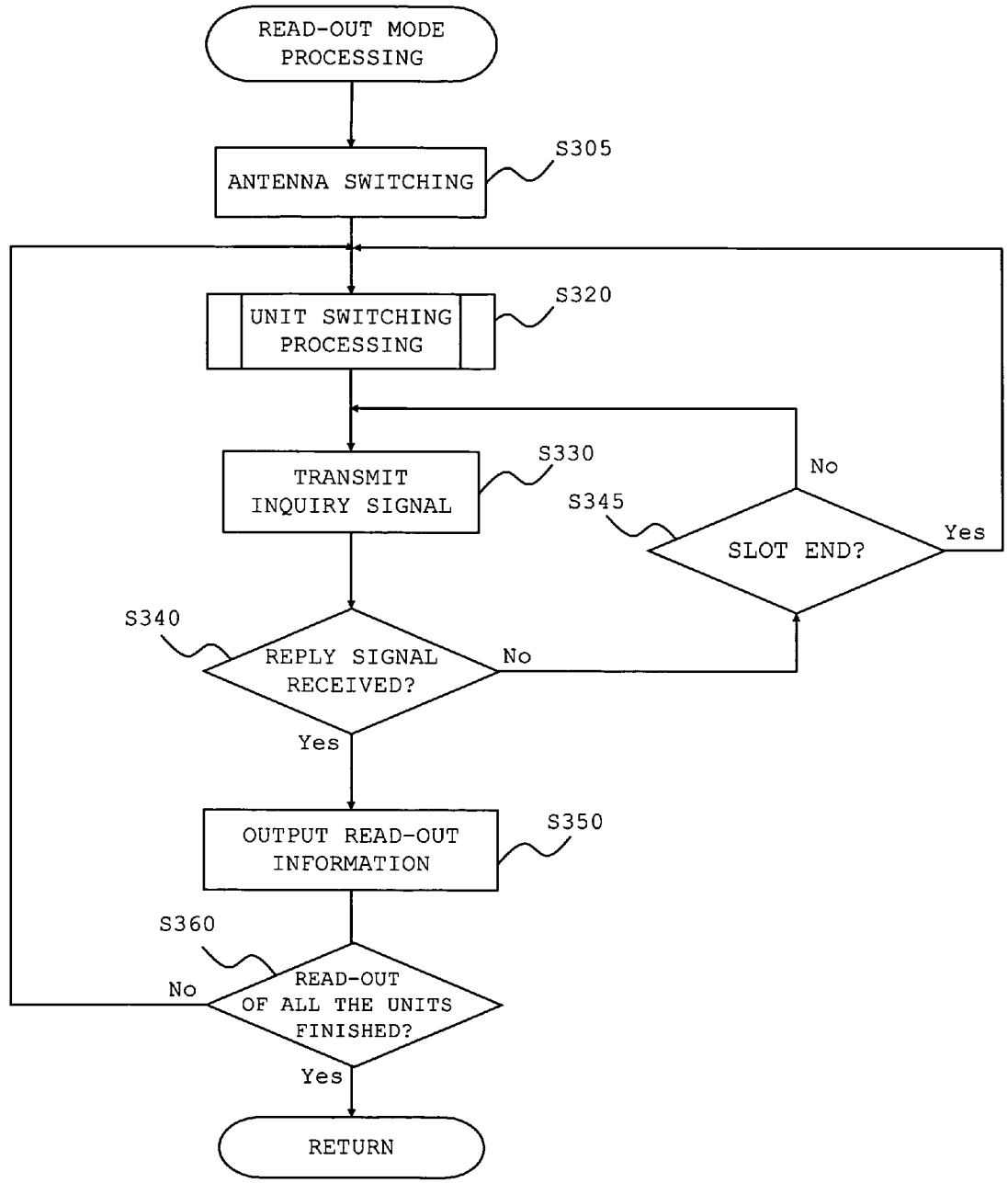

[FIG. 27]
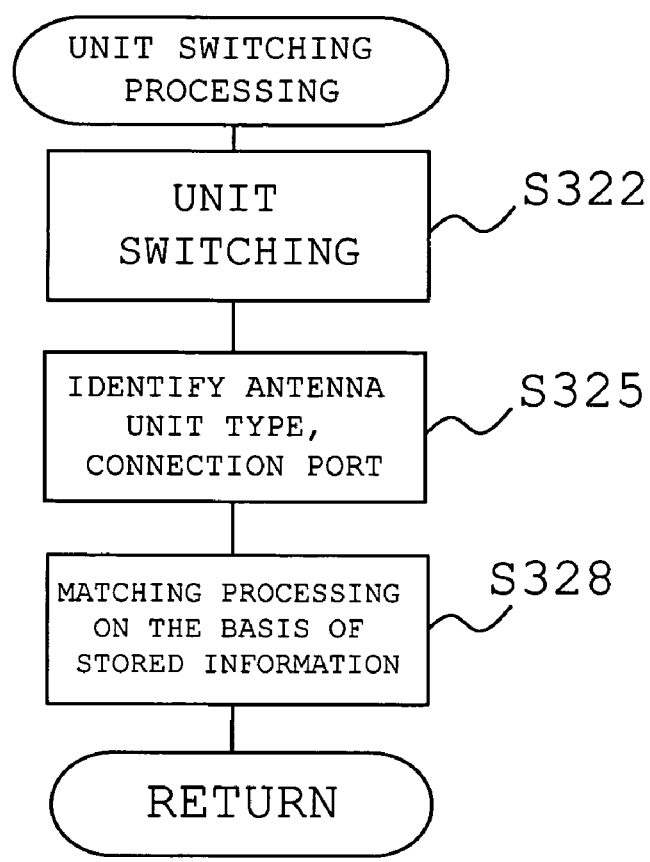

[FIG. 28]
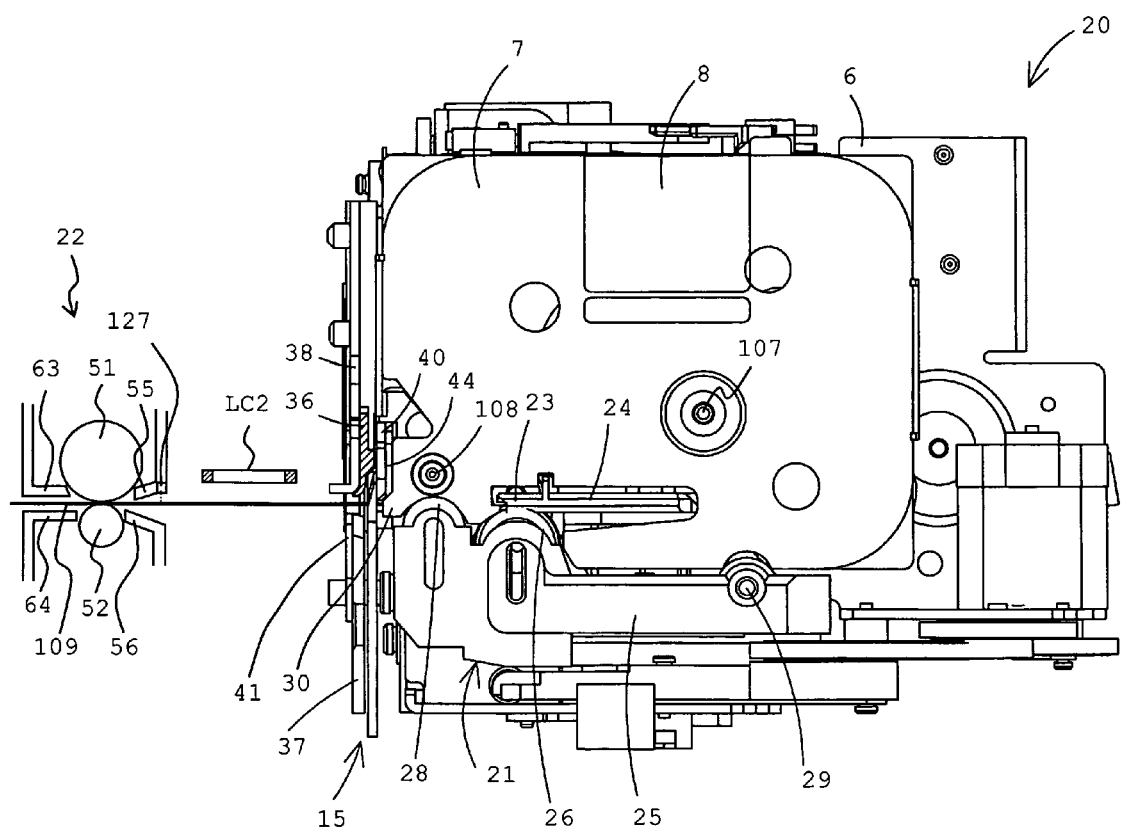

[FIG. 29]
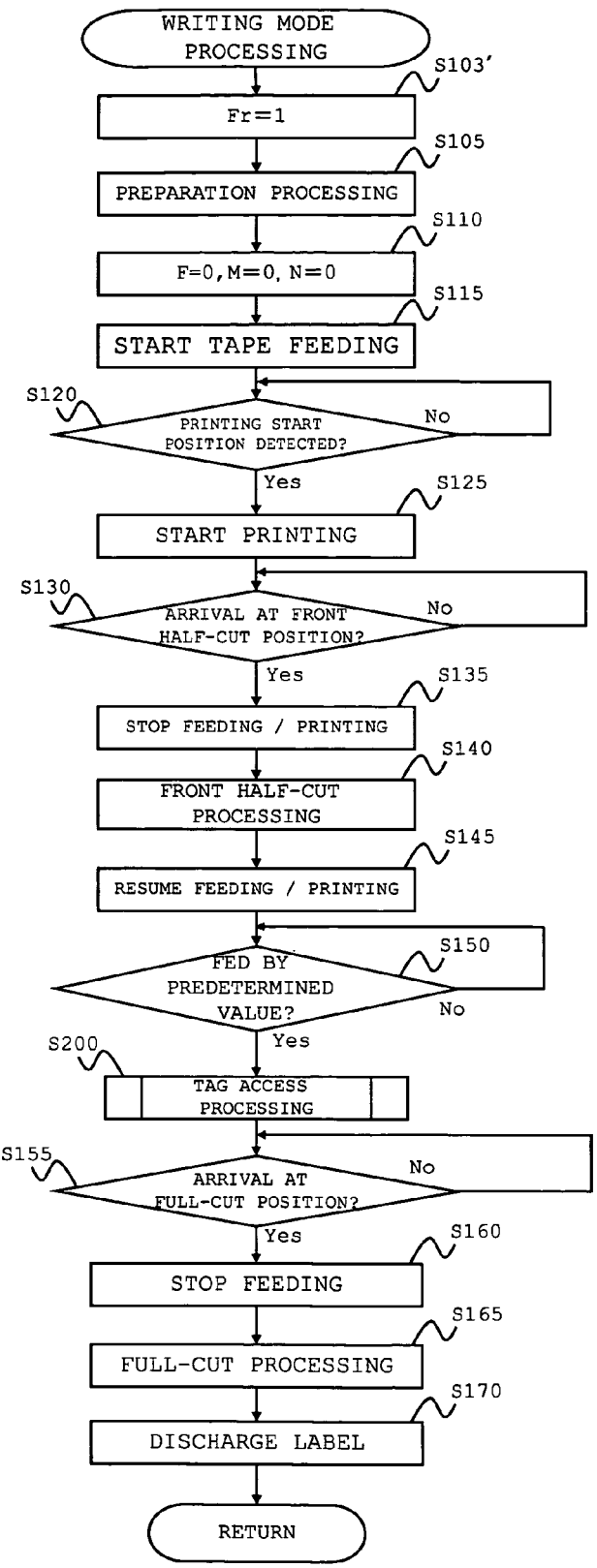

[FIG. 30]
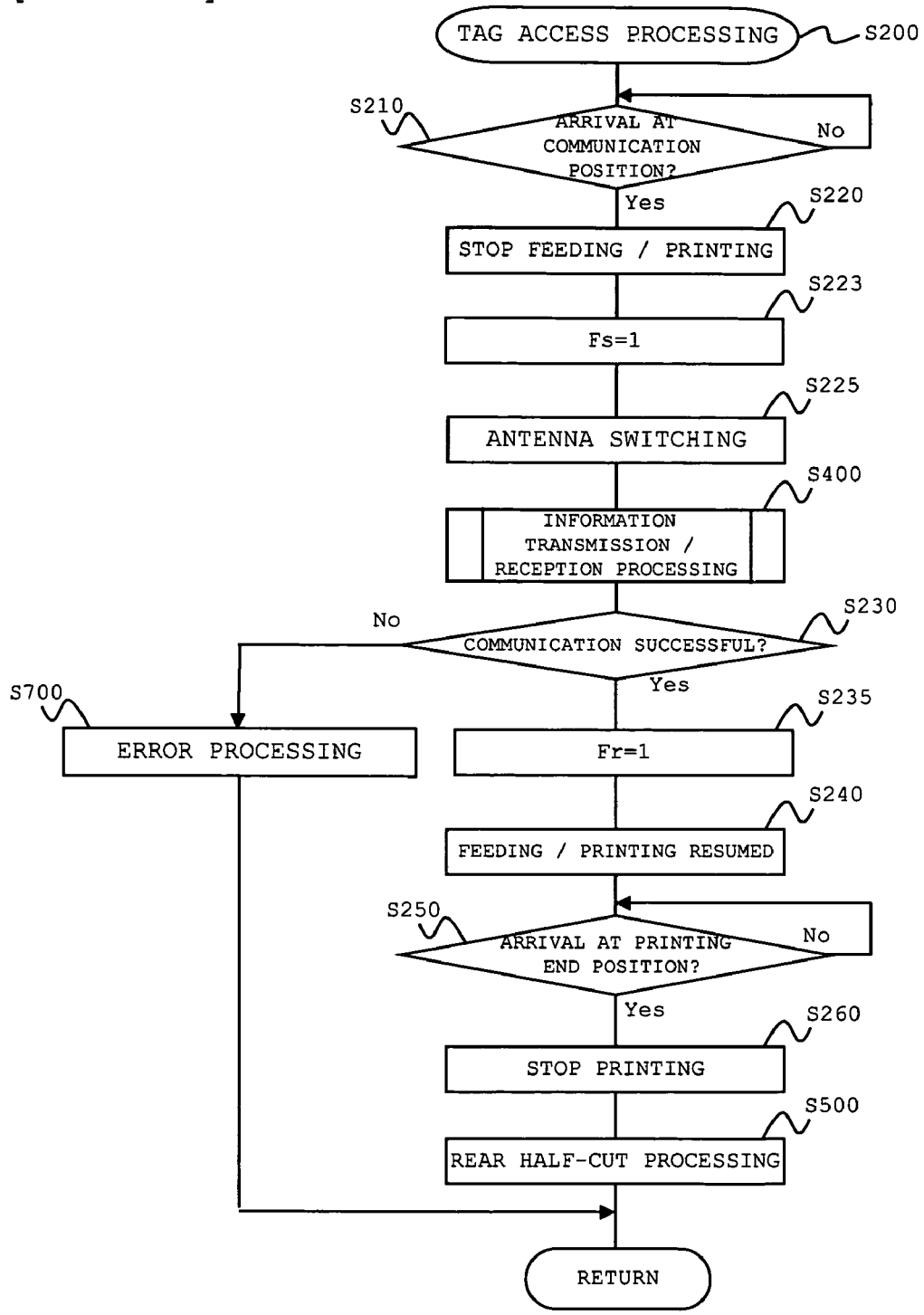

[FIG. 31]
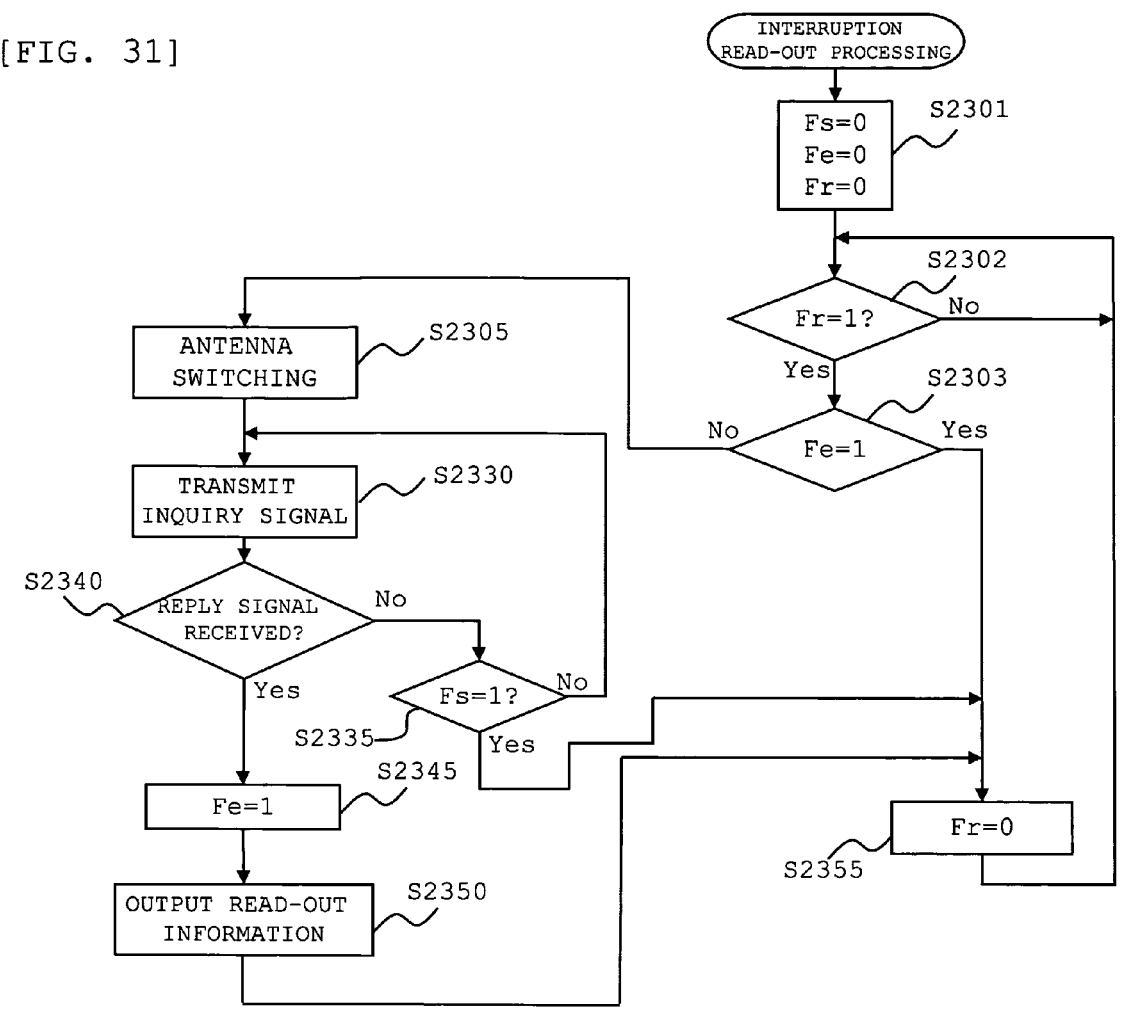

[FIG. 32]
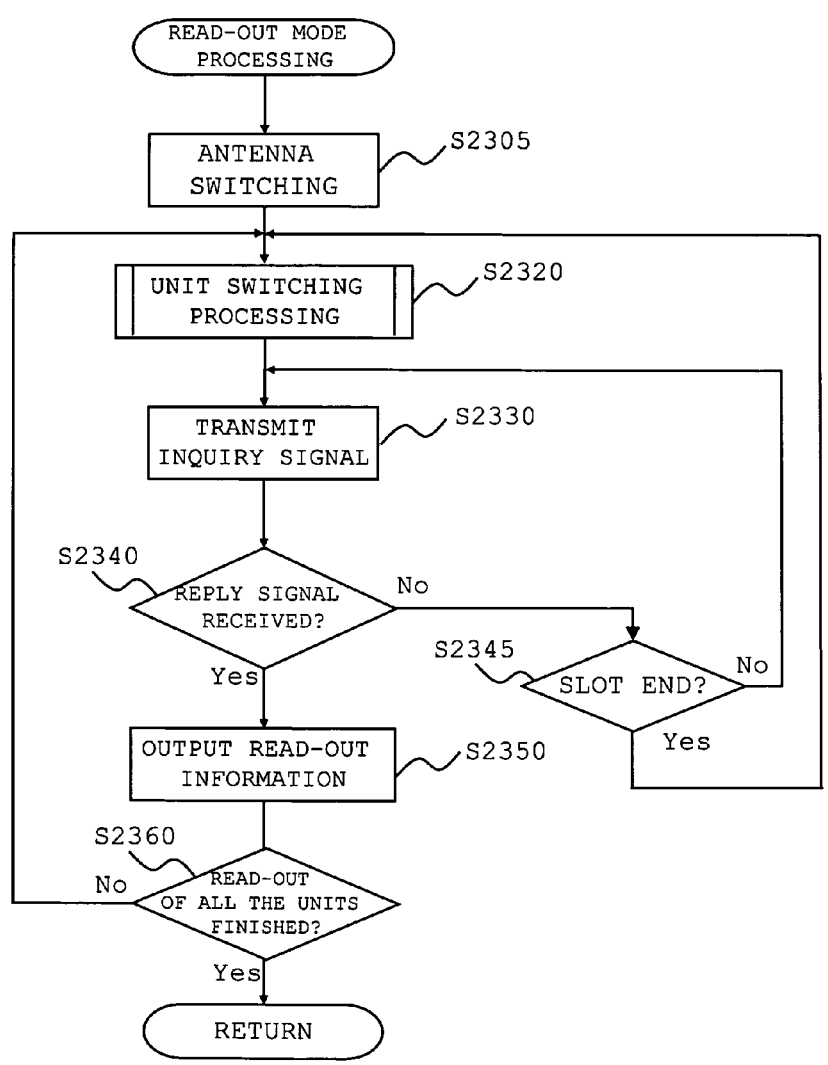

[FIG. 33]
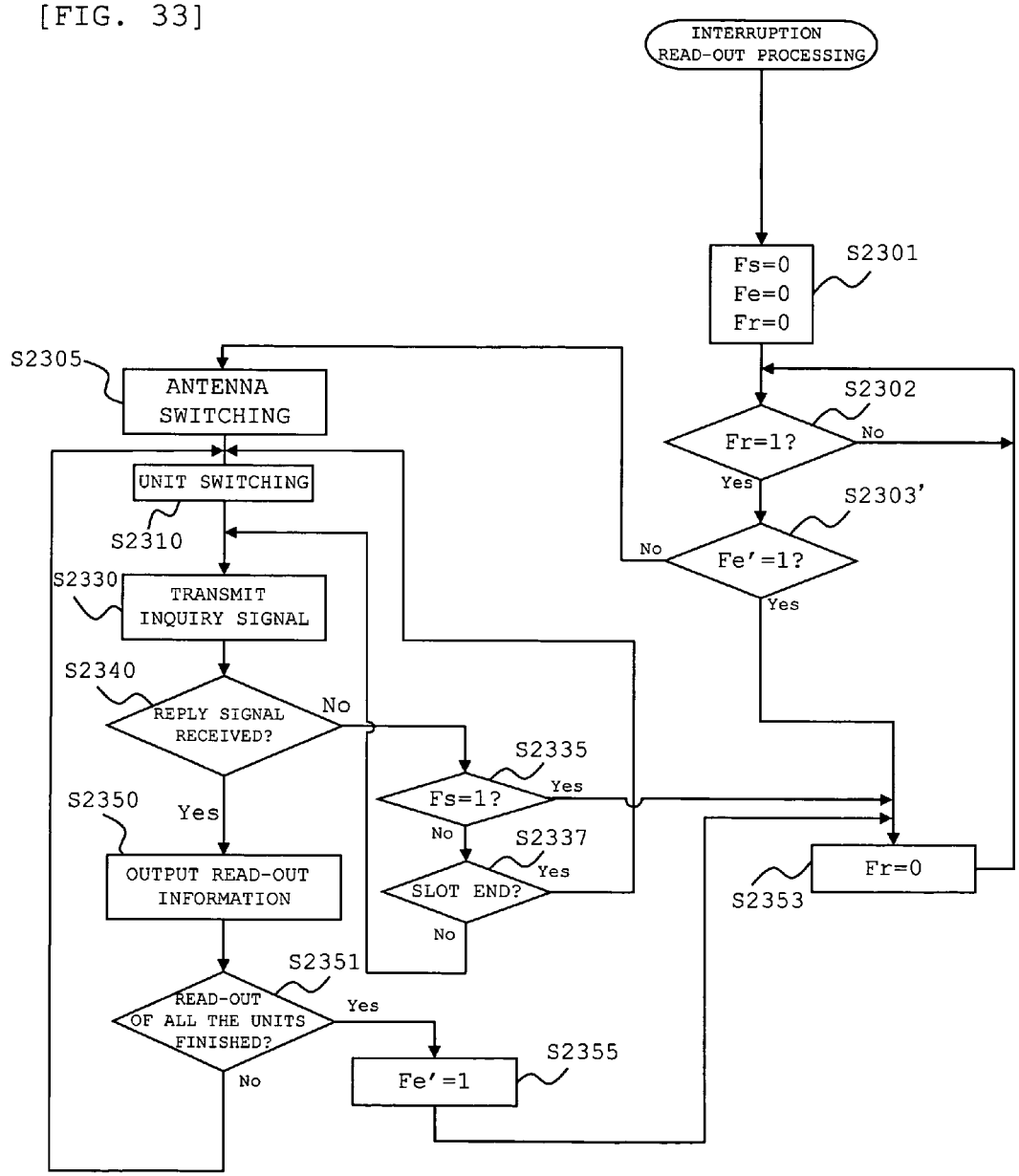

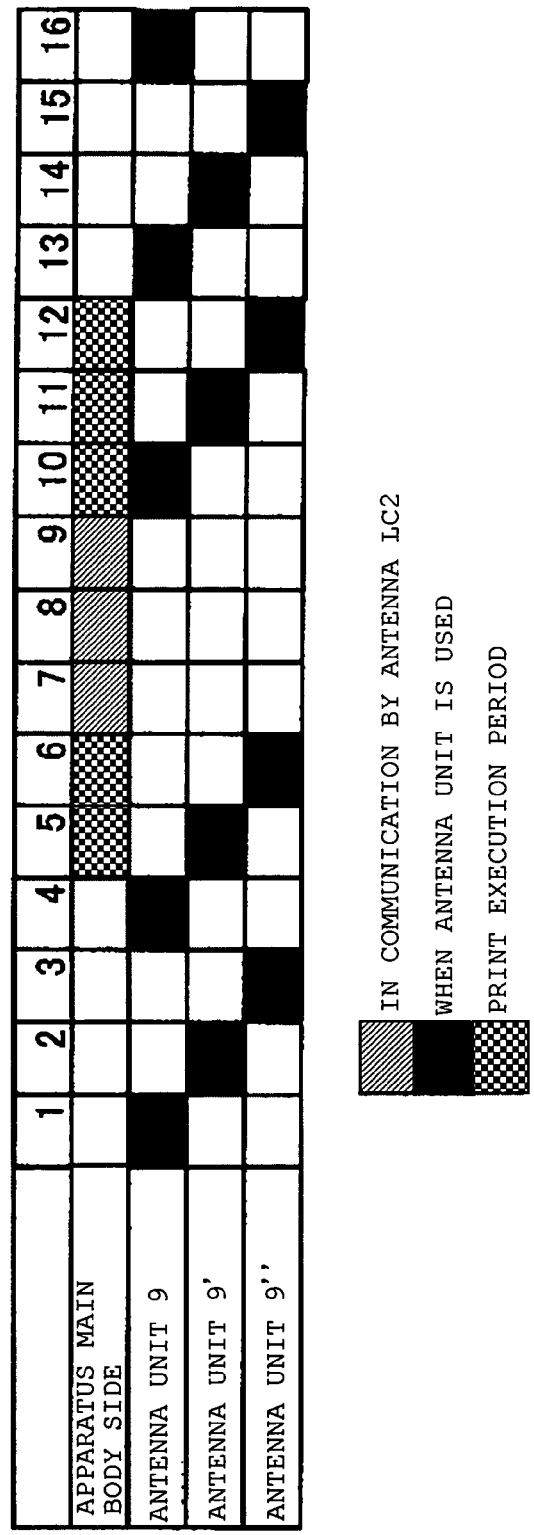
[FIG. 34]

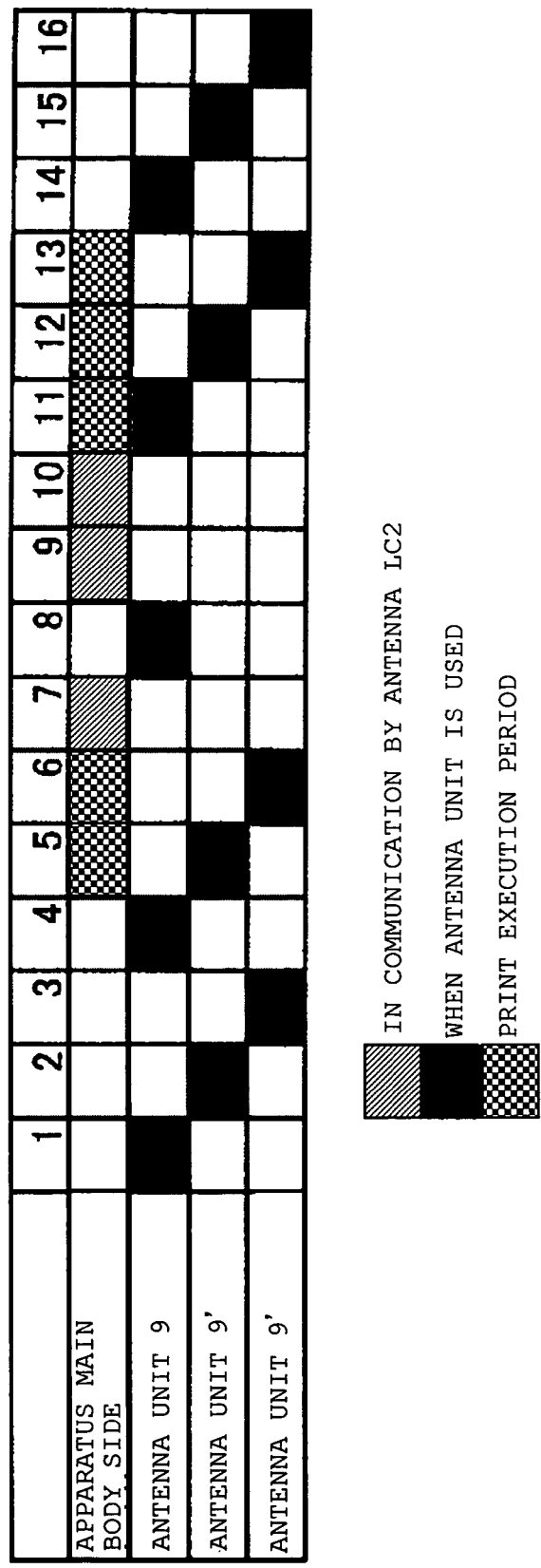

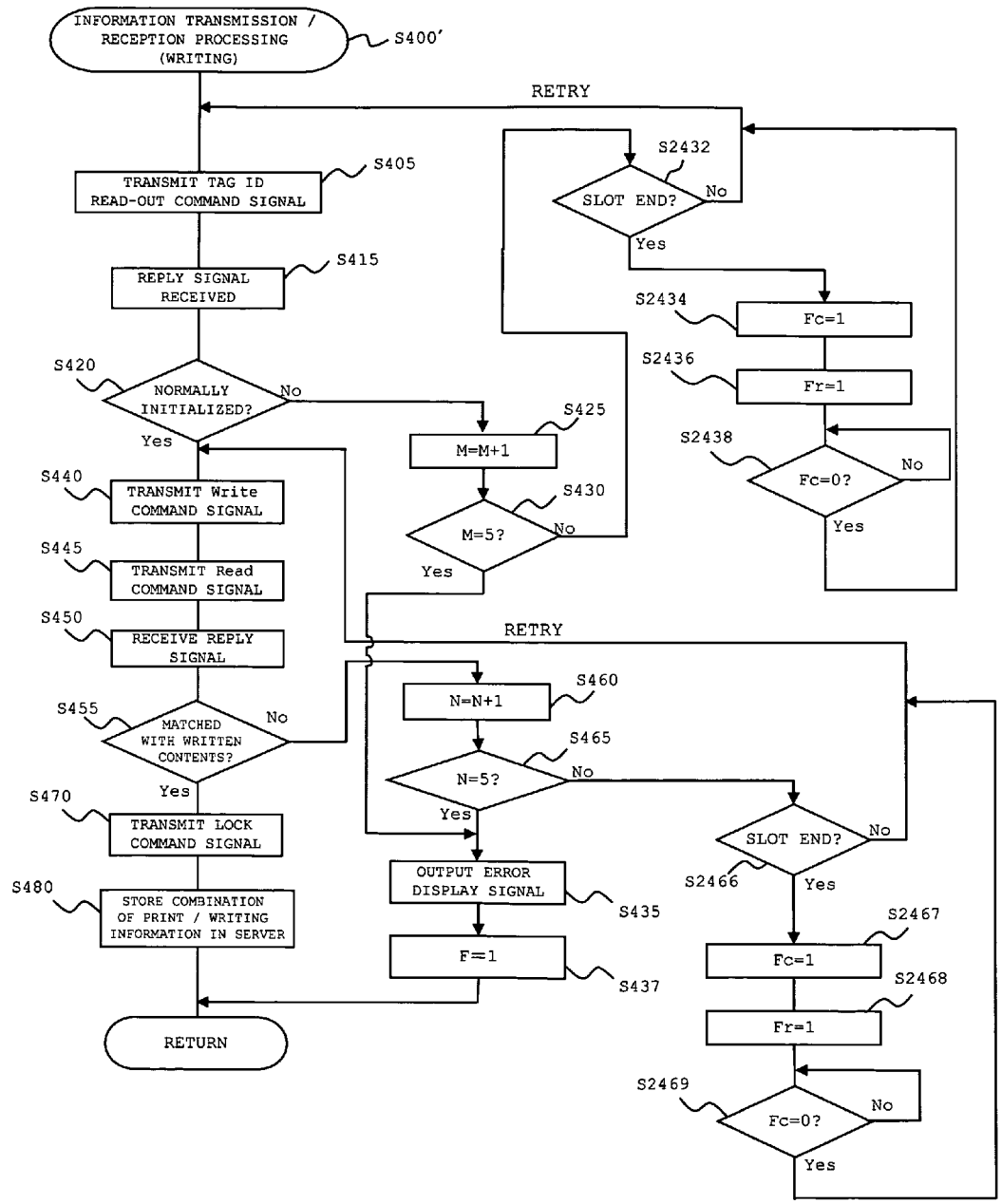
[FIG. 36]

[FIG. 37]
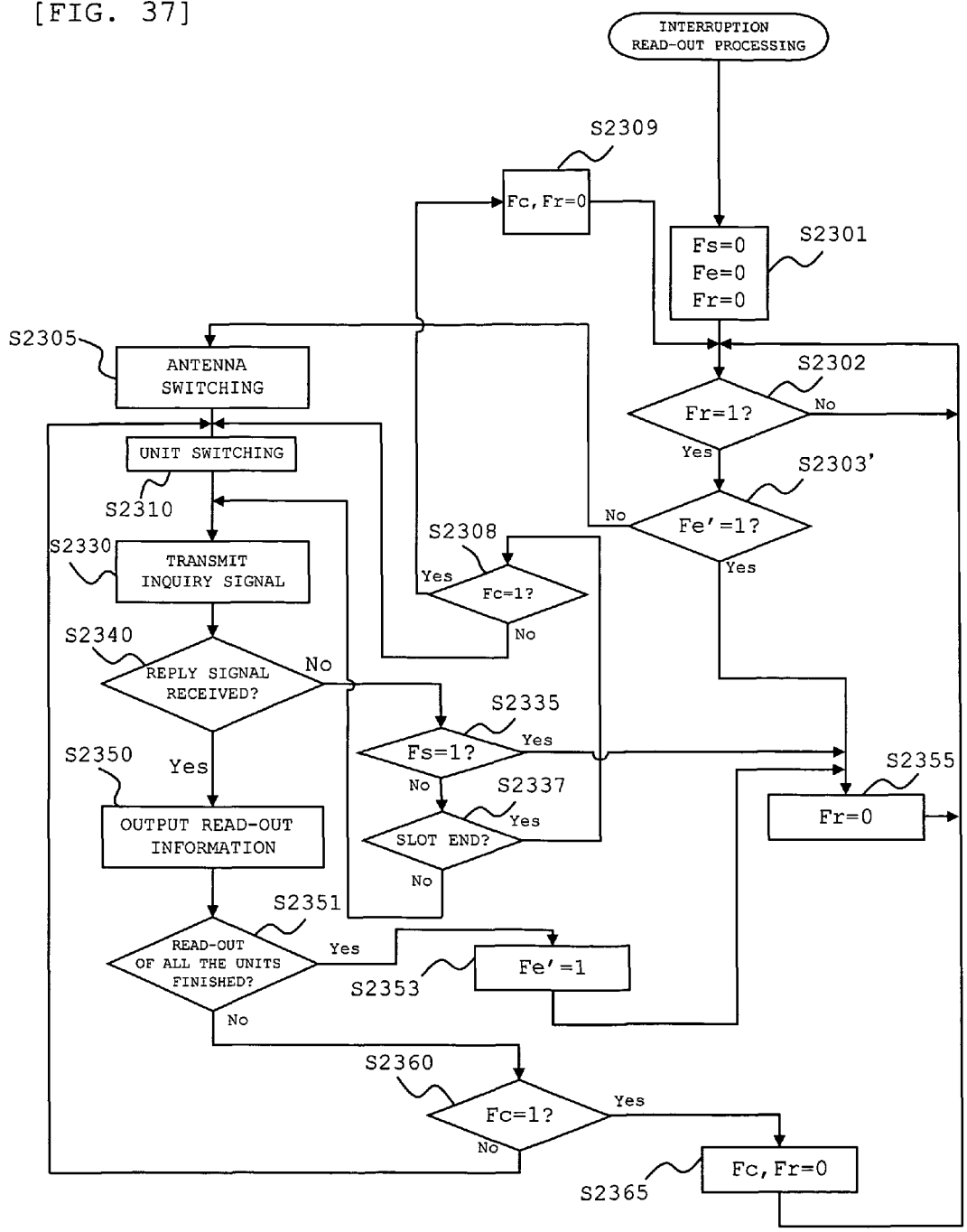

[FIG. 38]
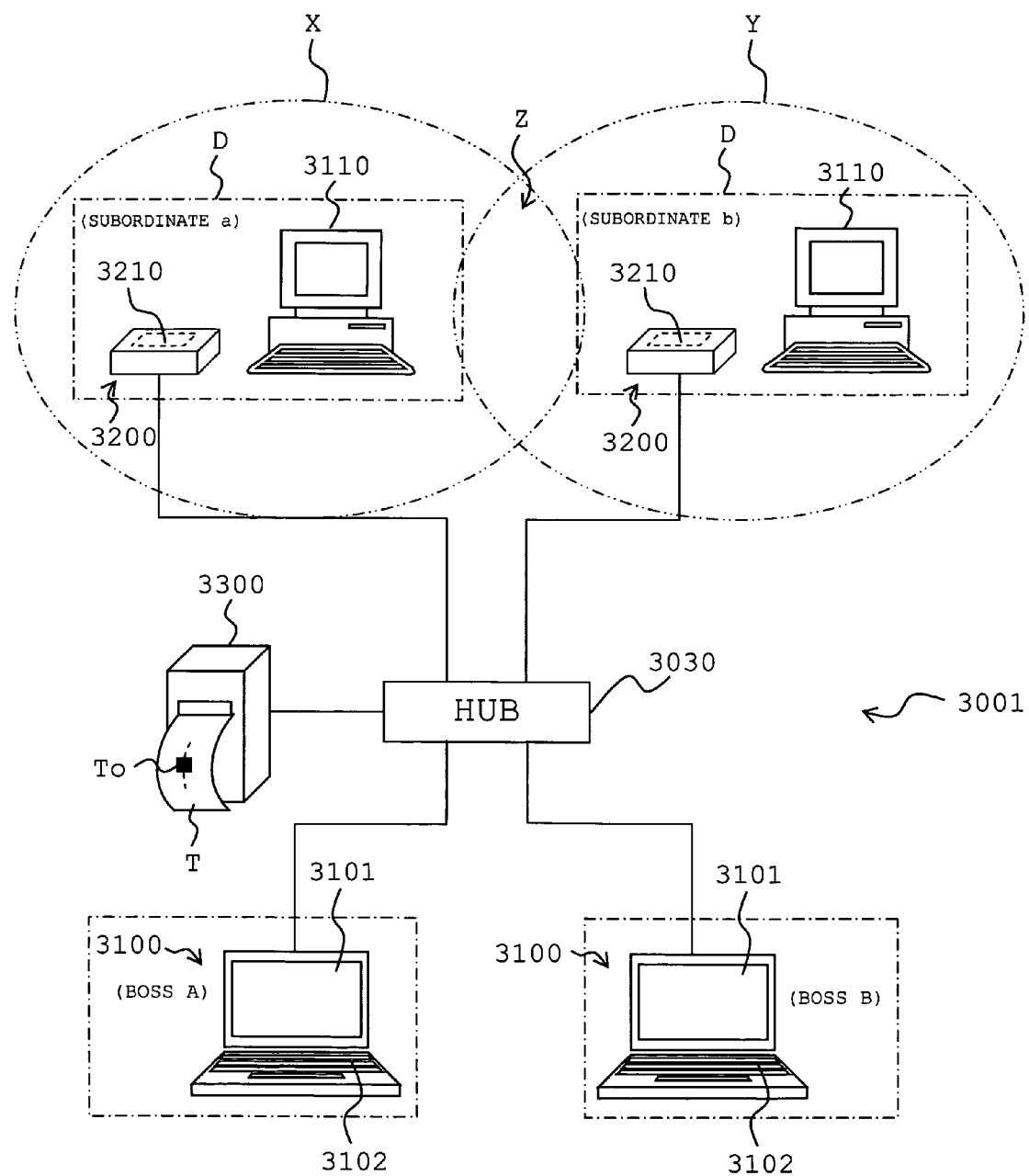

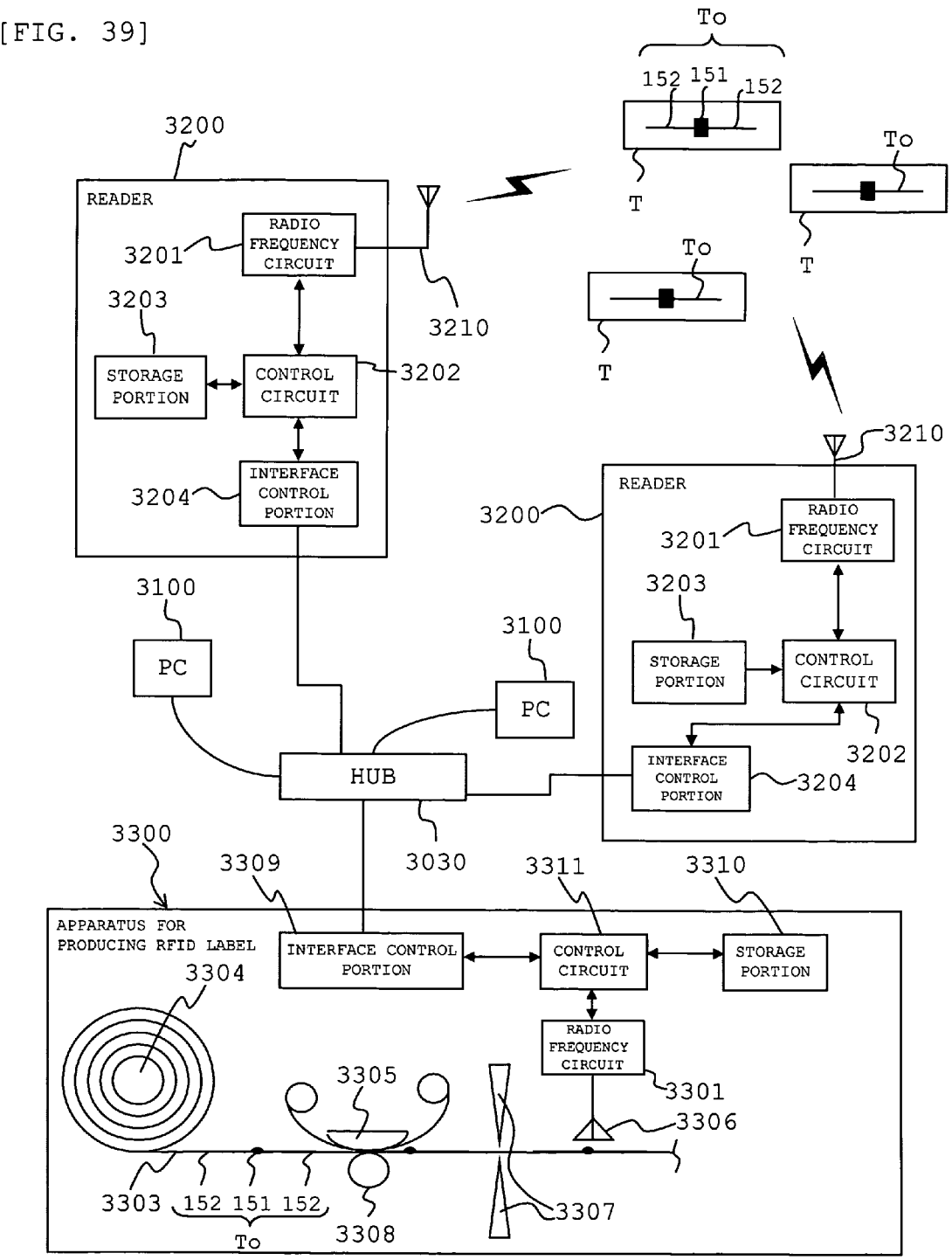
[FIG. 39]

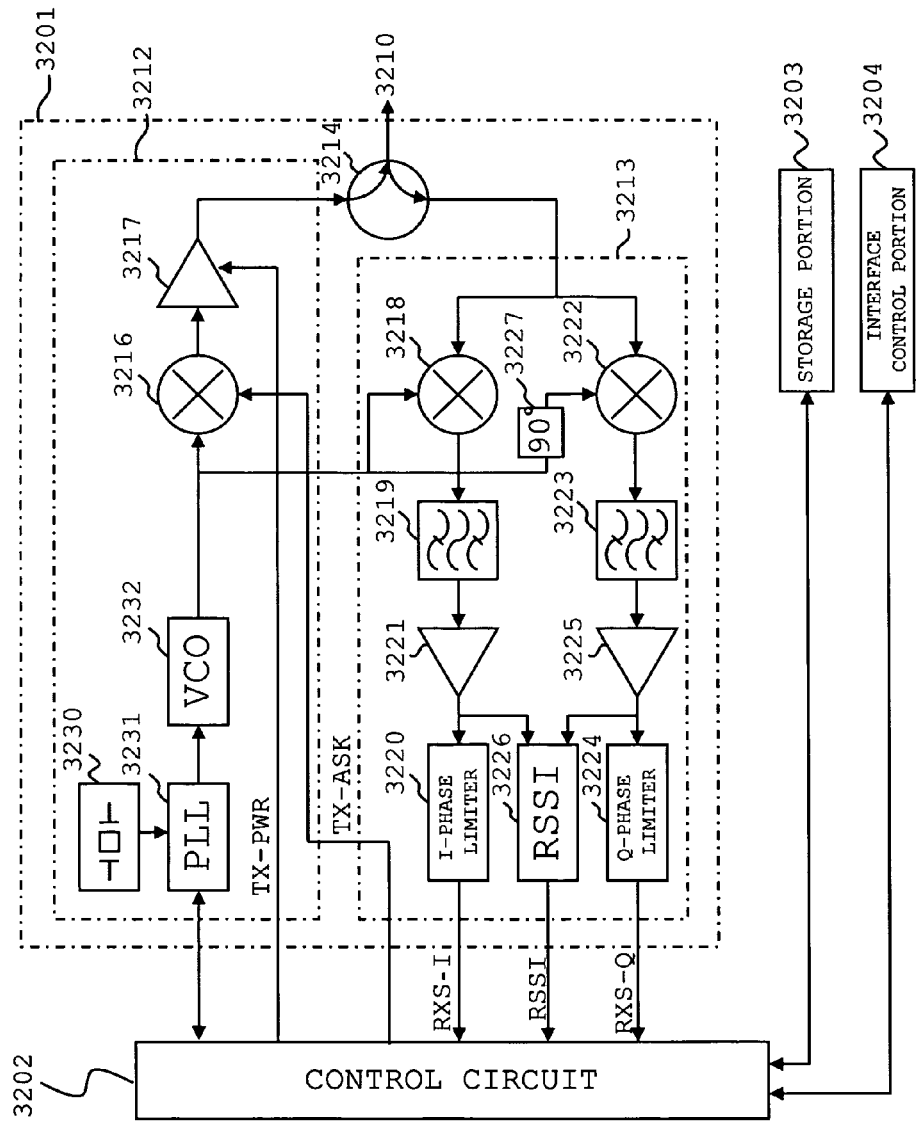
[FIG. 40]

[FIG. 41]
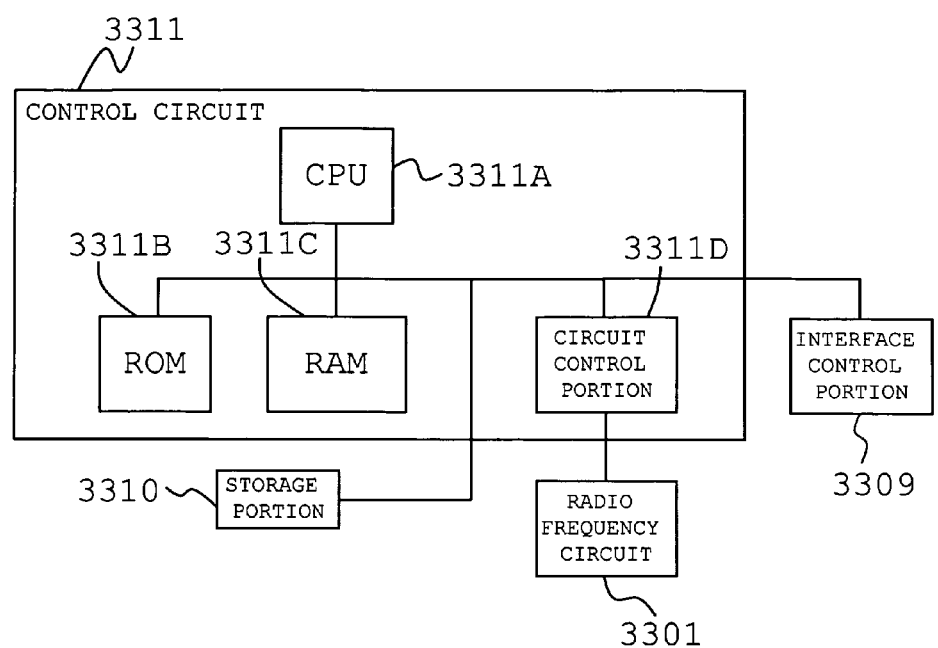

[FIG. 42]
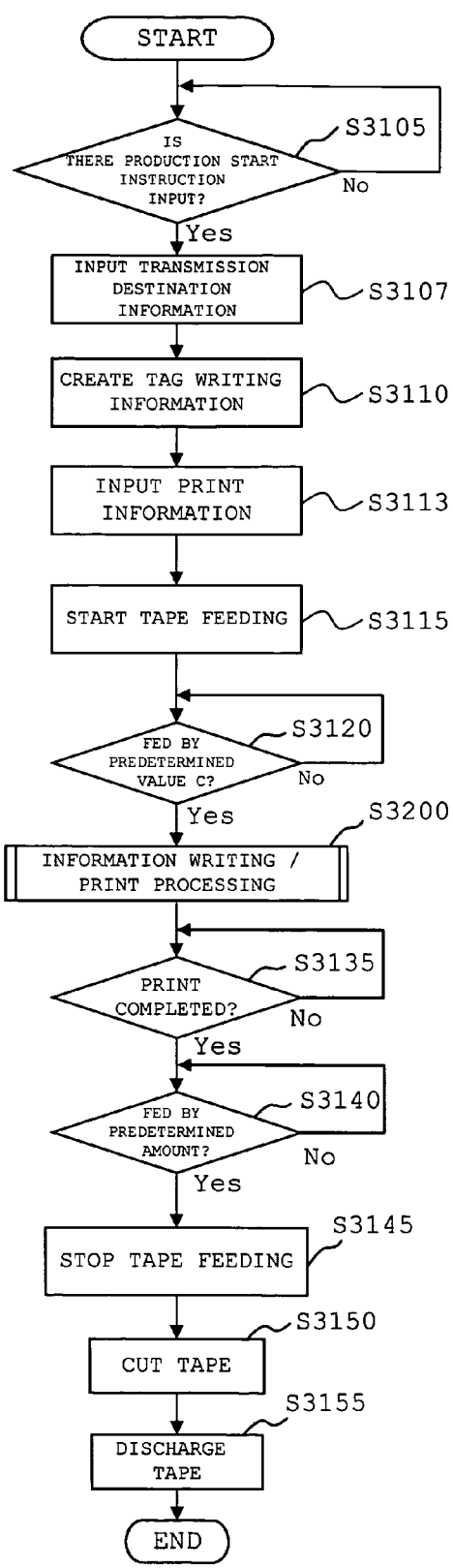

[FIG. 43]
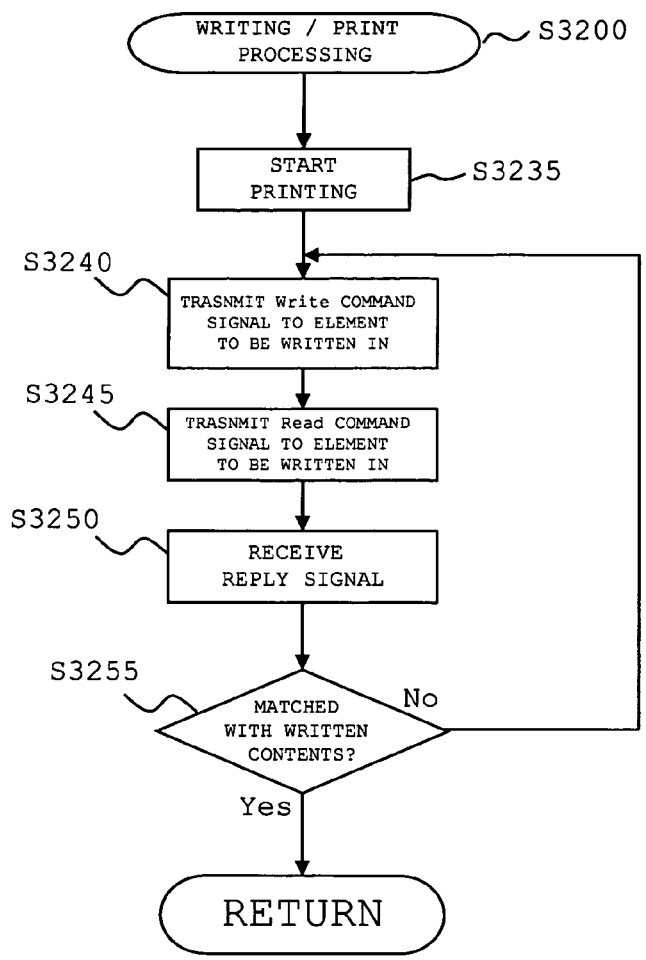
[FIG. 44]
| ID | SETTING TAG IDENTIFICATION FLAG | TRANSMISSION DESTINATION INFORMATION (NETWORK ADDRESS AND THE LIKE) |

[FIG. 45]
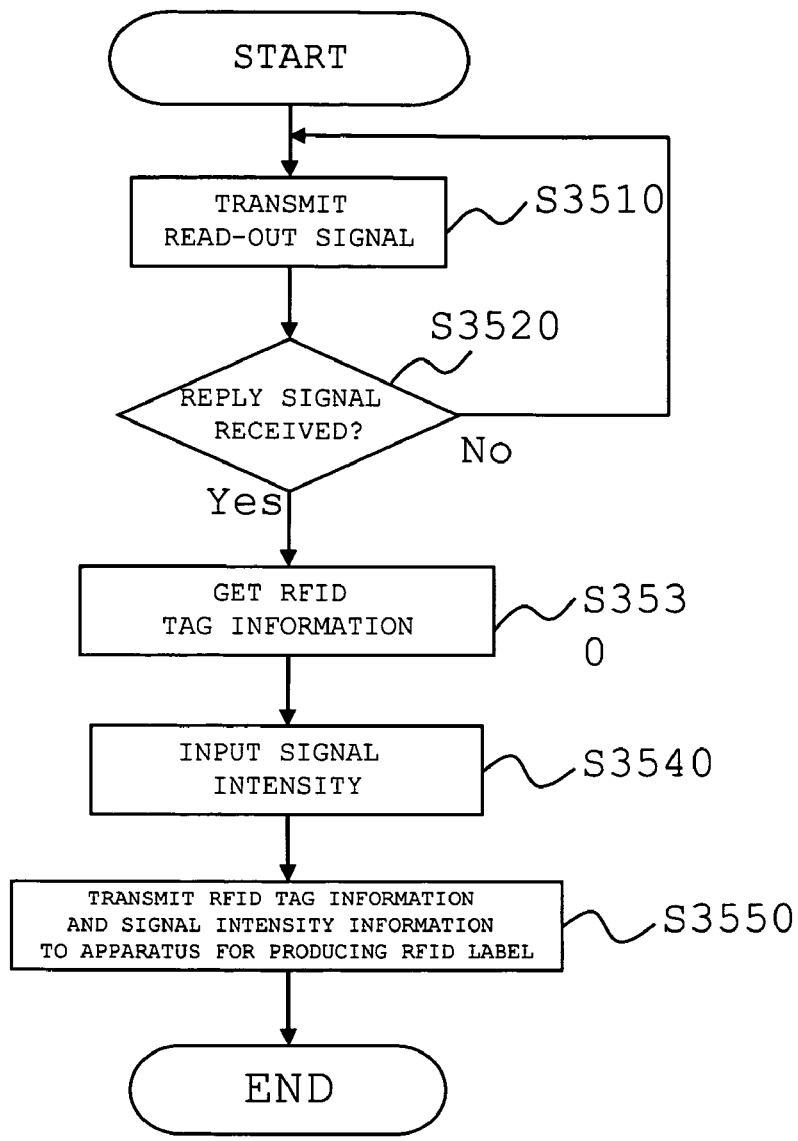

[FIG. 46]
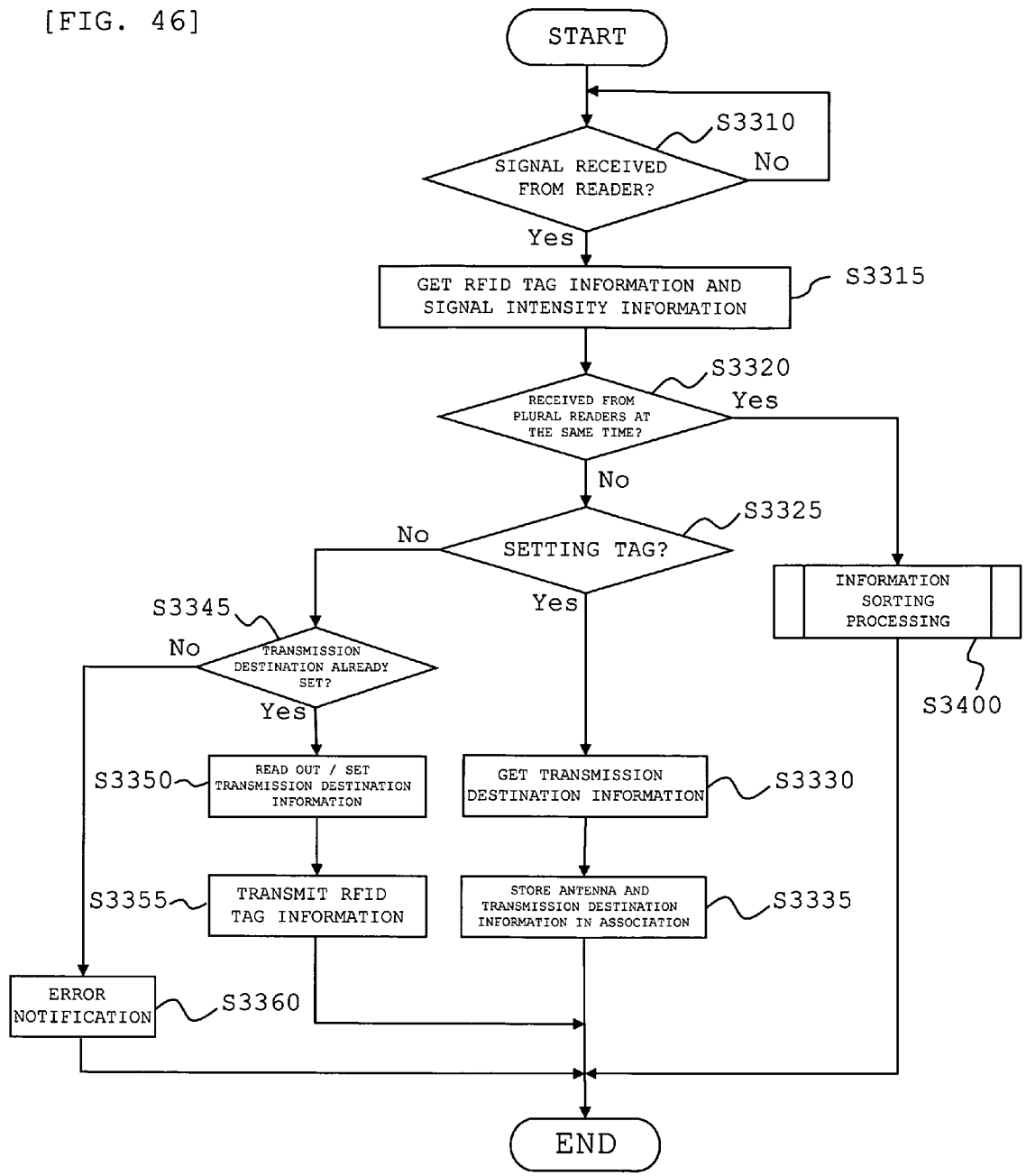

[FIG. 47]
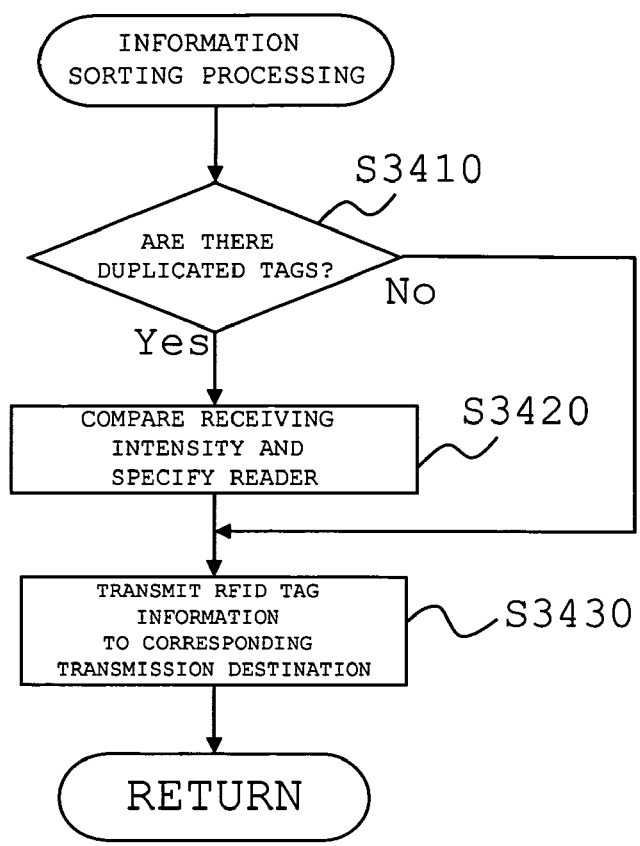

[FIG. 48]
| SUBORDINATE a | |
|---|---|
| TAG | SIGNAL INTENSITY |
| T1 | 10 |
| T2 | 8 |
| T3 | 9 |
| T4 | 2 |
| SUBORDINATE b | |
|---|---|
| TAG | SIGNAL INTENSITY |
| T4 | 5 |
| T5 | 8 |
| T6 | 7 |
 SORTING PROCESSING
| SUBORDINATE a | |
|---|---|
| TAG | SIGNAL INTENSITY |
| T1 | 10 |
| T2 | 8 |
| T3 | 9 |
| SUBORDINATE b | |
|---|---|
| TAG | SIGNAL INTENSITY |
| T4 | 5 |
| T5 | 8 |
| T6 | 7 |
 
TRANSMIT INFORMATION OF
TAGS T1, T2, T3 TO BOSS A
TRANSMIT INFORMATION OF
TAGS T4, T5, T6 TO BOSS B

[FIG. 49]
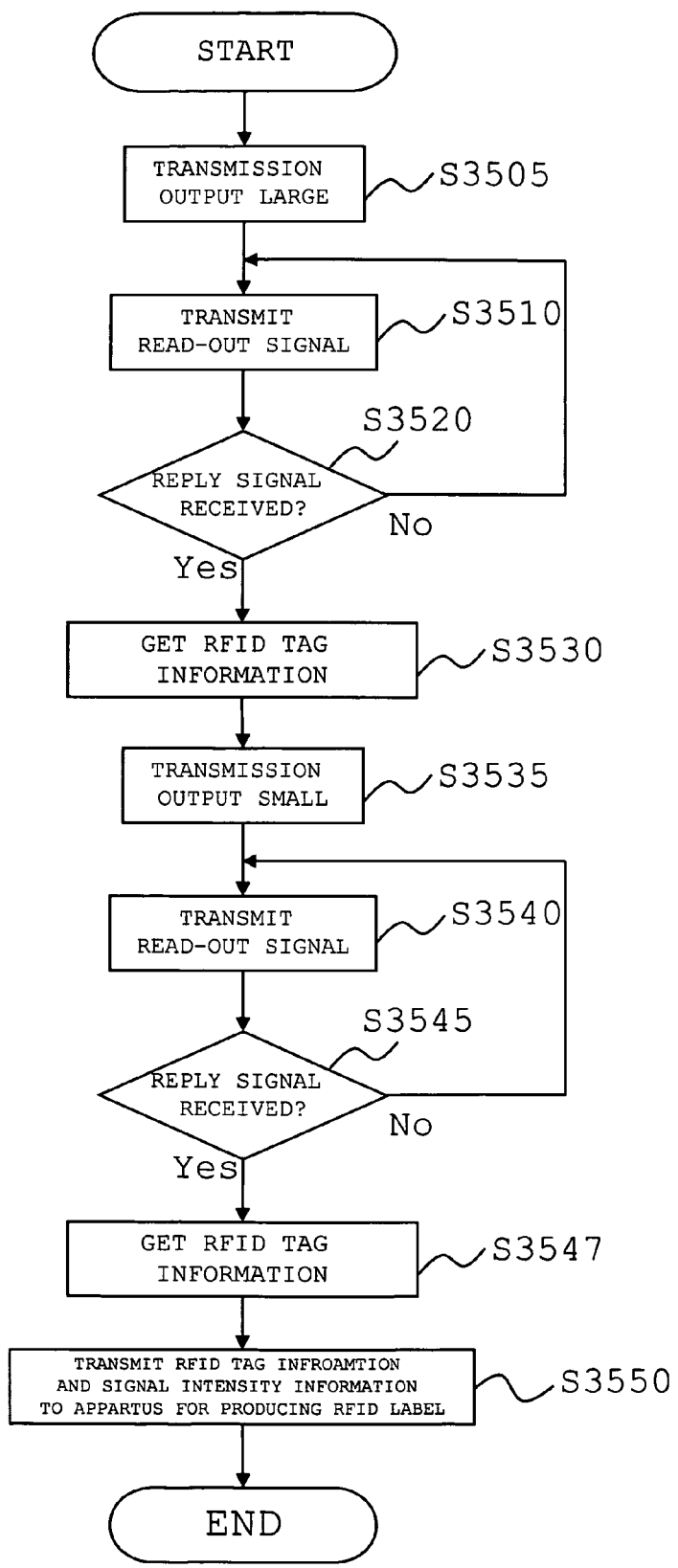

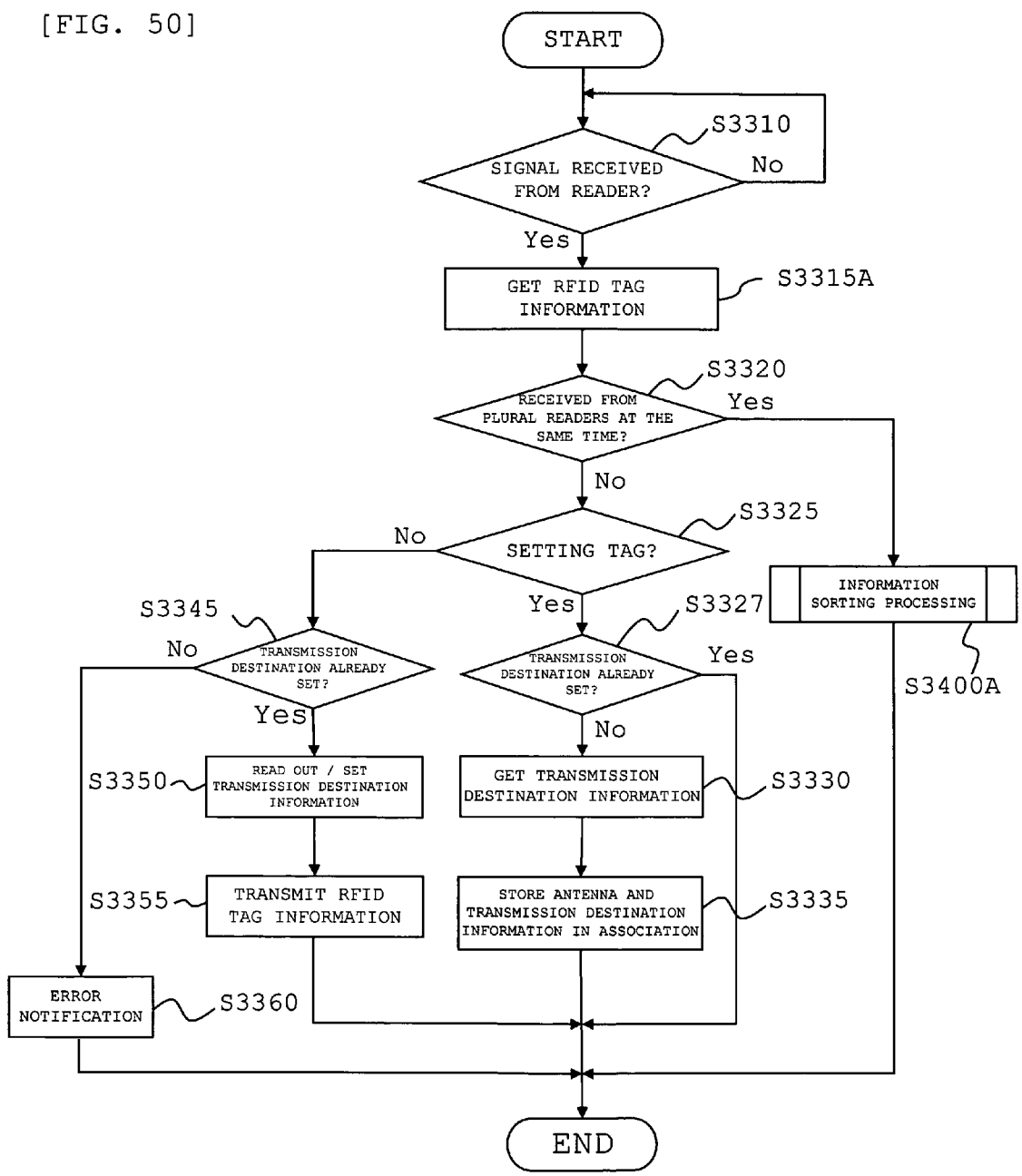
[FIG. 50]

[FIG. 51]
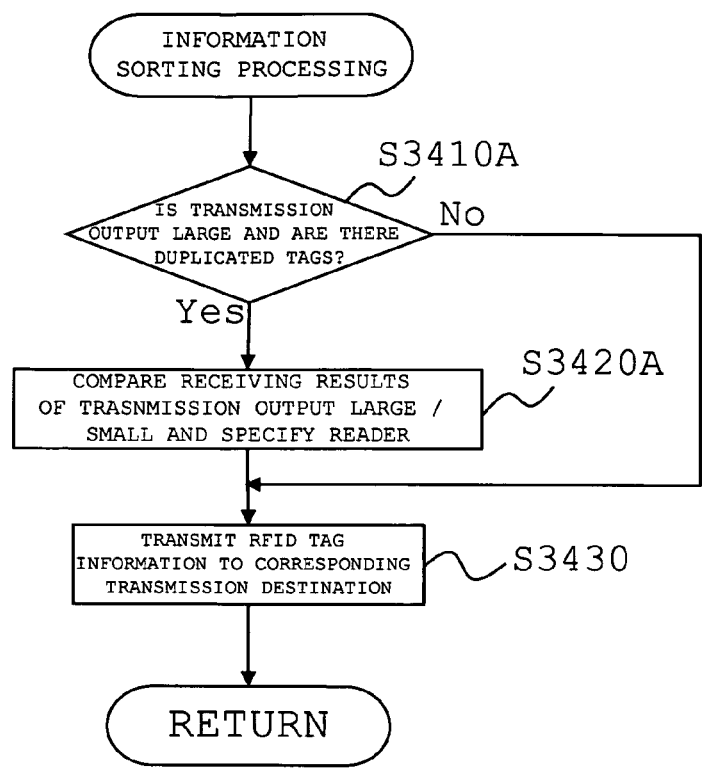

[FIG. 52]

| SUBORDINATE a | |
|---|---|
| TRANSMISSION OUTPUT LARGE | TRANSMISSION OUTPUT SMALL |
| T1 | T1 |
| T2 | T2 |
| T3 | T3 |
| T4 | |

| SUBORDINATE b | |
|---|---|
| TRANSMISSION OUTPUT LARGE | TRANSMISSION OUTPUT SMALL |
| T4 | T4 |
| T5 | T5 |
| T6 | T6 |

 SORTING PROCESSING

| SUBORDINATE a | |
|---|---|
| TRANSMISSION OUTPUT LARGE | TRANSMISSION OUTPUT SMALL |
| T1 | T1 |
| T2 | T2 |
| T3 | T3 |

| SUBORDINATE b | |
|---|---|
| TRANSMISSION OUTPUT LARGE | TRANSMISSION OUTPUT SMALL |
| T4 | T4 |
| T5 | T5 |
| T6 | T6 |

 

TRANSMIT INFORMATION OF TAGS T1, T2, T3 TO BOSS A

TRANSMIT INFORMATION OF TAGS T4, T5, T6 TO BOSS B

[FIG. 53]
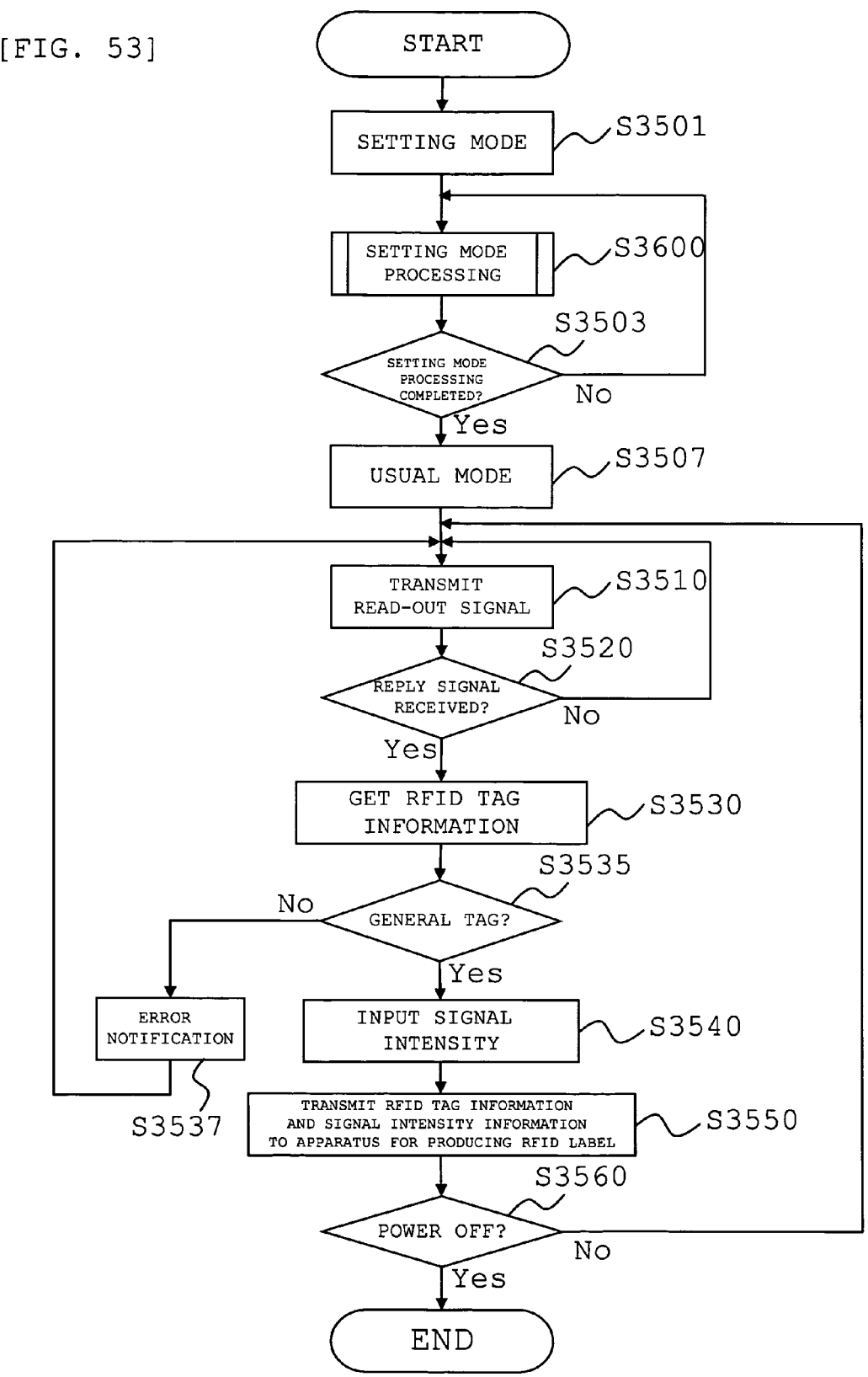

[FIG. 54]
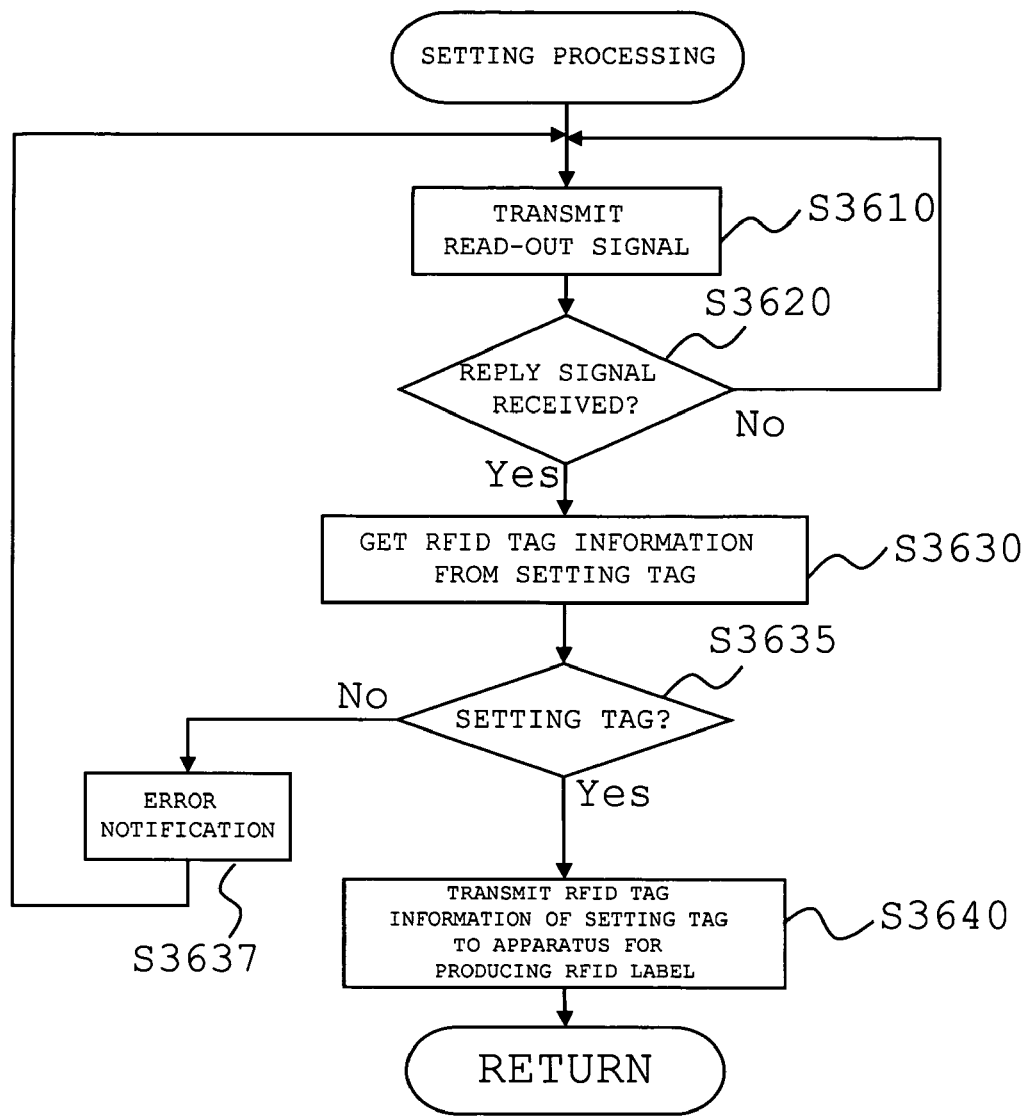

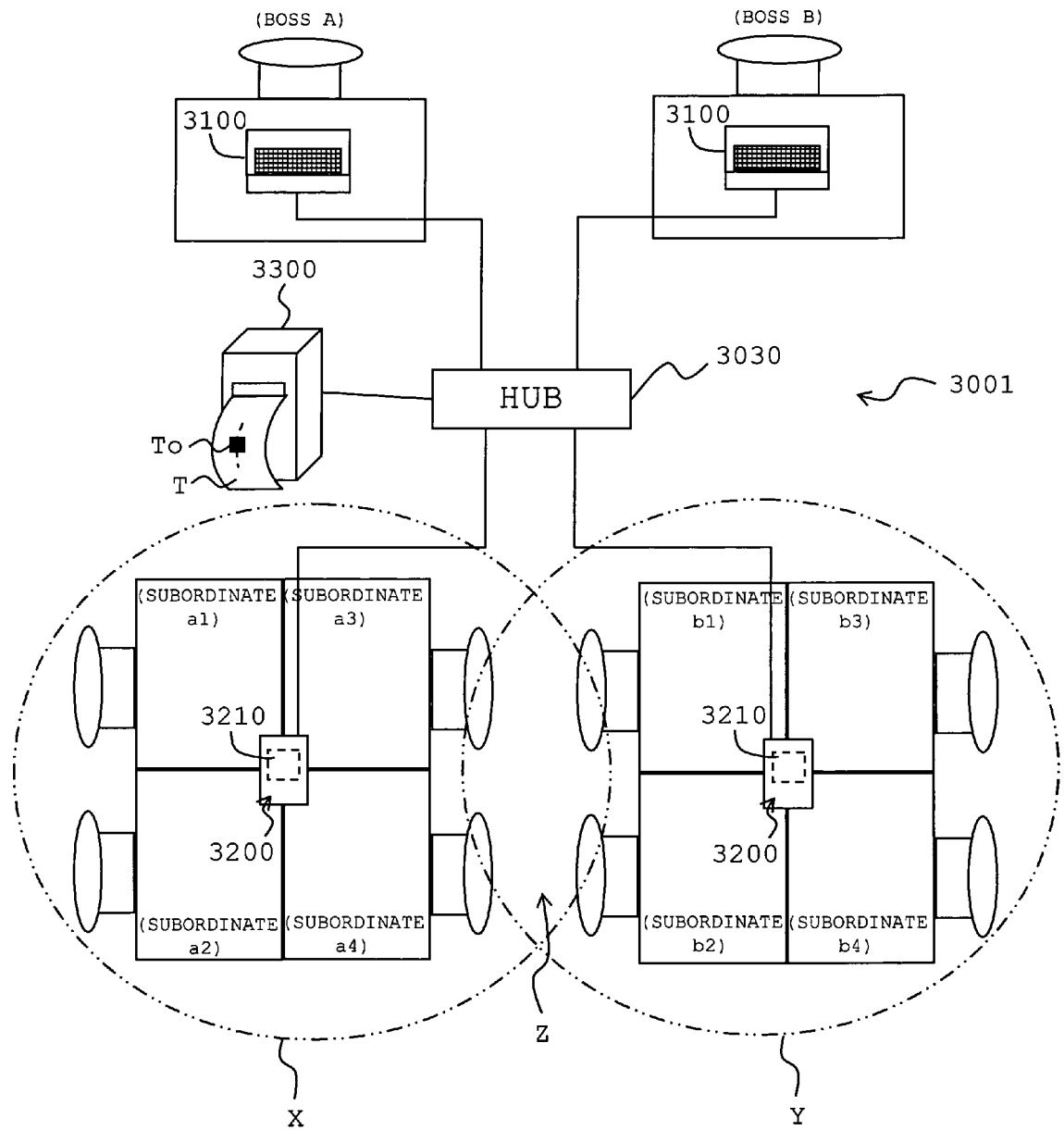
[FIG. 55]

RFID TAG INFORMATION SYSTEM

CROSS-REFERENCE TO RELATED APPLICATION

This is a CIP application PCT/JP2007/72858, filed Nov. 27, 2007, which was not published under PCT article 21(2) in English and claims the benefits of Japanese Patent application No. 2006-320606 filed Nov. 28, 2006, No. 2006-320607 filed Nov. 28, 2006, and No. 2006-321384 filed Nov. 29, 2006.

BACKGROUND OF THE INVENTION

1. Field of the Invention

The present invention relates to a RFID tag information system configured to carry out information transmission/reception with a RFID circuit element that carries out radio communication of information with an outside.

2. Description of the Related Art

A RFID (Radio Frequency Identification) system configured to read/write information contactlessly between a small-sized RFID tag and a reader (reading device)/writer (writing device) is known. A RFID circuit element provided at a label-shaped RFID tag is, for example, provided with an IC circuit part storing predetermined RFID tag information and an antenna connected to the IC circuit part for carrying out information transmission/reception. If a transmission wave is transmitted to a RFID circuit element from the antenna of the reader as an interrogator, the RFID circuit element transmits a reply using energy in a radio wave of the transmission wave. Prior arts that read out information from the RFID circuit element using such a reader include the one described in JP, A, 2005-298100, for example.

This prior art connects an operation terminal (PC) and a reader, and reads and gets information of a file or stored information of the RFID circuit element held by a human through the reader by a predetermined operation at the operation terminal.

On the other hand, an apparatus for producing RFID labels configured to produce a RFID label by writing RFID tag information in such a RFID circuit element, for example, has been already proposed (See JP, A, 2005-186567, for example). In this prior art, a band-shaped tag tape (base tape) on which RFID circuit elements are provided with a predetermined interval is fed out of a roll of a tape with RFID tags (first roll) and a print-receiving tape fed out of another roll (second roll) is bonded to the tag tape. At this time, predetermined RFID tag information created on the side of the apparatus is transmitted to the RFID circuit element of the tag tape and written in the IC circuit part, a print corresponding to the RFID tag information written in is applied on the print-receiving tape by printing device, and thereby a RFID label with print is produced.

DISCLOSURE OF THE INVENTION

Problem to be Solved by the Invention

In general, a RFID label produced by an apparatus for producing RFID labels as described in JP, A, 2005-186567 is provided in association with a management target (article and the like) by being affixed thereto and the like. Then, the RFID tag information is read out by a reader as described in JP, A, 2005-298100 from the RFID label provided at the product and the like so that information relating to the product is gotten and the product is managed and the like. In order to produce a RFID label and actually carry out product management and the like using the label in this way, both functions of the reader and the apparatus for producing RFID labels are needed.

Here, the reader in the prior art described in the above JP, A, 2005-298100 includes a communication circuit (radio frequency circuit) that generates a transmission signal (information for access) to the RFID circuit element and carries out reception processing and the like of a reply signal (information gotten by the access) from the RFID circuit element and an antenna configured to transmit the transmission signal and to receive the reply signal. The apparatus for producing RFID labels in the prior art described in the above JP, A, 2005-186567 is also provided with a communication circuit (radio frequency circuit) that creates information to be written in (information for access) and an antenna. Therefore, by configuring so that at least relatively expensive communication circuit portion is made common and transmission paths to the above two antennas can be selectively connected to the common communication circuit portion, simplification of equipment configuration and reduction in a cost burden for an operator can be promoted, but prior arts giving consideration to such points have not been present, and convenience is poor.

On the other hand, in general, the RFID tag information read out of the RFID circuit element of the RFID label by the reader is transmitted to a PC terminal, an information server and the like through a network such as LAN from the reader. At this time, if a plurality of PC terminals and servers and the like are connected to the network, there will be a plurality of transmission destinations of the information from the reader (information gotten by access) (in other words, there will be a plurality of transmission paths of gotten information). In this case, the operator needs to manually set the transmission destination of the RFID tag information (in other words, the transmission path) for the reader, which requires labor, and the convenience is poor.

As mentioned above, in the past, the convenience for the operator is poor if there is a plurality of transmission paths for the information relating to access to the RFID circuit element.

SUMMARY OF THE INVENTION

A first object of the present invention is to provide a RFID tag information system that can improve convenience for an operator even if there is a plurality of transmission paths for information relating to access to a RFID circuit element.

A second object of the present invention is to provide a RFID tag information system that can simplify equipment configuration and reduce a cost burden for an operator by making a communication circuit portion common and by selecting a transmission path.

A third object of the present invention is to provide a RFID tag information system that can reduce an operation burden of an operator and improve convenience by setting a transmission path.

BRIEF DESCRIPTION OF THE DRAWING

FIG. 1 is a system configuration diagram illustrating a RFID tag manufacturing system provided with an apparatus for producing RFID labels, which is a first embodiment of the present invention.

FIG. 2 is a perspective view illustrating an entire structure of the apparatus for producing RFID labels.

FIG. 3 is a view illustrating a state in which an antenna unit is placed on a metal face for reading.

Figure 4:
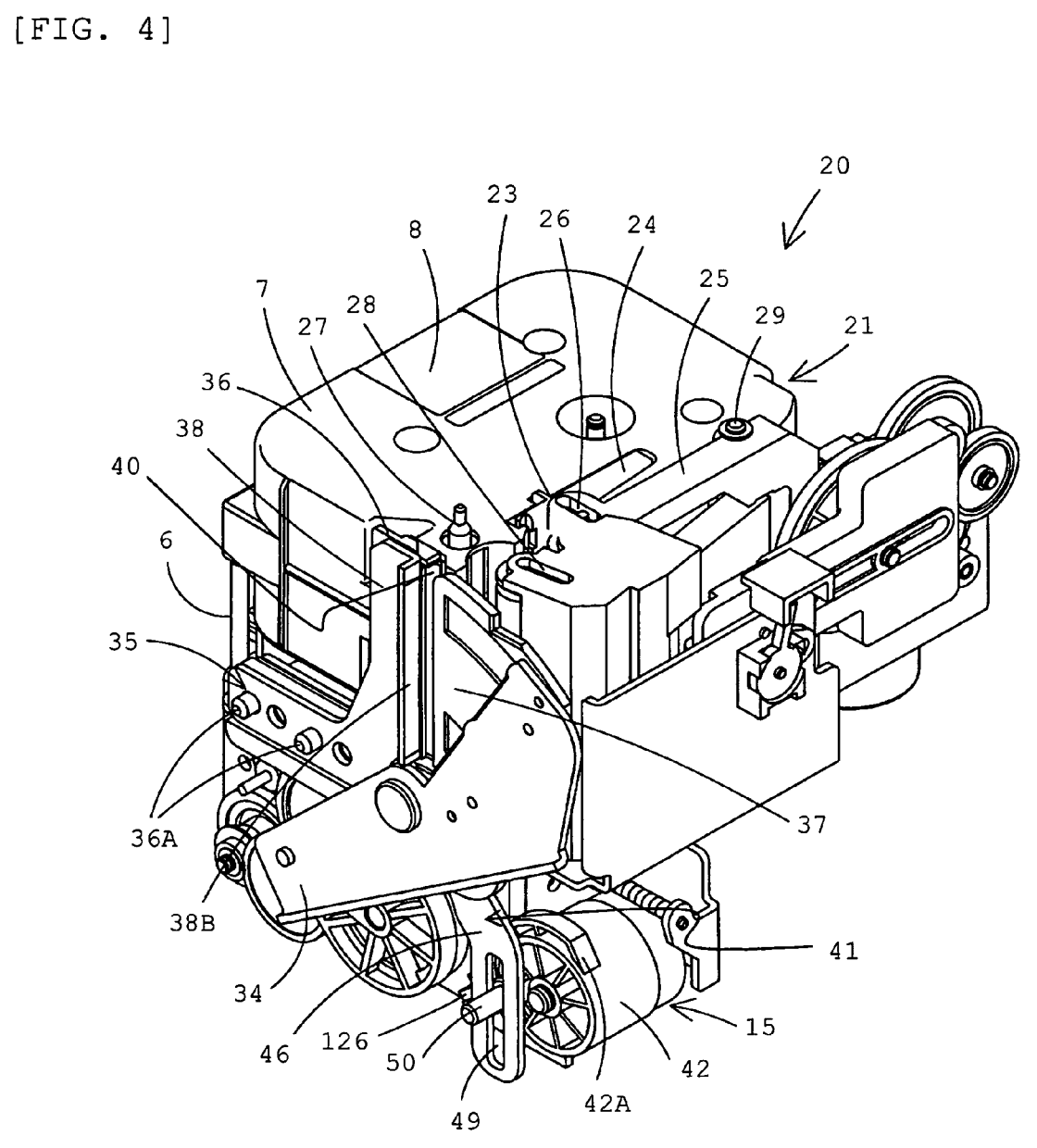

FIG. 4 is a perspective view illustrating a structure of an internal unit inside the apparatus for producing RFID labels.

FIG. 5 is a plan view illustrating a structure of an internal unit inside the apparatus for producing RFID labels.

FIG. 6 is an enlarged plan view schematically illustrating a detailed structure of a cartridge.

FIG. 7 is a functional block diagram illustrating a control system of the apparatus for producing RFID labels, which is a RFID tag information system of the first embodiment of the present invention.

FIG. 8 is a functional block diagram illustrating a functional configuration of the RFID circuit element.

FIGS. 9A and 9B are a top view and a bottom view respectively illustrating an example of an appearance of the RFID label formed by completing information writing on the RFID circuit element and cutting of the tag label tape with print by the apparatus for producing RFID labels.

FIGS. 10A to 10C are a view obtained by rotating the cross sectional view by XA-XA' section in FIG. 9 counterclockwise by 90°, a view obtained by rotating the cross sectional view by XB-XB' section in FIG. 9 counterclockwise by 90°, and a bottom view of the RFID label when a hole substantially penetrating a base tape is drilled by laser machining or the like as an identification mark, respectively.

FIG. 11 is a diagram illustrating an example of a screen displayed on the PC when an access is made to the RFID tag information of the IC circuit part of the RFID circuit element by the apparatus for producing RFID labels.

FIG. 12 is a flowchart illustrating a control procedure executed by a control circuit.

FIG. 13 is a flowchart illustrating a control procedure executed by the control circuit at production of a RFID label.

FIG. 14 is a flowchart illustrating a detailed procedure of Step S200.

FIG. 15 is a flowchart illustrating a detailed procedure of Step S400.

FIG. 16 is a flowchart illustrating a control procedure executed by the control circuit when the apparatus for producing RFID labels is used as a reader.

FIG. 17 is a perspective view illustrating an entire structure of an apparatus for producing RFID labels according to a variation in which a plurality of antenna units is provided.

FIG. 18 is a functional block diagram illustrating a control system.

FIG. 19 is a functional block diagram illustrating a control system of the apparatus for producing RFID labels according to a variation in which impedance matching among a plurality of units is carried out.

FIG. 20 is a circuit diagram illustrating a detailed circuit configuration of a loop antenna of an antenna unit and a detection/matching circuit.

FIG. 21 is a circuit diagram illustrating another example of a detailed circuit configuration of a loop antenna of an antenna unit and a detection/matching circuit.

FIG. 22 is a functional block diagram illustrating a control system of the apparatus for producing RFID labels according to a variation in which a plurality of antenna units carries out simultaneous read-out by time sharing.

FIG. 23 is a circuit diagram illustrating a detailed circuit configuration of the loop antenna of the antenna unit and the detection/matching circuit.

FIG. 24 is an explanatory diagram conceptually illustrating an example of a behavior of the time sharing.

FIG. 25 is a flowchart illustrating a procedure of initialization processing executed by a CPU when the plurality of the antenna units is connected.

FIG. 26 is a flowchart illustrating a detailed procedure of read-out mode processing of Step S300.

FIG. 27 is a flowchart illustrating a detailed procedure of Step S320.

FIG. 28 is a plan view illustrating another example of a structure of an internal unit inside the apparatus for producing RFID labels.

FIG. 29 is a flowchart illustrating a control procedure executed by a control circuit when an apparatus for producing RFID labels in a second embodiment of the present invention is used as a reader.

FIG. 30 is a flowchart illustrating a control procedure executed by the CPU of the control circuit at production of a RFID label.

FIG. 31 is a flowchart illustrating a detailed procedure of interruption read-out processing.

FIG. 32 is a flowchart illustrating a detailed procedure of Step S300 executed by the CPU.

FIG. 33 is a flowchart illustrating a detailed procedure of the interruption read-out processing executed by the CPU.

FIG. 34 is an explanatory diagram conceptually illustrating an example of a behavior of the time sharing.

FIG. 35 is an explanatory diagram conceptually illustrating an example of a behavior of the time sharing in a variation in which first radio communication is carried out with a low frequency during second radio communication.

FIG. 36 is a flowchart illustrating a detailed procedure of Step S400 executed by the CPU.

FIG. 37 is a flowchart illustrating a detailed procedure of the interruption read-out processing executed by the CPU.

FIG. 38 is a system configuration diagram illustrating an entire configuration of the RFID tag information system, which is a RFID tag information system of a third embodiment of the present invention.

FIG. 39 is an entire configuration diagram conceptually illustrating an entire configuration of a reader and an apparatus for producing RFID labels.

FIG. 40 is a functional block diagram illustrating a configuration of a control system of the reader.

FIG. 41 is a functional block diagram illustrating a detailed function of a control circuit of the apparatus for producing RFID labels.

FIG. 42 is a flowchart illustrating a control procedure executed by the control circuit of the apparatus for producing RFID labels when the RFID label for setting is to be produced.

FIG. 43 is a flowchart illustrating a detailed procedure of Step S3200.

FIG. 44 is a diagram conceptually illustrating data contents stored in a memory portion of the IC circuit part in the RFID circuit element provided at the produced RFID label.

FIG. 45 is a flowchart illustrating a control procedure executed by the control circuit of the reader when the RFID tag information is read out by the reader.

FIG. 46 is a flowchart illustrating a control procedure executed by the control circuit of the apparatus for producing RFID labels when the RFID tag information is received from the reader.

FIG. 47 is a flowchart illustrating a detailed procedure of Step S3400.

FIG. 48 is a diagram for explaining an example of information sorting.

FIG. 49 is a flowchart illustrating a control procedure executed by the control circuit of the reader in a variation in which information read-out is carried out by the reader with a plurality of types of transmission outputs.

FIG. 50 is a flowchart illustrating a control procedure executed by the control circuit of the apparatus for producing RFID labels when the RFID tag information is received from the reader in a variation in which information read-out is carried out by the reader with a plurality of types of transmission outputs.

FIG. 51 is a flowchart illustrating a detailed procedure of Step S3400A.

FIG. 52 is a diagram for explaining an example of information sorting in a variation in which information read-out is carried out by the reader with a plurality of types of transmission outputs.

FIG. 53 is a flowchart illustrating a control procedure executed by the control circuit of the reader in a variation in which the reader has a setting mode and a general mode of information transmission destination.

FIG. 54 is a flowchart illustrating a detailed procedure of Step S3600.

FIG. 55 is a system configuration diagram illustrating an entire configuration of the RFID tag information reading system in a variation used for attendance management of a plurality of employees.

DETAILED DESCRIPTION OF THE PREFERRED EMBODIMENTS

Embodiments of the present invention will be described below referring to the attached drawings.

A first embodiment of the present invention will be described referring to FIGS. 1 to 16.

FIG. 1 is a system configuration diagram illustrating a RFID tag manufacturing system provided with an apparatus for producing RFID labels, which is a RFID tag information system of the first embodiment.

In a RFID tag manufacturing system TS shown in FIG. 1, an apparatus 1 for producing RFID labels is connected to a route server RS, a plurality of information servers IS, a terminal 118a, and a general-purpose computer 118b through a wired or radio communication line NW. The terminal 118a and the general-purpose computer 118b are collectively referred to simply as "PC 118" below as appropriate.

FIG. 2 is a perspective view illustrating an entire structure of the apparatus 1 for producing RFID labels. In FIG. 2, the apparatus 1 for producing RFID labels produces a RFID label with print in the apparatus on the basis of an operation from the PC 118. The apparatus 1 for producing RFID labels has an apparatus main body 2 having a substantially hexagonal (substantially cubic) housing 200 on the outline and an opening/closing lid (lid body) 3 provided on an upper face (upper part) of the apparatus main body 2, capable of being opened/closed (or may be detachably).

The housing 200 of the apparatus main body 2 comprises a front wall 10 located at the apparatus front side (left front side in FIG. 2) and provided with a label carry-out exit (carry-out exit) 11 configured to discharge a RFID label T (which will be described later) produced inside the apparatus main body 2 to the outside and a front lid 12 provided below the label carry-out exit 11 in the front wall 10 and having its lower end rotatably supported.

The front lid 12 includes a pusher portion 13, and the front lid 12 is opened forward by pushing in the pusher portion 13 from above. Below an opening/closing button 4 in the front wall 10, a power button 14 configured to power on/off the apparatus 1 for producing RFID labels is provided. Below the power button 14, a cutter driving button 16 configured to drive a cutting mechanism 15 disposed in the apparatus main body 2 through manual operation by a user is provided, and by pushing this button 16, a tag label tape 109 with print (See FIG. 4, which will be described later) is cut to a desired length so as to produce the RFID label T.

The opening/closing lid 3 is pivotally and rotatably supported at an end portion on the right depth side in FIG. 2 of the apparatus main body 2 and urged in an opening direction all the time through an urging member such as a spring. When the opening/closing button 4 arranged adjacent to the opening/closing lid 3 on the upper face of the apparatus main body 2 is pushed down, lock between the opening/closing lid 3 and the apparatus main body 2 is released, and the lid is opened by an action of the urging member. At the center side portion of the opening/closing lid 3, a see-through window 5 covered by a transparent cover is provided.

At this time, an antenna unit 9 is connected to the apparatus main body 2 through a cable 223. The antenna unit 9 can be used as a portable antenna for reading out RFID tag information through radio communication (first radio communication) from a RFID label (provided with a RFID circuit element To. Details will be described later) outside the apparatus main body 2.

That is, the antenna unit 9 includes a loop antenna LC1 (unit antenna, transmission/reception antenna; shown conceptually by a virtual line in FIG. 2) configured to carry out radio communication with the RFID circuit element To (details will be described later) as a first RFID circuit element in a housing 202. The housing 202 is substantially in a rectangular solid shape in this example and has one end of the cable 223 connected and fixed to an upper part thereof, while the other end is connected to a connection port 224 (connection portion) provided on an upper side portion of the housing 200 of the apparatus main body 2 capable of being removed as mentioned above.

The cable 232 electrically connects the antenna unit 9 and the apparatus main body 2 to each other, and a signal is transmitted/received between a transmission circuit 306 (information creating device, access information processing device) and a receiving circuit 307 of the apparatus main body 2 and a loop antenna (unit antenna) LC1 of the antenna unit 9 through an antenna sharing device 240 via the cable 223 (See FIG. 7, which will be described later). The loop antenna LC1 is disposed close to the side of a side face 202a in the housing 202 and is configured to make an access (for information reading or information writing) to the RFID circuit element To by magnetic induction (including electromagnetic induction, magnetic coupling and other non-contact methods through an electromagnetic field). On a side face 202b and a side face 202c on the side opposite thereto of the housing 202, a grasping portion 234 for an operator to grasp the housing 202 is provided at an appropriate position. As a result, grasping performance when the operator uses the antenna unit 9 as a portable antenna can be improved.

Also, the antenna unit 9 has a plate-state magnetic body 236 on one side thereof (in more detail, on the side of the side face 202a of the housing 202). Preferably, a shield plate 237 made of metal is affixed to the outside of the magnetic body 236. As a result, as shown in FIG. 3, when the antenna unit 9 is placed at a predetermined spot for reading of the RFID label T, even if the antenna is placed on a metal surface (or the surface where metal is present nearby) MT, by placing the antenna with the magnetic body 236 downward on the spot, the magnetic body layer can be interposed between the RFID label T and the metal surface MT. As a result, generation of a magnetic path between the metal surface MT and the RFID label T, which causes communication failure, can be prevented in advance, and thus smoothness/reliability of the communication can be ensured. Also, by further providing the shield plate 237 on the end portion side (metal surface MT side) at this time, occurrence of the communication failure between the metal surface MT on which the antenna unit 9 is placed and the RFID label T can be prevented more surely.

FIG. 4 is a perspective view illustrating a structure of an internal unit 20 inside the apparatus 1 for producing RFID labels (however, a loop antenna LC2, which will be described later, is omitted). In FIG. 4, the internal unit 20 generally comprises a cartridge holder 6 configured to accommodate a cartridge (cartridge for including at least a RFID tag) 7, a printing mechanism 21 provided with a print head (printing device) 23, which is a so-called thermal head, the cutting mechanism (cutting device) 15 provided with a fixed blade 40 and a movable blade 41, and a half cut unit 35 (half cutting device) provided with a half cutter 34 located on a downstream side in a tape feeding direction of the fixed blade 40 and the movable blade 41.

On the top face of the cartridge 7, a tape identification display portion 8 displaying tape width, tape color and the like of the base tape 101 built in the cartridge 7, for example, is provided. Also, in the cartridge holder 6, a roller holder 25 is pivotally supported rotatably by a support shaft 29 so that switching can be made between a printing position (contact position, see FIG. 5, which will be described later) and a release position (separated position) by a switching mechanism. At this roller holder 25, a platen roller 26 and a tape pressure roller 28 are rotatably disposed, and when the roller holder 25 is switched to the printing position, the platen roller 26 and the tape pressure roller 28 are pressed onto the print head 23 and a feeding roller 27.

The print head 23 includes a large number of heater elements and is mounted to a head mounting portion 24 installed upright on the cartridge holder 6.

The cutting mechanism 15 includes the fixed blade 40 and the movable blade 41 constructed by a metal member. A driving force of a cutter motor 43 (see FIG. 7, which will be described later) is transmitted to a shank portion 46 of the movable blade 41 through a cutter helical gear 42, a boss 50, and a long hole 49 so as to rotate the movable blade and to carry out a cutting operation together with the fixed blade 40. This cutting state is detected by a micro switch 126 switched by an action of a cutter helical gear cam 42A.

In the half cut unit 35, a cradle 38 is arranged opposite the half cutter 34, and a first guide portion 36 and a second guide portion 37 are mounted to a side plate 44 (see FIG. 5, which will be described later) by a guide fixing portion 36A. The half cutter 34 is rotated by a driving force of a half-cutter motor 129 (see FIG. 7, which will be described later) around a predetermined rotating fulcrum (not shown). On the end portion of the cradle 38, a receiving face 38B is formed.

FIG. 5 is a plan view illustrating the structure of the internal unit 20 shown in FIG. 4. In FIG. 5, the cartridge holder 6 stores the cartridge 7 so that the direction in the width direction of the tag label tape 109 with print discharged from a tape discharge portion 30 of the cartridge 7 and further discharged from the label carry-out exit 11 should be perpendicular in the vertical direction.

In the internal unit 20, a label discharge mechanism 22 and a loop antenna LC2 (apparatus antenna, transmission/reception antenna) are provided.

The label discharge mechanism 22 discharges the tag label tape 109 with print after being cut in the cutting mechanism 15 (in other words, the RFID label T, the same applies to the following) from the label carry-out exit 11 (See FIG. 2). That is, the label discharge mechanism 22 comprises a driving roller 51 rotated by a driving force of a tape discharge motor 123 (See FIG. 7, which will be described later), a pressure roller 52 opposed to the driving roller 51 with the tag label tape 109 with print between them, and a mark sensor 127 (detecting device) that detects an identifier PM (See FIG. 6, which will be described later) provided on the tag label tape 109 with print. At this time, first guide walls 55, 56 and second guide walls 63, 64 that guide the tag label tape 109 with print to the label carry-out exit 11 are provided inside the label carry-out exit 11. The first guide walls 55, 56 and the second guide walls 63, 64 are integrally formed, respectively, and arranged at the discharge position of the tag label tape 109 with print (RFID label T) cut by the fixed blade 40 and the movable blade 41 so that they are separated from each other with a predetermined interval.

The loop antenna LC2 is arranged in the vicinity of the pressure roller 52 while the pressure roller 52 is located at the center in the radial direction and makes an access (information reading or information writing) via radio communication to a RFID circuit element To provided at the base tape 101 (tag label tape 109 with print after being bonded, the same applies to the following) by magnetic induction (including electromagnetic induction, magnetic coupling and other non-contact methods through a magnetic field).

In the above reading or writing, a correspondence relation between the tag ID of the RFID circuit element To of the produced RFID label T and the information read out of its IC circuit part 151 (or information written in the IC circuit part 151) is stored in the above-mentioned route server RS and can be referred to as necessary.

The feeding roller driving shaft (feeding device) 108 and a ribbon take-up roller driving shaft 107 give a feeding drive force of the tag label tape 109 with print and an ink ribbon 105 (which will be described later), respectively, and are rotated and driven in conjunction with each other.

FIG. 6 is an enlarged plan view schematically illustrating a detailed structure of the cartridge 7. The cartridge 7 has a housing 7A, a first roll 102 (actually, it is wound in a swirl state but shown concentrically in the figure for simplification) arranged inside the housing 7A and around which the base tape 101 (tag medium) in the band state is wound, a second roll 104 (actually, it is wound in a swirl state but shown concentrically in the figure for simplification) around which a transparent cover film 103 (print-receiving medium layer) having substantially the same width as that of the base tape 101 is wound, a ribbon-supply-side roll 211 that feeds out the ink ribbon 105 (thermal transfer ribbon, however, it is not needed when the print-receiving tape is a thermal tape), the ribbon take-up roller 106 for winding up the ribbon 105 after printing, the feeding roller 27 (bonding device) rotatably supported in the vicinity of the tape discharge portion 30 of the cartridge 7, and a guide roller 112 functioning as feeding position regulating means.

The feeding roller 27 presses and bonds the base tape 101 and the cover film 103 together so as to produce the tag label tape 109 with print and feeds the tape in a direction shown by an arrow A in FIG. 6 (also functioning as a tape feeding roller).

In the first roll 102, the base tape 101 in which a plurality of RFID circuit elements To is sequentially formed in the longitudinal direction with a predetermined equal interval is wound around a reel member 102a. The base tape 101 has a four-layered structure (See the partially enlarged view in FIG. 6) in this example and is constructed in lamination in the order of an adhesive layer 101a made of an appropriate adhesive, a colored base film 101b (base layer) made of PET (polyethylene terephthalate) and the like, an adhesive layer 101c (affixing adhesive layer) made of an appropriate adhesive, and a separation sheet 101d (separation material layer) from the side wound inside (right side in FIG. 6) toward the opposite side (left side in FIG. 6).

On the back side of the base film 101b (left side in FIG. 6), a loop antenna 152 (tag loop antenna) constructed in the loop-coil shape for transmission/reception of information is provided integrally in this embodiment, the IC circuit part 151 connected to it and storing information is formed, and the RFID circuit element To is comprised by them.

On the front side of the base film 101b (right side in FIG. 6), the adhesive layer 101a that bonds the cover film 103 later is formed, while on the back side of the base film 101b (left side in FIG. 6), the separation sheet 101d is bonded to the base film 101b by the adhesive layer 101c provided so as to include the RFID circuit element To.

When the RFID label T finally completed in the label state is to be affixed to a predetermined article or the like, the separation sheet 101d enables adhesion to the article or the like by the adhesive layer 101c through separation of the separation sheet. Also, on the surface of the separation sheet 101d, at a predetermined position (in this embodiment, a position on the further front from the tip end of the loop antenna 152 in the front in the feeding direction) corresponding to each RFID circuit element To, a predetermined identifier PM for feeding control (an identifier painted in black in this embodiment. Alternatively, it may be a drilled hole penetrating the base tape 101 by laser machining or the like or it may be a Thomson type machined hole or the like. See FIG. 10C, which will be described later) is provided in advance.

The second roll 104 has the cover film 103 wound around a reel member 104a. In the cover film 103 fed out of the second roll 104, the ribbon 105 arranged on its back face side (that is, the side to be bonded to the base tape 101) and driven by the ribbon-supply-side roll 211 and the ribbon take-up roller 106 is brought into contact with the back face of the cover film 103 by being pressed by the print head 23.

The ribbon take-up roller 106 and the feeding roller 27 are rotated and driven, respectively, in conjunction by a driving force of a feeding motor 119 (See FIG. 4 and FIG. 7, which will be described later), which is a pulse motor, for example, provided outside the cartridge 7, transmitted to the ribbon take-up roller driving shaft 107 and the feeding roller driving shaft 108 through a gear mechanism, not shown. The print head 23 is arranged on the upstream side in the feeding direction of the cover film 103 than the feeding roller 27.

In the above construction, the base tape 101 fed out of the first roll 102 is supplied to the feeding roller 27. On the other hand, as for the cover film 103 fed out of the second roll 104, the ink ribbon 105 arranged on its back face side (that is, the side bonded to the base tape 101) and driven by the ribbon-supply-side roll 211 and the ribbon take-up roller 106 is pressed by the print head 23 and brought into contact with the back face of the cover film 103.

When the cartridge 7 is attached to the cartridge holder 6 and the roller holder 25 is moved from the release position to the print position, the cover film 103 and the ink ribbon 105 are held between the print head 23 and the platen roller 26, and the base tape 101 and the cover film 103 are held between the feeding roller 27 and the tape pressure roller 28. Then, the ribbon take-up roller 106 and the feeding roller 27 are rotated and driven by the driving force of the feeding motor 119 in a direction shown by an arrow B and an arrow C in FIG. 6, respectively, in synchronization with each other. At this time, the feeding roller driving shaft 108, the tape pressure roller 28 and the platen roller 26 are connected through the gear mechanism (not shown), and with the driving of the feeding roller driving shaft 108, the feeding roller 27, the tape pressure roller 28, and the platen roller 26 are rotated, and the base tape 101 is fed out of the first roll 102 and supplied to the feeding roller 27 as mentioned above. On the other hand, the cover film 103 is fed out of the second roll 104, and the plurality of heater elements of the print head 23 are electrified by a print-head driving circuit 120 (See FIG. 7, which will be described later). As a result, print R (tag print. See FIG. 9, which will be described later) corresponding to the RFID circuit element To on the base tape 101 to become the affixing target is printed on the back face of the cover film 103. Then, the base tape 101 and the cover film 103 on which the printing has been finished are bonded together by the feeding roller 27 and the tape pressure roller 28 to be integrated and formed as the tag label tape 109 with print and fed out of the cartridge 7 through the tape discharge portion 30 (See FIG. 5). The ink ribbon 105 finished with printing on the cover film 103 is taken up by the ribbon take-up roller 106 by driving of the ribbon take-up roller driving shaft 107.

After the information reading or writing is carried out with respect to the RFID circuit element To by the loop antenna LC2 on the tag label tape 109 with print produced by affixing as above, the tag label tape 109 with print is cut by the cutting mechanism 15 automatically or by manually operating the cutter driving button 16 (See FIG. 2) so as to produce the RFID label T. The RFID label T is further discharged from the label carry-out exit 11 (See FIGS. 2, 5) by the label discharge mechanism 22.

FIG. 7 is a functional block diagram illustrating a control system of the apparatus 1 for producing RFID labels in this embodiment. In FIG. 7, a control circuit 110 is located on a control board (not shown) of the apparatus 1 for producing RFID labels.

In the control circuit 110, a CPU 111 that includes a timer 111A inside and controls each equipment, an input/output interface 113 connected to the CPU 111 through a data bus 112, a CGROM 114, a ROM 115, 116, and a RAM 117 are provided.

In the ROM 116, a print driving control program for driving the print head 23, the feeding motor 119, and a tape discharge motor 65 by reading out data of a print buffer in correspondence with a code data of characters, such as letters and numerals input from the PC 118, a cutting driving control program for feeding the tag label tape 109 with print to the cut position by driving the feeding motor 119 when printing is finished and cutting the tag label tape 109 with print by driving the cutter motor 43, a tape discharge program for forcedly discharging the tag label tape 109 with print which has been cut (=RFID label T) from the label carry-out exit 11 by driving the tape discharge motor 65, a transmission program for generating access information such as an inquiry signal and a writing signal to the RFID circuit element To and outputting it to a transmission circuit 306, a receiving program for processing a response signal and the like input from a receiving circuit 307, and other various programs required for control of the apparatus 1 for producing RFID labels are stored. The CPU 111 executes various calculations on the basis of the various programs stored in the ROM 116.

In the RAM 117, a text memory 117A, a print buffer 117B, a parameter storage area 117E and the like are provided. In the text memory 117A, document data input from the PC 118 is stored. In the print buffer 117B, the dot patterns for print such as a plurality of characters and symbols and applied pulse number, which is a forming energy amount of each dot, are stored as the dot pattern data, and the print head 23 carries out dot printing according to the dot pattern data stored in this print buffer 117B. In the parameter storage area 117E, various calculation data, tag identification information (tag ID) of the RFID circuit element To when information reading (acquisition) is carried out and the like are stored.

To the input/output interface 113, the PC 118, the printhead driving circuit 120 that drives the print head 23, a feeding motor driving circuit 121 that drives the feeding motor 119, a cutter motor driving circuit 122 that drives the cutter motor 43, a half-cutter motor driving circuit 128 that drives a half-cutter motor 129, a tape discharge motor driving circuit 123 that drives the tape discharge motor 65, a solenoid driving circuit 215 that drives a solenoid 210, the mark sensor 127 that detects the identification mark PM, the transmission circuit 306 that generates a carrier wave and outputs an interrogation wave (transmission signal) obtained by modulating the carrier wave on the basis of the input control signal for information transmission/reception with the RFID circuit element To through the loop antenna LC1 in the antenna unit 9, and the receiving circuit 307 that demodulates and outputs a response signal received from the RFID circuit element To through the loop antenna LC1 are connected, respectively.

The transmission circuit 306 and the receiving circuit 307 are selectively connected to the loop antenna LC2 on the side of the apparatus main body 2 or the loop antenna LC1 on the side of the antenna unit 9 through the antenna sharing device 240 and a switching circuit 239 switched by a control signal from the control circuit 110. That is, if there is no label production instruction (in detail, a label production instruction from the PC 118 as will be described later) from the operator, the control circuit 110 switches to a read-out mode, and the switching circuit 239 is switched so that the antenna sharing device 240 and the loop antenna LC1 of the antenna unit 9 are connected. Also, wiring connecting the loop antenna LC1 on the side of the antenna unit 9 and the antenna sharing device 240 on the side of the apparatus main body 2, respectively, are bundled so as to constitute the cable 223.

The control circuit 110 is configured to be switched to the read-out mode in which the antenna unit 9 and the apparatus 1 for producing RFID labels function as readers during a usual time when there is no label production instruction and to the writing mode for producing the RFID label when the label production instruction is given as mentioned above. On the other hand, if the label production instruction is given, the mode is switched to the writing mode for producing the RFID label, and the switching circuit 239 is also switched so as to connect the antenna sharing device 240 and the loop antenna LC2. That is, the writing mode is given priority over the read-out mode.

Instead of the mode switching according to presence/absence of the label production instruction, it may be so configured that an attachment sensor that detects if the cable 223 of the antenna unit 9 is connected (attached) to the connection port 224 as the connection portion is provided and the mode is switched to the read-out mode or the writing mode on the basis of a detection signal from the attachment sensor. The attachment sensor may be so configured that an attachment state between the apparatus main body 2 and the antenna unit 9 is detected by detecting a current flowing when the cable 223 is connected to the connection port 224 of the apparatus main body 2 and electrified, for example. Alternatively, a limit switch or a micro switch and the like may be used as the attachment sensor.

If character data and the like is input through the PC 118 in the writing mode, for example, the text (document data) is sequentially stored in the text memory 117A and also the print head 23 is driven through the driving circuit 120, each heater element is selectively heated and driven in response to a print dot for one line so as to print dot pattern data stored in the print buffer 117B, and the feeding motor 119 carries out feeding control of the tape through the driving circuit 121 in synchronization. Also, the transmission circuit 306 carries out modulation control of the carrier wave on the basis of the control signal from the control circuit 110, and the receiving circuit 307 carries out processing of a signal demodulated on the basis of the control signal from the control circuit 110.

FIG. 8 is a functional block diagram illustrating a functional configuration of the RFID circuit element To. In FIG. 8, the RFID circuit element To has the loop antenna 152 that carries out transmission/reception of a signal contactlessly using magnetic induction with the loop antenna LC2 on the side of the apparatus 1 for producing RFID labels and the IC circuit part 151 connected to the loop antenna 152.

The IC circuit part 151 includes a rectification part 153 that rectifies the interrogation wave received by the loop antenna 152, a power source part 154 that accumulates energy of the interrogation wave rectified by the rectification part 153 to make it a driving power source, a clock extraction part 156 that extracts a clock signal from the interrogation wave received by the loop antenna 152 and supplies it to a control part 155, a memory part 157 that can store predetermined information signals, a modem part 158 connected to the loop antenna 152, and the control part 155 that controls operation of the RFID circuit element To through the memory part 157, the clock extraction part 156, the modem part 158 and the like.

The modem part 158 demodulates a communication signal from the loop antenna LC2 of the apparatus 1 for producing RFID labels received by the loop antenna 152 and modulates a reply signal from the control part 155 and transmits it as a response wave (a signal including the tag ID) from the loop antenna 152.

The clock extraction part 156 extracts a clock component from the received signal and extracts the clock to the control part 155 and supplies a clock corresponding to a frequency of the clock component of the received signal to the control part 155.

The control part 155 interprets a received signal demodulated by the modem part 158, generates a reply signal on the basis of the information signal stored in the memory part 157, and executes basic control such as control to reply from the loop antenna 152 by the modem part 158 and the like.

FIGS. 9A and 9B are views illustrating an example of an appearance of the RFID label T formed by completing information writing of the RFID circuit element To and cutting of the tag label tape 109 with print by the apparatus 1 for producing RFID labels configured as above, in which FIG. 9A is a top view, and FIG. 9B is a bottom view. Also, FIG. 10A is a view obtained by rotating the cross sectional view by XA-XA' section in FIG. 9 counterclockwise by 90°, and FIG. 10B is a view obtained by rotating the cross sectional view by XB-XB' section in FIG. 9 counterclockwise by 90°.

In FIGS. 9A, 9B, 10A, and 10B, the RFID label T is in the five-layered structure in which the cover film 103 is added to the four-layered structure shown in FIG. 6 as mentioned above, and the five layers comprise the cover film 103, the adhesive layer 101a, the base film 101b, the adhesive layer 101c, and the separation sheet 101d from the side of the cover film 103 (upper side in FIG. 10) to the opposite side (lower side in FIG. 10). Then, the RFID circuit element To including the loop antenna 152 provided on the back side of the base film 101b as mentioned above is provided in the base film 101b and the adhesive layer 101c, and a label print R (characters of "RF-ID" indicating a type of the RFID label T in this example) corresponding to stored information or the like of the RFID circuit element To is printed on the back face of the cover film 103.

On the cover film 103, the adhesive layer 101a, the base film 101b, and the adhesive layer 101c, a half-cut line HC (half-cut portion. However, two lines of a front half-cut line HC1 and a rear half-cut line HC2 in this example) is formed by the half cutter 34 substantially along the tape width direction as mentioned above. In the cover film 103, a region held between the half-cut lines HC1, HC2 becomes a print region S on which the label print R is to be printed, and a region on both sides in the tape longitudinal direction having the half-cut lines HC1, HC2 between them from the print region S becomes a front margin region S1 and a rear margin region S2, respectively. In other words, the front and rear margin regions S1, S2 and the print region S of the cover film 103 are separated by the half-cut lines HC1, HC2.

As mentioned above, instead of providing marking painted in black as shown in FIGS. 10A and 10B as the identification mark PM, a hole substantially penetrating the base tape 101 may be drilled by punching by a Thomson die or Victoria die or laser machining or the like as the identification mark PM as shown in FIG. 10C. In this case, if the mark sensor 127 is constituted by a publicly known reflective-type photoelectric sensor made of an optical projector and an optical receiver, when the identification mark PM made of the above hole comes to a position between the optical projector and the optical receiver, light from the optical projector is transmitted through the hole of the identification mark PM and the transparent cover film 103 and is not reflected or received by the optical receiver, and thereby a control output from the optical receiver is reversed.

FIG. 11 is a diagram illustrating an example of a screen displayed on the PC 118 (the terminal 118a or the general-purpose computer 118b) when an access is made to the RFID tag information of the IC circuit part 151 (information writing in this example) in the RFID circuit element To by the apparatus 1 for producing RFID labels as mentioned above.

In FIG. 11, in this example, a type of the RFID label (access frequency and tape dimension), the print characters R printed in response to the RFID circuit element To, an access (writing in this example) ID, which is identification information (tag ID) specific to the RFID circuit element To, an address of article information stored in the information server IS, storage destination address of the corresponding information in the route server RS and the like can be displayed on the PC 118. The apparatus 1 for producing RFID labels is operated by the operation of the PC 118 and the print characters R are printed on the cover film 103, and the information such as the writing ID and article information are written in the IC circuit part 151.

In the writing as above, a correspondence relation between the tag ID of the RFID circuit element To of the produced RFID label T and the information written in the IC circuit part 151 of the RFID label T is stored in the above-mentioned route server RS so that it can be referred to as necessary.

In the apparatus 1 for producing RFID labels with the basic configuration as above, after the information writing in the RFID circuit element To is carried out by the loop antenna LC2 to the tag label tape 109 with print produced by affixing in the writing mode, the tag label tape 109 with print is cut out by the cutting mechanism 15 so as to produce the RFID label T.

FIG. 12 is a flowchart illustrating a control procedure executed by the control circuit 110. This flow is started when the apparatus 1 for producing RFID labels is powered on, for example.

In FIG. 12, first, at Step S1, it is determined if a label production instruction has been input from the PC 118 through the input/output interface 113 or not. If there is a label production instruction input, the determination at Step S1 is satisfied, the routine goes onto writing mode processing at Step S100, while if there is no label production instruction, the determination at Step S1 is not satisfied, and the routine goes to read-out mode processing at Step S300 (mode switching portion, selection processing portion).

The writing mode processing is an operation mode when the RFID label T is to be produced by transmitting the RFID tag information to the RFID circuit element To and carrying out writing in the IC circuit part 151 in the apparatus 1 for producing RFID labels (See FIG. 15, which will be described later) (including a case in which the RFID tag information is read out from a read-only RFID circuit element To non-rewritably storing and holding predetermined RFID tag information in advance while a print corresponding to that is carried out so as to produce a RFID label T in a variation using the read-only RFID circuit element To as a second RFID circuit element, which will be described later). The read-out mode processing is an operation mode in which the apparatus 1 for producing RFID labels is used as a reader for reading the RFID tag information from the RFID circuit element To provided at the RFID label T outside the producing apparatus and the like.

When Step S100 or Step S300 has been executed, this flow is finished.

FIG. 13 is a flowchart illustrating a detailed procedure of the writing mode processing at Step S100.

First, at Step S103, a control signal is output to the switching circuit 239 so as to switch the switching circuit 239, and the antenna sharing device 240 and the loop antenna LC2 are connected. Subsequently, at Step S105, on the basis of an operation signal from the PC 118, preparation processing of setting of printing data, communication data with the RFID circuit element To, front/rear half-cut position, full cut position and the like is executed.

Subsequently, at Step S110, during communication from the loop antenna LC2 to the RFID circuit element To, variables M, N for counting the number of times (access retry times) of communication retries when there is no response from the RFID circuit element To and a flag F indicating if the communication was successful or not are initialized.

After that, the routine goes to Step S115, where a control signal is output to the feeding motor driving circuit 121 through the input/output interface 113 so as to rotate and drive the feeding roller 27 and the ribbon take-up roller 106 by a driving force of the feeding motor 119. Moreover, a control signal is output to the tape discharge motor 65 through a tape discharge motor driving circuit 123 so as to rotate and drive the driving roller 51. AS a result, the base tape 101 is fed out of the first roll 102 and supplied to the feeding roller 27, while the cover film 103 is fed out of the second roll 104 at the same time, and the base tape 101 and the cover film 103 are bonded by the feeding roller 27 and the sub roller 109 to be integrated and formed as the tag label tape 109 with print and fed in a direction outside the cartridge 7 and further outside the apparatus 1 for producing RFID labels.

After that, at Step S120, on the basis of the detection signal of the mark detection sensor 127 input through the input/output interface 113, it is determined if the identifier PM of the base tape 101 has been detected or not (in other words, if the cover film 103 has reached a printing start position by the print head 23 or not). The determination is not satisfied till the identifier PM is detected and this procedure is repeated, and if detected, the determination is satisfied, and the routine goes to the subsequent Step S125.

At Step S125, a control signal is output to the print-head driving circuit 120 through the input/output interface 113, the print head 23 is electrified, and printing of the label print R such as the characters, symbols and barcodes corresponding to the printing data created at Step S105 is started on the above-mentioned print region S (=region to be affixed substantially on the back face of the RFID circuit element To arranged with an equal interval at a predetermined pitch on the base tape 101) in the cover film 103.

After that, at Step S130, it is determined if the tag label tape 109 with print has been fed to a front half-cut position set at the previous Step S105 or not (in other words, if the tag label tape 109 with print has reached a position where the half cutter 34 of the half-cut mechanism 35 is opposed to a front half-cut line HC1 set at Step S1 or not). The determination at this time can be made by detecting a feeding distance after the identifier PM of the base tape 101 is detected by a predetermined known method at Step S120 (by counting the number of pulses output by the feeding motor driving circuit 121 driving the feeding motor 119, which is a pulse motor, and the like). The determination is not satisfied till the front half-cut position is reached and this procedure is repeated, and if reached, the determination is satisfied, and the routine goes to the subsequent Step S135.

At Step S135, a control signal is output to the feeding motor driving circuit 121 and the tape discharge motor driving circuit 123 through the input/output interface 113 so as to stop driving of the feeding motor 119 and the tape discharge motor 65 and to stop rotation of the feeding roller 27, the ribbon take-up roller 106, and the driving roller 51. As a result, while the tag label tape 109 with print fed out of the cartridge 7 is moved in the discharge direction, in a state where the half cutter 34 of the half-cut mechanism 35 is opposed to the front half-cut line HC1 set at Step S105, feeding-out of the base tape 101 from the first roll 102, feeding-out of the cover film 103 from the second roll 104, and feeding of the tag label tape 109 with print are stopped. At this time, a control signal is also output to the print-head driving circuit 120 through the input/output interface 113 so as to stop applying current to the print head 23 and to stop the printing of the label print R (printing interrupted).

After that, at Step S140, a control signal is output to the half-cutter motor driving circuit 128 through the input/output interface 113 so as to drive the half-cutter motor 129, to rotate the half cutter 34, and to carry out the front half-cut processing of cutting off the cover film 103, the adhesive layer 101a, the base film 101b, and the adhesive layer 101c of the tag label tape 109 with print so as to form the front half-cut line HC1.

Then, the routine goes to Step S145, where the feeding roller 27, the ribbon take-up roller 106, and the driving roller 51 are rotated and driven similarly to Step S115 so as to resume the feeding of the tag label tape 109 with print and the printing of the label print R is resumed by electrifying the print head 23 similarly to Step S125.

After that, at Step S150, it is determined if the tag label tape 109 with print during feeding has been fed by a predetermined value (a feeding distance by which the RFID circuit element To on which the cover film 103 with the corresponding print applied is affixed has reached the loop antenna LC2, for example) or not. The feeding distance determination at this time can be also made only by counting the number of pulses output by the feeding motor driving circuit 121 driving the feeding motor 119, which is a pulse motor and the like.

At the subsequent Step S200, tag access processing is carried out. That is, if the feeding has been done to a communication position of the RFID circuit element To (position where the RFID circuit element To is opposed to the loop antenna LC2), the feeding and printing are stopped and information transmission/reception is carried out, and then, the feeding and printing is resumed so as to complete the print and the feeding is further continued and stopped at the rear half-cut position, where the rear half-cut line HC2 is formed (See FIG. 14, which will be described later).

When Step S200 is finished as above, the routine goes to Step S155 (at this time, at Step S200, the feeding of the tag label tape 109 with print has been resumed. See the description later). At Step S155, it is determined if the tag label tape 109 with print has been fed to the above-mentioned full cut position or not (in other words, if the tag label tape 109 with print has reached the position where the movable blade 41 of the cutting mechanism 15 is opposed to the cutting line CL set at Step S1 or not). The determination at this time may be also made by detecting the feeding distance after the identifier PM of the base tape 101 is detected at Step S120 by a predetermined known method, for example, similarly to the above (by counting the number of pulses output by the feeding motor driving circuit 121 driving the feeding motor 119, which is a pulse motor and the like). The determination is not satisfied till the full cut position is reached and this procedure is repeated, and if reached, the determination is satisfied and the routine goes to the subsequent Step S160.

At Step S160, similarly to Step S135, the rotation of the feeding roller 27, the ribbon take-up roller 106, and the driving roller 51 is stopped, and the feeding of the tag label tape 109 with print is stopped. As a result, the feeding-out of the base tape 101 from the first roll 102, the feeding-out of the cover film 103 from the second roll 104, and the feeding of the tag label tape 109 with print are stopped in a state where the movable blade 41 of the cutting mechanism 15 is opposed to the cutting line CL set at Step S105.

After that, a control signal is output to the cutter motor driving circuit 122 at Step S165 so as to drive the cutter motor 43, to rotate the movable blade 41 of the cutting mechanism 15, and to carry out the full cut processing of cutting (separating) the cover film 103, the adhesive layer 101a, the base film 101b, the adhesive layer 101c, and the separation sheet 101d of the tag label tape 109 with print so as to form the cutting line CL. The label-shaped RFID label T separated from the tag label tape 109 with print by the cutting mechanism 15 and in which the RFID tag information is written in the RFID circuit element To and on which the desired print corresponding thereto is produced.

After that, the routine goes to Step S170, where a control signal is output to the tape discharge motor driving circuit 123 through the input/output interface 113 so as to resume the driving of the tape discharge motor 65 and to rotate the driving roller 51. As a result, the feeding by the driving roller 51 is resumed, the RFID label T produced in the label shape at Step S165 is fed toward the label carry-out exit 11 and discharged through the label carry-out exit 11 to outside the apparatus 1 for producing RFID labels, and this flow is finished.

FIG. 14 is a flowchart illustrating a detailed procedure of the tag access processing of the above-mentioned Step S200. First, at Step S210, it is determined if the tag label tape 109 with print has been fed to the above-mentioned communication position with the loop antenna LC2 or not. The determination at this time can be also made by detecting the feeding distance after the identifier PM of the base tape 101 is detected at Step S120 by the predetermined known method, for example, similarly to Step S130 in the above-mentioned FIG. 13. The determination is not satisfied till the communication position is reached and this procedure is repeated, and if reached, the determination is satisfied and the routine goes to the subsequent Step S220.

At Step S220, similarly to Step S135, the rotation of the feeding roller 27, the ribbon take-up roller 106, and the driving roller 51 is stopped, and the feeding of the tag label tape 109 with print is stopped in a state where the loop antenna LC2 is substantially opposed to the RFID circuit element To. Also, current supply to the print head 23 is stopped, and the printing of the label print R is stopped (interrupted).

After that, the routine goes to Step S400, where information is transmitted/received via radio communication between the antenna LC2 and the RFID circuit element To, and information transmission/reception processing is carried out in which the information created at Step S105 in FIG. 13 is written in the IC circuit part 151 of the RFID circuit element To (or in the variation using the read-only RFID circuit element To, which will be described later, the information stored in the IC circuit part in advance is read out) (For detail, see FIG. 15, which will be described later).

After that, the routine goes to Step S230, where it is determined if information transmission/reception was successful at Step S400. Specifically, if the communication fails at Step S400, it should be the flag F=1 (See Step S437 in FIG. 15, which will be described later), it is determined if it is F=0 or not.

In the case of F=1, the determination is not satisfied, the communication with the RFID circuit element To is considered to have been failed, and the routine goes on to Step S700, where error processing to notify the operator of the communication failure on the label (by printing a print R' in another mode corresponding to the communication error (characters of "NG", for example), for example), and this routine is finished.

On the other hand, in the case of F=0, the determination is satisfied, the communication with the RFID circuit element To is considered to be successful, and the routine goes to Step S240.

At Step S240, similarly to Step S145 in FIG. 13, the feeding roller 27, the ribbon take-up roller 106, and the driving roller 51 are rotated and driven, the feeding of the tag label tape 109 with print is resumed, the print head 23 is electrified, and the printing of the label print R is resumed.

Note that, at this time, if an current supply stopped time of the print head 23 at Step S220 and after becomes longer than a predetermined time due to too many communication retry times (retry number of times) at Step S400 and the like, there is a possibility that a temperature of the print head 23 is lowered. Therefore, in order to cope with this, current supply to the print head 23 (energy amount per unit time) may be made larger than usual at resumption of the printing at Step S240.

After that, the routine goes to Step S250, where it is determined if the tag label tape 109 with print has been fed to the above-mentioned printing end position (calculated at Step S105 in FIG. 13) or not. The determination at this time can be also made by detecting the feeding distance after the identifier PM of the base tape 101 is detected at Step S120 by the predetermined known method similarly to the above, for example. The determination is not satisfied till the printing end position is reached and this procedure is repeated, and if reached, the determination is satisfied and the routine goes to the subsequent Step S260.

At Step S260, similarly to Step S135 in FIG. 13, current supply to the print head 23 is stopped, and the printing of the label print R is stopped. As a result, the printing of the label print R on the print region S is completed.

After that, the routine goes to Step S500, where the feeding to the predetermined rear half-cut position is carried out and then, the rear half-cut processing of forming the rear half-cut line HC2 by the half cutter 34 of the half-cut unit 35 is carried out. Then, this routine is finished.

FIG. 15 is a flowchart illustrating a detailed procedure of the above-mentioned Step S400. In this example, information writing in the above-mentioned information writing and the information reading will be described as an example.

In FIG. 15, first, at Step S405, a control signal is output to the above-mentioned transmission circuit 306 through the input/output interface 113, and a tag ID read-out command signal is transmitted. That is, the transmission circuit 306 generates an interrogation wave (the tag ID read-out command signal as an interrogation signal in this example) in order to get stored ID information of the RFID circuit element To through predetermined modulation. Then, the tag ID read-out command signal is transmitted to the RFID circuit element To to be written in through the loop antenna LC2. As a result, the memory part 157 of the RFID circuit element To is initialized.

After that, at Step S415, a reply signal (including the tag ID) transmitted from the RFID circuit element To to be written in is received through the loop antenna LC2 in response to the tag ID read-out command signal and taken in through the receiving circuit 307 and the input/output interface 113.

Subsequently, at Step S420, on the basis of the received reply signal, it is determined if the tag ID of the RFID circuit element To has been normally read out or not.

If the determination is not satisfied, the routine goes on to Step S425, where one is added to M, and it is determined if M=5 or not at Step S430. In the case of M≦4, the determination is not satisfied and the routine returns to Step S405 and the same procedure is repeated. In the case of M=5, the routine goes on to Step S435, where an error display signal is output to the PC 118 through the input/output interface 113 so that corresponding writing failure (error) display is made and this routine is finished. In this way, even if initialization is not successful, retry is made up to 5 times.

If the determination at Step S420 is satisfied, the routine goes on to Step S440, where a control signal is output to the transmission circuit 306 through the input/output interface 113, and a Write command signal is transmitted. That is, by carrying out predetermined modulation by the transmission circuit 306, an interrogation wave (the Write command signal in this example) that specifies the tag ID read out at Step S415 and writes desired data in the memory part 157 of the RFID circuit element To is generated. Then, the Write command signal is transmitted to the RFID circuit element To in which the information is to be written through the loop antenna LC2, and the information is written.

After that, at Step S445, a control signal is output to the transmission circuit 306 through the input/output interface 113, and a Read command signal is transmitted. That is, by carrying out predetermined modulation by the transmission circuit 306, an interrogation wave (the Read command signal in this example) that specifies the tag ID read out at Step S415 and reads out data recorded in the memory part 157 of the RFID circuit element To is generated. Then, the Read command signal is transmitted to the RFID circuit element To in which the information is to be written through the loop antenna LC2, and a reply is prompted.

After that, at Step S450, the reply signal transmitted from the RFID circuit element To as writing target in response to the Read command signal is received through the loop antenna LC2 for label production and taken in through the receiving circuit 307.

Subsequently, at Step S455, on the basis of the received reply signal, the information stored in the memory part 157 of the RFID circuit element To is verified and it is determined if the above-mentioned transmitted predetermined information is normally stored in the memory part 157 or not using a known error detection code (CRC code: Cyclic Redundancy Check or the like).

If the determination is not satisfied, the routine goes to Step S460, where one is added to N, and it is further determined at Step S465 if it is N=5 or not. In the case of N≦4, the determination is not satisfied and the routine returns to Step S440, where the same procedure is repeated. In the case of N=5, the routine goes to the above-mentioned Step S435, where a corresponding writing failure (error) display is similarly made on the PC 118, the above-mentioned flag F=1 is set at Step S437, and this routine is finished. In this way, even if information writing is not successful, retry is made up to 5 times.

If the determination at Step S455 is satisfied, the routine goes to Step S470, where a control signal is output to the transmission circuit 306, an interrogation wave given predetermined modulation as a signal that specifies the tag ID read out at Step S415 and prohibits overwriting of data stored in the memory part 157 of the corresponding tag (a lock command signal in this example) is transmitted to the RFID circuit element To as information writing target through the loop antenna LC2, and new writing of information in the RFID circuit element To is prohibited. As a result, writing of the RFID tag information in the RFID circuit element To as writing target is completed.

After that, the routine goes to Step S480, and combination of the information written in the RFID circuit element To at Step S440 and the print information of the label print R already printed on the print region S by the print head 23 in response to that is output through the input/output interface 113 and the communication line NW and stored in the information server IS and the route server RS. This stored data is stored/held in a database of each of the servers IS, RS, for example, so that it can be referred to by the PC 118 as necessary. As a result, this routine is finished.

FIG. 16 is a flowchart illustrating a detailed procedure of the read-out mode processing at Step S300 executed in the read-out mode using the apparatus 1 for producing RFID labels as a reader using the antenna unit 9. Usually, an operator executes this read-out processing by grasping the antenna unit 9 using the grasping portion 234 provided on both sides of the unit housing 202 and bringing the side face 202*a*, for example, closer to the RFID circuit element To as read-out target (first RFID circuit element).

In FIG. 16, first, at Step S305, a control signal is output to the switching circuit 239 so as to switch the switching circuit 239, and the antenna sharing device 240 and the loop antenna LC1 on the side of the antenna unit 9 are connected. Subsequently, at Step S330, a control signal is output to the transmission circuit 306 so as to apply predetermined modulation to a carrier wave, an inquiry signal (tag ID read-out command signal in this example) that gets information stored in the RFID circuit element To is generated and transmitted to the RFID circuit element To as read-out target through the loop antenna LC1, and a reply is prompted.

After that, at Step S340, a reply signal is transmitted from the RFID circuit element To as read-out target in response to the inquiry signal and it is determined if the reply signal is received and taken in through the loop antenna LC1 and the receiving circuit 307 or not. If the reply signal has not been received, the routine returns to Step S330, and Step S330 and Step S340 are repeated till the reply signal is received. That is, if there is no RFID circuit element To as read-out target (first RFID circuit element) within a communication range of the antenna unit 9, the transmission state of the inquiry signal is continued. If the reply signal is received, the determination is satisfied, and the routine goes to the subsequent Step S350.

At Step S350, the RFID tag information gotten from the RFID circuit element To as read-out target is output through the input/output interface 113 and the communication line NW, for example, and the flow is finished. The RFID tag information gotten from the RFID circuit element To as read-out target at this time is stored in the information server IS and the route server RS. The stored data is stored and held in the database of each of the servers IS, RS, for example, so that it can be referred to by the PC 118 as necessary.

Note that, though not particularly described here, it may be so configured that if information read-out is not successful, retry may be made for the predetermined number of times.

As mentioned above, in the apparatus 1 for producing RFID labels of the first embodiment, when the RFID label T is to be produced, in the writing mode processing executed at Step S100 after Step S1, access information (information for access) created by the transmission circuit 306 is transmitted from the loop antenna LC2 so as to make an access to the RFID circuit element To of the tag label tape 109 with print being fed, and predetermined information writing is made to the RFID circuit element To (second RFID circuit element) so that the RFID label T can be produced.

On the other hand, if the RFID label T is not to be produced, in the read-out mode processing at Step S100 via Step S1, communication is made using the loop antenna LC1 of the antenna unit 9 connected to the apparatus main body 2, by which the unit can be made to function as a casual-type unit reading device. That is, to the RFID circuit element To (first RFID circuit element) as target outside the apparatus, the access information (information for access) created by the transmission circuit 306 is accessed from the loop antenna LC1 via radio communication so that predetermined information (access acquisition information) such as identification information (tag ID) of the RFID circuit element To and the like can be read out. As mentioned above, by sharing the transmission circuit 306 and the receiving circuit 307 as communication circuit portions by the read-out mode execution by the antenna unit 9 and the writing mode execution by the apparatus 1 for producing RFID labels, equipment configuration can be simplified and cost burden on users can be reduced as compared with the case of preparing both the apparatus for producing RFID labels and the reader for RFID tag information separately.

Also, the mode is automatically switched depending on the determination made at Step S1, and an output destination of the access information can be set by selecting and processing a transmission path from the switching circuit 239 (loop antenna LC1 side or loop antenna LC2 side). As a result, the operation burden on the operator can be reduced, and convenience can be improved.

Also, at this time, the radio communication using the loop antenna LC1 by selectively switching and controlling the read-out mode processing by the read-out mode and the writing mode processing by the writing mode (tag label production processing) at Step S1 in FIG. 12 is carried out only when the radio communication using the loop antenna LC2 is not carried out. As a result, wrong read-out, occurrence of the radio-wave interference and the like caused by simultaneous presence of both communications or a drop in communication reliability caused by that can be prevented.

Note that, the first embodiment of the present invention is not limited to the above configuration but is capable of various variations in a range not departing from its gist and technical idea. The variations will be sequentially described below.

(1-1) When a plurality of antenna units is provided:

In the first embodiment, only one antenna unit 9 is connected to the apparatus main body 2, but not limited to that. That is, a plurality of the antenna units 9 may be connected to the apparatus 1 for producing RFID labels.

FIG. 17 is a perspective view illustrating an entire structure of an apparatus 1' for producing RFID labels of this variation and corresponds to FIG. 2 in the above. The same reference numerals are given to the portions equivalent to those in FIG. 2 and the description will be omitted or simplified.

In FIG. 17, in this variation, unlike the first embodiment, three antenna units 9, 9', 9" of different types (shape, size and the like) are connected to an apparatus main body 2' through the cable 223 and the connection port 224, respectively. The antenna units 9', 9" have the plate-state magnetic body 236 on the side of the side face 202a of the housing 202 similarly to the antenna unit 9, and the shield plate 237 made of metal is affixed to the outside of the magnetic body 236.

FIG. 18 is a functional block diagram illustrating a control system provided at the apparatus for producing RFID labels of this variation and corresponds to the above-mentioned FIG. 7. The same reference numerals are given to the portions equivalent to those in FIG. 7.

In FIG. 18, the loop antennas LC1 (of different types) of the antenna units 9, 9', 9" are connected to an antenna switch 351 (switching and conducting device) provided on the side of the producing apparatus main body 2, and the antenna switch 351 is further connected to the switching circuit 239. The antenna switch 351 is connected to the input/output interface 113 of the control circuit 110, switched by a control signal from the CPU 111 and selectively connects any one of the loop antennas LC1 of the antenna units 9, 9', 9" to the transmission circuit 306 or the receiving circuit 307 through the switching circuit 239 and the antenna sharing device 240.

At this time, similarly to the first embodiment, the switching circuit 239 switches the antenna switch 351 and the loop antenna LC2 according to the mode. That is, in the writing mode, it is switched to the side of the loop antenna LC2, while in the read-out mode, it is switched to any one of the loop antennas LC1 of the antenna units 9, 9', 9" through the antenna switch 351.

In this variation, by configuring such that the plurality of (three in this example) antenna units 9, 9', 9" is connected and can be selectively used by using the antenna switch 351, one of the plurality of antenna units provided with the loop antennas LC1 of different types can be selectively used. Moreover, not limited to the selection of any one of them as shown, if the antenna switch 351 is configured such that the plurality of antenna units can be connected to the switching circuit 239 side at the same time (See the variation shown in FIG. 22 and the like, which will be described later), a plurality of users can read out at the same time using the plural antenna units. As a result, convenience of users can be improved.

(1-2) When impedance matching of plural units is carried out:

When a plurality of types of antenna units is used as above, since impedance is different among antenna units, impedance matching is preferably carried out for each antenna unit for making a gain at communication equal and for realizing efficient communication for the antenna units.

FIG. 19 is a functional block diagram illustrating a control system of the apparatus 1 for producing RFID labels according to the variation and corresponds to FIGS. 7 and 18. The same reference numerals are given to the portions equivalent to those in FIG. 18 and the like.

In the configuration shown in FIG. 19, between the antenna switch 351 and each of the connection ports 224 corresponding to each of the antenna units 9, 9', 9" in the configuration shown in FIG. 18, detection/matching circuits 360A, 360B, 360C are provided, respectively. That is, particularly in this variation, an antenna detection function to detect which of the antenna units is connected to the side of the switching circuit 239 by which of the antenna switches 351 is provided and made into the detection/matching circuits 360A, 360B, 360C together with the above-mentioned impedance matching function.

FIG. 20 is a circuit diagram illustrating a detailed circuit configuration of the loop antenna LC1 of each of the antenna units 9, 9', 9" and the detection/matching circuits 360A, 360B, 360C.

In FIG. 20, in addition to the connection port 224 (one spot each for the antenna unit is shown for simplicity in FIG. 19 and the like, but actually there are two each as shown in Fig. A28) between the loop antenna LC1 of each of the antenna units 9, 9', 9" and the antenna switch 351, a connection port 224' for detection circuit (not shown in FIG. 19) is provided.

To one side of the two connection ports 224, 224 (shown on the upper side in FIG. 20), a direct-current constant-voltage power source Vcc is connected through a chalk coil L2 and a resistor R1. The connection port 224' is grounded through a resistor R3. At the loop antenna LC1, a resistor R2 is connected between the connection port 224 on one side and the connection port 224', and an antenna coil L1 is connected between the connection port on one side and the other side (shown on the lower side in FIG. 20).

The resistor R2 has a resistance value different among the antenna units 9, 9', 9" and they are 1 kΩ, 3 kΩ, 5 kΩ and the like, for example.

Also, in order to connect a circuit connecting the antenna switch 351 conducting to the side of the transmission circuit 306 and the two connection ports 224, 224, respectively, a matching circuit M constituted by using a known radio frequency switch or a variable capacity diode (varicap) is provided. The matching circuit M is switched by a matching signal output from an A/D converter (signal outputting portion) obtained by A/D converting a voltage generated by the resistor R2 (different among the antenna units as mentioned above) according to the voltage.

That is, since an input voltage V of the A/D converter is expressed as:

$$V=[R3/(R1+R2+R3)]\cdot Vcc$$

a resistance value of the resistor R2 different among the antenna units 9, 9', 9" can be discriminated. As a result, attachment/non-attachment of the antenna unit can be determined (if the voltage=0 volt, it is known that the antenna unit is not attached, for example), and by A/D converting and making it a matching control signal, the impedance on the side of the transmission circuit 306 is matched to the impedance of each of the antenna units 9, 9', 9" of different types connected by each of the antenna switches 351. As a result, even if the antenna units 9, 9', 9" of different types are connected to the connection port 224, the impedance on the side of the transmission circuit 306 can be matched, power can be generated efficiently, and smooth communication can be conducted.

As shown in FIG. 21, it may be so configured that information of the voltage V (=A/D converted control signal) is input into the control circuit 110 through the input/output interface 113 and determined by a program, and a control signal is generated and input into the matching circuit M through the input/output interface 113 for executing control. In this case, since a plurality of control lines can be provided, the matching operation can be carried out more preferably.

(1-3) When simultaneous read-out is carried out by a plurality of antenna units in time sharing:

FIG. 22 is a functional block diagram illustrating a control system of the apparatus 1 for producing RFID labels according to this variation, FIG. 23 is a circuit diagram illustrating a detailed circuit configuration of the loop antenna LC1 of each of the antenna units 9, 9', 9" and the matching circuits 360A, 360B, 360C and they correspond to FIG. 19 and FIG. 20, respectively. The same reference numerals are given to the portions equivalent to those in FIGS. 19, 20 and the like.

In FIGS. 22 and 23, in this variation, the transmission circuit 306 as an information creating device outputs corresponding access information to each of the antenna units 9, 9', 9" for each time-divided predetermined occupied period (time slot) so that the plurality of antenna units 9, 9', 9" is operated at the same time in a time sharing manner so as to execute read-out (an example of the behavior of the time sharing is conceptually illustrated in FIG. 24).

Also, at this time, the antenna detection results at the detection/matching circuits 360A, 360B, 360C are input to the CPU 111 through the input/output interface 113 of the control circuit 110, and according to the number of detected antenna units and the impedance characteristic of each antenna, a control signal is output to the matching circuit M from the CPU 111 of the control circuit 110 through the input/output interface 113 for impedance matching control.

FIG. 25 is a flowchart illustrating a procedure of initialization processing executed by the CPU 111 when the plurality of the antenna units 9, 9', 9" (hereinafter referred to as antenna unit 9 and the like, as appropriate) is connected before the apparatus 1 for producing RFID labels starts an actual operation (in other words, before the flow in FIG. 12 is executed).

First, at Step S505, a matching signal from the A/D converter of the antenna unit 9 and the like connected by the connection ports 224, 224' at this time is input through the input/output interface 113, and the number of all the connected antenna units is identified (determined) on the basis of the number of the signals.

After that, the routine goes to Step S510, where for any one of the matching signals input at Step S505 (in a predetermined order), it is identified (determined) which of the connection ports 224 provided in plural at the housing 200 the signal corresponds to.

At Step S515, it is identified (determined) which of the antenna units 9 and the like (antenna unit type) the matching signal that identified the connection port 224 at Step S510 corresponds to.

After that, the routine goes to Step S520, where a matching signal and the connection port and the antenna type corresponding to that are associated with each other on the basis of the identification results at Step S510 and Step S515 and stored in the RAM 117, for example.

Then, the routine goes to Step S525, where a predetermined control signal corresponding to the matching signal stored and processed at Step S520 is output to the matching circuit M of the corresponding antenna unit 9 and the like through the input/output interface 113, and similarly to the above, the impedance on the side of the transmission circuit 306 is matched with the impedance of the antenna unit 9 and the like (matching processing). Also, the matched state (situation of matching processing) at this time is stored in the RAM 117, for example, moreover in association with the connection port and the antenna type already stored as above.

After that, the routine goes to Step S530, where it is determined if the matching processing at Step S525 has been finished or not for all the antenna units identified at Step S505. If the matching processing has not been finished for all the antenna units, the determination is not satisfied and the routine returns to Step S510 and the similar procedure is repeated. If the matching processing has been finished for all the antenna units, the determination at Step S530 is satisfied, and the flow is finished.

FIG. 26 is a flowchart illustrating a detailed procedure of the read-out mode processing at Step S300 executed in the flow shown in FIG. 12 in a state where the initial setting as above has been completed and corresponds to the above-mentioned FIG. 16. The same reference numerals are given to the procedures equivalent to those in FIG. 16.

In FIG. 26, first, at Step S305, a control signal is output to the switching circuit 239 so as to switch the switching circuit 239, and the antenna sharing device 240 and the antenna switch 351 are connected.

After that, the routine goes to newly provided Step S320, and for the plurality of antenna units 9 and the like being connected at this time, unit switching processing (for detail, see FIG. 27, which will be described later) such as switching connection through the antenna switch 351 to any of them (at the same time as the start of a time slot corresponding to the antenna unit, synchronized with a clock signal and the like, not shown, for example) is carried out.

When the above Step S320 is finished, the routine goes to Step S330, an inquiry signal is generated similarly to the above-mentioned FIG. 26 (interlocking with the start of the time slot) and transmitted to the RFID circuit element To as read-out target through the loop antenna LC1 of the antenna unit 9 and the like and a reply is prompted and then, it is determined at Step S340 if a reply signal has been received or not.

If the reply signal has not been received, the determination at Step S340 is not satisfied and the routine goes to newly provided Step S345. At Step S345, it is determined if the time slot which has been started corresponding to the antenna unit 9 and the like has been finished or not as mentioned above. If the time slot has not been finished yet, the determination is not satisfied and the routine returns to Step S330, where the similar procedure is repeated from the transmission of the inquiry signal (using the same loop antenna LC1 of the antenna unit 9 and the like). If the time slot has been finished, the determination at Step S345 is satisfied, the routine returns to the unit switching processing at Step S320, the connection is switched to the subsequent antenna unit 9 and the like through the antenna switch 351 (interlocking with the start of the time slot corresponding to the subsequent antenna unit 9 and the like (according to the above-mentioned predetermined order)), and the similar procedure is repeated similarly to the above.

On the other hand, if the reply signal has been received at Step S340, the determination is satisfied and the routine goes to Step S350, where the RFID tag information gotten from the RFID circuit element To as read-out target is output and the routine goes to newly provided Step S360.

At Step S360, it is determined if read-out of the corresponding RFID circuit elements To has been finished by all the connected antenna units 9 and the like or not. If the read-out of all the antenna units 9 and the like has not been finished yet, the determination is not satisfied and the routine returns to Step S320 and the similar procedure is repeated. If the read-out of all the units has been finished, the determination at Step S360 is satisfied, and this routine is finished.

As mentioned above, during the time slot allocated to any one of the antenna units 9 and the like, the transmission of the inquiry signal is repeated till the reply signal is received, and if the time slot is finished before receiving, the similar procedure is carried out for the subsequent antenna unit 9 and the like in the subsequent time slot, and this is repeated and when the information read-out of all the antenna units 9 and the like is completed, this routine is finished.

FIG. 27 is a flowchart illustrating a detailed procedure of the above-mentioned Step S320 shown in FIG. 26.

In FIG. 27, first, at Step S322, a control signal is output to the antenna switch 351 (interlocking with the start of the time slot as mentioned above), and connection is switched to any one of the plurality of antenna units 9 and the like being connected at this time.

After that, the routine goes to Step S325, where on the basis of the previously stored information of the RAM 117 stored at Step S520 in FIG. 25, information relating to the type of the antenna unit 9 and the like switched at Step S322 and the connection port 224 corresponding to that is read out (identified).

After that, the routine goes to Step S328, where on the basis of the stored information of the RAM 117 previously stored as initial information at Step S525 in FIG. 25, the matching processing similar to the above (control signal output to the matching circuit M) is carried out to the corresponding antenna unit 9 and the like, and the routine is finished.

As mentioned above, in this variation, by employing the method in which the antenna units 9, 9', 9" are connected to each time-divided time slot for carrying out communication, radio communication can be made using a plurality of (three in this example) antenna units at the same time on the basis of the signal from the single transmission circuit 306. As a result, convenience of the user can be further improved.

(1-4) When the mode switching is carried out by manual operation:

In the above first embodiment, the example in which the writing mode and the read-out mode are automatically switched according to the presence of the tag label production instruction was described, but not limited to that. That is, for example, the writing mode and the read-out mode may be switched by an operator using an appropriate operation switch. At this time, the writing mode is given priority by configuring such that the read-out mode is selected when the operation switch is operated and the writing mode is selected when no operation is carried out.

(1-5) Others:

In the above, as shown in FIG. 5, the loop antenna LC2 is provided in the same feeding direction position (and on the side of the pressure roller 52 in this example) as the driving roller 51 and the pressure roller 52, but not limited to that. That is, as shown in FIG. 28, the antenna may be provided on the upstream side in the feeding direction (and on the side of the driving roller 51 in this example) of the tag label tape 109 rather than the rollers 51, 52. In this case, too, the similar effect is obtained.

Note that, in the apparatus 1 for producing RFID labels in the first embodiment described above (RFID tag information system), switching between the writing mode processing in which the radio communication is conducted through the loop antenna LC2 on the side of the apparatus main body 2 and the read-out mode processing in which the radio communication is conducted through the loop antenna LC1 on the side of the antenna unit 9 is made only by an instruction from an operator through the PC 118 and the like, but the present invention is not limited to that. That is, for example, during the production processing of the RFID label T, the radio communication through the loop antenna LC2 on the side of the apparatus main body 2 and the radio communication through the loop antenna LC1 on the side of the antenna unit 9 may be switched according to the processing status (that is, the above-mentioned selection processing of the transmission path). A second embodiment of the RFID tag information system in which connection switching between the loop antenna LC1 and the loop antenna LC2 is made according to the production processing status of the RFID label T as above will be described below.

The RFID tag information system according to the second embodiment of the present invention will be described below referring to the attached drawings. The apparatus for producing RFID labels, which is the RFID tag information system of the second embodiment, is the same in terms of hardware as the above first embodiment but is slightly different from that in terms of software (control flow). Only the software difference will be shown and explained below. Therefore, in each figure in the following second embodiment, the same reference numerals are given to the portions equivalent to those in the first embodiment, and the description will be omitted or simplified as appropriate.

In the apparatus for producing RFID labels of the second embodiment, too, similarly to the configuration shown in FIG. 7 of the first embodiment, the transmission circuit 306 and the receiving circuit 307 are selectively connected to the loop antenna LC2 on the side of the apparatus main body 2 or the loop antenna LC1 on the side of the antenna unit 9 through the antenna sharing device 240 and the switching circuit 239 switched by a control signal from the control circuit 110. In the second embodiment, the control circuit 110 switches to the read-out mode when there is no label production instruction by the operator (in detail, the label production instruction from the PC 118 as will be described later) and switches the switching circuit 239 so that the antenna sharing device 240 and the loop antenna LC1 of the antenna unit 9 are connected. Also, wirings and the like connecting the loop antenna LC1 on the side of the antenna unit 9 and the antenna sharing device 240 on the side of the apparatus main body 2 to each other are bundled and constitute the cable 223.

The control circuit 110 switches the antenna unit 9 and the apparatus 1 for producing RFID labels to the read-out mode in which they function as a reader when there is no label production instruction as above and switches the apparatus 1 for producing RFID labels to the writing mode for the tag label production when the label production instruction is given. On the other hand, if the label production instruction is given, switching is made to the writing mode for the tag label production, and the switching circuit 239 is switched so as to connect the antenna sharing device 240 and the loop antenna LC2. That is, the writing mode is given priority over the read-out mode.

Note that, instead of the mode switching according to the presence of the label production instruction, it may be so configured that an attachment sensor that detects if the cable 223 of the antenna unit 9 is connected (attached) to the connection port 224 as a connection portion is provided, and the read-out mode and the writing mode are switched to each other on the basis of a detection signal from the attachment sensor. This attachment sensor may be so configured to detect an attachment state between the apparatus main body 2 and the antenna unit 9 by detecting a current flowing when the cable 223 is connected and conducted to the connection port 224 of the apparatus main body 2, for example. Alternatively, a limit switch or a micro switch and the like may be used as the attachment sensor.

FIG. 29 is a flowchart illustrating a procedure of the writing mode processing executed by the control circuit 110 of the apparatus 1 for producing RFID labels in the second embodiment and corresponds to FIG. 13 in the first embodiment.

A difference between the flow in FIG. 29 and the flow in FIG. 13 is that instead of Step S103 (antenna switching)

executed first immediately after start, a procedure of Step S103' in which an interrupt flag (details will be described later) Fr=1 is set so that execution of interruption read-out processing, which will be described later, is started is carried out. Since the other procedures are the same as the flow in FIG. 13, the description will be omitted.

FIG. 30 is a flowchart illustrating a procedure of tag access processing executed by the control circuit 110 of the apparatus 1 for producing RFID labels in the second embodiment and corresponds to FIG. 14 in the first embodiment. A difference between the flow in FIG. 30 and the flow in FIG. 14 is that procedures of Step S223 and Step S225 are added between Step S220 and Step S400 and Step S235 is added between Step S230 and Step S240.

That is, after it is determined at Step S210 that the tag label tape 109 with print has reached the communication position by tape feeding and the feeding and printing are stopped at Step S220, the routine goes to newly provided Step S223. At Step S223, a reached flag (which will be described later) Fs=1 is set. As a result, the interruption read-out processing is once interrupted as will be described later. After that, a control signal is output to the switching circuit 239 at the subsequent Step S225 so as to connect the antenna sharing device 240 and the loop antenna LC2 to each other. After that, the routine goes to Step S400, where information transmission/reception processing is carried out.

Also, if the information transmission/reception is successful and the determination is satisfied at Step S230, the interruption flag Fr=1 is set at the subsequent Step S235 for execution start of the interruption processing, which will be described later. As a result, the interruption read-out processing which was interrupted once as above is resumed. Then, the tape feeding and printing are resumed at the subsequent Step S240. Since the other procedures are the same as the flow in FIG. 14, the description thereof will be omitted.

FIG. 31 is a flowchart illustrating a detailed procedure of the interruption read-out processing executed by the CPU 111, in which the apparatus 1 for producing RFID labels can be used as a reader using the antenna unit 9 even in the writing mode. That is, while the writing mode processing in FIG. 13 described in the first embodiment is being operated, the interruption read-out processing in FIG. 31 is also operated in parallel at the same time (such simultaneous parallel processing can be executed by the single CPU 111 by a known method similar to "multi task processing", which is often executed on the computer OS and the like, for example).

In FIG. 31, first, at Step S2301, a flag Fr for execution start of the above-mentioned interruption read-out processing (hereinafter referred to as interruption flag as appropriate), a flag Fe indicating if information has been read out or not (hereinafter referred to as read-out flag as appropriate), and a flag Fs indicating if the tag label tape 109 with print has been fed and reached the communication position with the loop antenna LC2 or not (hereinafter referred to as reach flag as appropriate) are initialized to zero.

After that, the routine goes to Step S2302, where it is determined if it is the interruption flag Fr=1 (if the second RFID circuit element To of the tag label tape 109 with print has reached the communication position) or not. Since it is Fr=0 at the first, the determination is not satisfied and Step S2302 is repeated and stands by as it is. When the interruption flag Fr=1 at Step S103' in the above-mentioned FIG. 29 or Step S235 in FIG. 30, the determination at Step S2302 is satisfied and the routine goes to Step S2303.

At Step S2303, it is determined if the read-out flag Fe is one or not (if information read-out from the first RFID circuit element To has been completed by the interruption read-out processing or not). If it is the interruption flag Fr=1 at Step S103', since the interruption read-out processing has not been executed yet and the information read-out has not been completed, the determination is not satisfied, and the routine goes to Step S2305.

At Step S2305, similarly to the above-mentioned Step S225, a control signal is output to the switching circuit 239 so as to switch the switching circuit 239, and the antenna sharing device 240 and the loop antenna LC1 of the antenna unit 9 are connected.

After that, the routine goes to Step S2330, a control signal is output to the transmission circuit 306 so as to apply predetermined modulation to the carrier wave, an inquiry signal that gets information stored in the RFID circuit element To (tag ID read-out command signal in this example) is generated and transmitted to the first RFID circuit element To as read-out target through the loop antenna LC1, and a reply is prompted.

After that, at Step S2340, a reply signal is transmitted from the RFID circuit element To as read-out target in response to the inquiry signal, and it is determined if the reply signal has been received and taken in through the loop antenna LC1 and the receiving circuit 307. If the reply signal has not been received, the routine goes to Step S2335, where it is determined if the reach flag Fs=1 or not. The determination is not satisfied till the tag label tape 109 with print has reached the communication position with the loop antenna LC2, the routine returns to Step S2330, and Step S2330 and Step S2340 are repeated till the reply signal is received. That is, if there is not first RFID circuit element To as read-out target within the communication range of the antenna unit 9, the transmission state of the inquiry signal is continued. If the reply signal is received, the determination is satisfied, and the routine goes to the subsequent Step S2345. Though not particularly described here, if the information read-out is not successful, retry may be made for a predetermined number of times. If the tag label tape 109 with print has reached the communication position with the loop antenna LC2 before the reply signal is received, the determination at Step S2335 is satisfied, and the routine goes to Step S2355, which will be described later.

At Step S2345, in response to the receiving of the reply signal at Step S2340, the read-out flag Fe=1 is set and then, the routine goes to Step S2350.

At Step S2350, the RFID tag information gotten from the first RFID circuit element To as read-out target is, first, temporarily stored in an appropriate storage device (the RAM 117 and the like, for example) and then, automatically read out of the storage device and output through the input/output interface 113 and the communication line NW (second transmission control portion) and stored in the information server IS and the route server RS, for example. This stored data is stored and held in the database of each of the servers IS, RS, for example, so that it can be referred to by the PC 118 as necessary. It may be so configured that instead of automatic read-out from the storage device, the data may be read out of the storage device when an appropriate instruction signal is input from the PC 118 and the like through the input/output interface 113, for example, and output through the input/output interface 113 and the communication line NW (first transmission control portion). Then, the routine goes to Step S2355.

At Step S2355, in response to the completion of the above interruption read-out processing, the interruption flag is returned to Fr=0, and the routine returns to Step S2302 and returns to the standby state of Fr=1 similarly to the above.

On the other hand, at the above-mentioned Step S2302, if the interruption flag Fr=1 is set at Step S235, the interruption read-out processing has been already executed once. If the read-out processing has been completed and the information has been gotten as above at this time, since the read-out flag Fe=1 is set at Step S2345 after Step S2340, the determination at Step S2303 is satisfied, the routine goes to Step S2355, Fr=0 is set, and the routine returns to Step S2302 again. On the other hand, if the reply signal has not been received and the information has not been gotten in the above interruption read-out processing which has been already executed once (if the determination at Step S2335 is not satisfied and the routine goes to Step S2355 while the read-out has not been completed), since Step S2345 is not passed or the read-out flag Fe=1 is not set, the determination at Step S2303 is not satisfied, the routine goes to Step S2305, and the procedure of information read-out at Step S2305 and after is executed again.

As mentioned above, in the writing mode processing, first, the interruption read-out processing of the first RFID circuit element To is started by setting the interruption flag Fr=1 at Step S103', and the read-out processing is executed till the second RFID circuit element To reaches the communication position by feeding of the tag label tape 109 with print and the information writing in the second RFID circuit element To is started. When the communication position is reached, the read-out processing of the first RFID circuit element To is interrupted at Step S2335 by setting the reach flag Fs=1 at Step S223. After that, when the information writing in the second RFID circuit element To is finished, the interruption read-out processing in the first RFID circuit element To is resumed by setting the interruption flag Fr=1 at Step S235 again.

In the above, Step S225 in FIG. 30 and Step S2305 in FIG. 31 constitute a selection connecting portion configured to selectively connect the unit antenna or the apparatus antenna to the information creating device according to the processing status in the production processing of a RFID label described in each claim and also constitute a selection processing portion. Also, all the steps shown in the flows in FIGS. 29 and 31 constitute a coordination control portion configured to control the feeding device and the information creating device in coordination according to the label production instruction signal and to produce a RFID label by transmitting the access information created by the information creating device to the second RFID circuit element through the apparatus antenna.

As mentioned above, in the apparatus for producing RFID labels in the second embodiment, when the RFID label T is to be produced, in the writing mode processing, the access information (information for access) created in the transmission circuit 306 is transmitted by the loop antenna LC2 to the RFID circuit element To of the tag label tape 109 with print to be fed so as to make an access, predetermined information writing is applied on the RFID circuit element To (second RFID circuit element) so that the RFID label T can be produced.

On the other hand, if the RFID label T is not to be produced, in the read-out mode, communication is made using the loop antenna LC1 of the antenna unit 9 connected to the apparatus main body 2, and thereby the unit can function as a casual type unit reading device. That is, to the RFID circuit element To (first RFID circuit element) as target outside the apparatus, the access information (information for access) created in the transmission circuit 306 is accessed from the loop antenna LC1 via radio communication, and predetermined information (access acquisition information) such as identification information of the RFID circuit element To (tag ID) and the like can be read out. As mentioned above, by sharing the transmission circuit 306 and the receiving circuit 307 as communication circuit portions by the read-out mode execution by the antenna unit 9 and the writing mode execution by the apparatus 1 for producing RFID labels, equipment configuration can be simplified and cost burden on users can be reduced as compared with the case of preparing both the apparatus for producing RFID labels and the reader for RFID tag information separately.

Also, the output destination of the access information can be set by selectively processing the transmission path (the side of the loop antenna LC1 or the side of the loop antenna LC2) from the switching circuit 239 automatically at Step S225 and Step 2305 as mentioned above. As a result, the operation burden on the operator can be reduced, and convenience can be improved.

Also, at this time, by selectively connecting the antenna LC1 on the side of the antenna unit 9 or the antenna LC2 on the side of the apparatus 1 for producing RFID labels to the side of the transmission circuit 306 according to the processing status during the tag label production at Step S225 in FIG. 30 and Step S2305 in FIG. 31, first radio communication with the first RFID circuit element To and second radio communication with the second RFID circuit element To can be selectively switched and controlled. Particularly in this second embodiment, during the label production processing, by setting an occupied rate of the execution period of the second radio communication larger than that of the execution period of the first radio communication, the second radio communication for label production can be mainly executed in the communication during the label production processing (in this example, the execution period of the first radio communication is zero during the execution of the second radio communication of the label production processing, that is, only the second radio communication is executed for the label production).

As the result of the above control, the radio communication using the antenna LC1 on the side of the antenna unit 9 is conducted only when the radio communication for the tag label production using the antenna LC2 on the side of the apparatus is not conducted. As a result, occurrence of radio wave interference and the like caused by presence of the both communication at the same time or drop in communication reliability due to the above can be prevented.

Particularly in the second embodiment, during the print head driving period (execution period of print) from Step S125 in FIG. 29 to Step S220 in FIG. 30 and from Step S240 to Step S260 in FIG. 30, the second radio communication with the second RFID circuit element To as in Step S400 is not executed but the first radio communication is made with the first RFID circuit element To. As above, even during the tag label production processing, by executing the first radio communication during the printing by the print head 23 in which the communication with the second RFID circuit element To is not made in usual, generation of useless waiting time for the first radio communication is restrained, and efficient communication processing is realized.

The second embodiment of the present invention is not limited to the above configuration but is capable of various variations within a scope not departing from the gist and technical idea. Such variations will be sequentially described below.

(2-1) When a plurality of antenna units is provided:

In the second embodiment, only one antenna unit 9 is connected to the apparatus main body 2, but not limited to that. That is, similarly to the first variation (1-1) of the first embodiment, a plurality of the antenna units 9 may be connected to the apparatus 1 for producing RFID labels. In this case, the apparatus is the same as those in FIGS. 17 and 18 in terms of hardware.

In this variation, the transmission circuit 306 as an information creating device outputs corresponding access information to each of the antenna units 9, 9', 9" for each time-divided predetermined occupied period (time slot) so that the plurality of antenna units 9, 9', 9" is operated at the same time in a time sharing manner so as to execute read-out (See FIG. 34, which will be described later).

FIG. 32 is a flowchart illustrating a detailed procedure of the read-out mode processing in Step S300 executed by the CPU 111 in this variation and corresponds to the above-mentioned FIG. 16. The same reference numerals are given to the procedures equivalent to those in FIG. 16.

In FIG. 32, first at Step S2305, a control signal is output to the switching circuit 239 so as to switch the switching circuit 239, and the antenna sharing device 240 and the antenna switch 351 are connected.

After that, the routine goes to newly provided Step S2320, where the unit switching processing such as switching of connection to any of the plurality of antenna units 9 and the like connected at this time (with the start of the time slot corresponding to the antenna unit, synchronized with a clock signal and the like, not shown, for example) through the antenna switch 351 is carried out.

When the above Step S2320 is finished, the routine goes to Step S2330, an inquiry signal is generated similarly to the above-mentioned FIG. 16 (interlocking with the start of the time slot) and transmitted to the RFID circuit element To as read-out target through the loop antenna LC1 of the antenna unit 9 and the like and a reply is prompted and then, it is determined at Step S2340 if a reply signal has been received or not.

If the reply signal has not been received, the determination at Step S2340 is not satisfied and the routine goes to newly provided Step S2345. At Step S2345, it is determined if the time slot which has been started in response to the antenna unit 9 and the like has been finished or not as mentioned above. If the time slot has not been finished yet, the determination is not satisfied and the routine returns to Step S2330, where the similar procedure is repeated from the transmission of the inquiry signal (using the same loop antenna LC1 of the antenna unit 9 and the like). If the time slot has been finished, the determination at Step S2345 is satisfied, the routine returns to the unit switching processing at Step S2320, the connection is switched to the subsequent antenna unit 9 and the like through the antenna switch 351 (interlocking with the start of the time slot in response to the subsequent antenna unit 9 and the like (according to the above-mentioned predetermined order)), and the similar procedure is repeated.

On the other hand, if the reply signal has been received at Step S2340, the determination is satisfied and the routine goes to Step S2350, where the RFID tag information gotten from the RFID circuit element To as read-out target is output and the routine goes to newly provided Step S2360 similarly to the above.

At Step S2360, it is determined if read-out of the corresponding RFID circuit elements To has been finished by all the connected antenna units 9 and the like or not. If the read-out of all the antenna units 9 and the like has not been finished yet, the determination is not satisfied and the routine returns to Step S2320 and the similar procedure is repeated. If the read-out of all the units has been finished, the determination at Step S2360 is satisfied, and this routine is finished.

As mentioned above, during the time slot allocated to any one of the antenna units 9 and the like, the transmission of the inquiry signal is repeated till the reply signal is received, and if the time slot is finished before receiving, the similar procedure is carried out for the subsequent antenna unit 9 and the like in the subsequent time slot, and this is repeated and when the information read-out of all the antenna unit 9 and the like is completed, this routine is finished.

FIG. 33 is a flowchart illustrating a detailed procedure of the interruption read-out processing executed by the CPU 111 in this variation and corresponds to the above-mentioned FIG. 31. The same reference numerals are given to the portions equivalent to those in FIG. 31 and the description will be omitted as appropriate.

In FIG. 33, in addition to each procedure of the flow shown in FIG. 31, Step S2310, Step S2351, Step S2353 are newly provided in this flow. Also, instead of Step S2303, Step S2303' is newly provided.

That is, each flag is initialized at Step S2301 and after it is determined if the interruption flag Fr=1 at Step S2302, the routine goes to Step S2303'.

At Step S2303', it is determined if full read-out flag Fe' indicating if the information read-out of all the units 9, 9', 9", provided instead of the read-out flag Fe, has been completed or not (if the information read-out from the first RFID circuit element To has been completed by the interruption read-out processing) is one or not. Similarly to the above-mentioned Step S2303, if the determination at Step S2303' is satisfied, the routine goes to Step S2305, while if the determination is not satisfied, the routine goes to Step S2355.

At Step S2305, similarly to the above, the antenna sharing device 240 and the loop antenna LC1 of the antenna unit 9 are connected, and the routine goes to newly provided Step S2310.

At Step S2310, similarly to the above-mentioned Step S2305, a control signal is output to the switching circuit 239 so as to switch the switching circuit 239 and moreover, a control signal is output to the antenna switch 351 so as to switch that. As a result, the unit switching processing such as switching of connection of the antenna sharing device 240 to any of the plurality of antenna units 9 and the like connected at this time (with the start of the time slot corresponding to the antenna unit, synchronized with a clock signal and the like, not shown, for example) is carried out (according to a predetermined order, for example).

After that, the routine goes to Step S2330, where similarly to the above, an inquiry signal is transmitted to the first RFID circuit element To through the loop antenna LC1 and a reply is prompted, and it is determined if the reply signal has been received or not at Step S2340. If the determination is not satisfied at Step S2340, it is determined if the reach flag Fs=1 at Step S2335 similarly to the above, and if the determination is not satisfied, the routine goes to newly provided Step S2337. At Step S2337, as mentioned above, it is determined if the time slot which has been started in response to the antenna unit 9 and the like as mentioned above has been already finished or not. If the time slot has not been finished yet, the determination is not satisfied, the routine returns to Step S2330, and the similar procedures is repeated from the transmission of the inquiry signal (using the same loop antenna LC1 of the antenna unit 9 and the like). If the time slot has been finished, the determination at Step S337 is satisfied, the routine returns to the unit switching processing at Step S310, connection is switched to the subsequent antenna unit 9 and the like through the antenna switch 351 (interlocking with the start of the time slot corresponding to the subsequent antenna unit 9 and the like (according to the above-mentioned predetermined order)), and the similar procedure is repeated after that.

On the other hand, if the reply signal is received at Step S2340, the determination is satisfied, the routine goes to Step S2350, and the RFID tag information gotten from the RFID circuit element To as read-out target is output similarly to the above and the routine goes to Step S2350.

At Step S2350, the RFID tag information gotten from the first RFID circuit element To as read-out target is output through the input/output interface 113 and the communication line NW, for example, and the routine goes to newly provided Step S2351.

At Step S2351, it is determined if the read-out of the corresponding RFID circuit elements To has been finished by all the antenna units 9 and the like being connected. If the read-out of all the antenna units 9 and the like has not been finished yet, the determination is not satisfied and the routine returns to Step S2310 and the similar procedure is repeated. If the read-out has been finished for all the units, the determination at Step S2351 is satisfied, and the routine goes to newly provided Step S2353.

At Step S2353, in response to the completion determination of the interruption read-out processing of all the units at Step S2351, the interruption flag is returned to Fr=0, the routine returns to Step S2302, the full read-out flag Fe'=1 is set, and the routine goes to Step S2355.

On the other hand, at the above-mentioned Step S2302, if it is determined at Step S2335 that the interruption flag Fr=1, the interruption read-out processing has been already executed once. At this time if the read-out processing has been completed for all the antenna units 9 and the like and the information has been gotten as mentioned above, the full read-out flag Fe'=1 is set at Step S2353, and the determination at Step S2303' is satisfied and the routine goes to Step S2355, and Fr=0 is set and the routine returns to Step S2302 again. On the other hand, if the reply signal has not been received yet in the interruption read-out processing having been already executed once and the information has not been gotten (the determination at Step S2335 is not satisfied and the routine goes to Step S2355 while the read-out has not been completed), since Step S353 is not passed or the read-out flag Fe'=1 is not set, the determination at Step S2303' is not satisfied, the routine goes to Step S2305, and the procedure of information read-out at Step S2305 and after is executed again.

Since the procedures and their transition modes and the like not particularly described are the same as those in FIG. 31, detailed description will be omitted.

FIG. 34 is a diagram conceptually illustrating an example of a behavior of the time sharing in this variation.

In FIG. 34, each time slot indicated by "1", "2", "3" and "4" in the figure corresponds to the communication with the first RFID circuit element To via the first radio communication executed in the read-out mode processing shown in FIG. 32 while the antenna units 9, 9', 9" are sequentially switched.

Each time slot indicated by "5" to "12" in the figure corresponds to a procedure executed in the writing mode processing. First, each time slot indicated by "5" and "6" in the figure corresponds to the communication with the first RFID circuit element To via the first radio communication executed in the interruption read-out mode processing shown in FIG. 33, while the antenna unit 9 and the like (an order of the antenna unit 9', the antenna unit 9" in this example) are sequentially switched. On the side of the apparatus main body 2, it corresponds from Step S115 in the flow of FIG. 29 to Step S220 shown in FIG. 30.

Each subsequent time slot indicated by "7", "8", "9" in the figure corresponds to Step S400 in the flow shown in FIG. 30 on the side of the apparatus main body 2.

Then, each time slot indicated by "10", "11", "12" in the figure corresponds to the communication with the first RFID circuit element To via the first radio communication executed in the interruption read-out mode processing shown in FIG. 33 while the antenna unit 9 and the like (the order of the antenna unit 9', the antenna unit 9" in this example) are sequentially switched. On the side of the apparatus main body 2, it corresponds from Step S230 in the flow of FIG. 30 to Step S160 shown in FIG. 29.

Then again, each time slot indicated by "13", "14", "15" and "16" in the figure corresponds to the communication with the first RFID circuit element To via the first radio communication executed in the read-out mode processing shown in FIG. 32 while the antenna units 9, 9', 9" are sequentially switched.

In the above, Step S225 in FIG. 30 and Step S2305 in FIG. 33 constitute a selection connecting portion for selectively connecting the unit antenna or the apparatus antenna to the information creating device according to the processing status during the tag label production processing described in each claim and also constitute a selection processing portion. Also, all the steps shown in the flow of FIGS. 29 and 33 constitute a coordination control portion configured to control the feeding device and the information creating device in coordination according to the label production instruction signal and to produce a RFID label by transmitting the access information created by the information creating device to the second RFID circuit element through the apparatus antenna.

In this variation constituted as above, too, the effect similar to that of the second embodiment is obtained. In addition, by configuring such that the plurality of (three in this example) antenna units 9, 9', 9" is connected and made selectively usable using the antenna switch 351, one of the plurality of antenna units provided with the loop antennas LC1 of different types can be selectively used. Particularly, by employing the method of making communication by connecting the antenna units 9, 9', 9" for each of the time-divided time slots, the radio communication can be made by using the plurality of (three in this example) antenna units at the same time on the basis of the signal from the single transmission circuit 306. As a result, convenience of the user can be further improved.

(2-2) When the first radio communication is made with a low frequency during the second radio communication:

FIG. 35 is a diagram conceptually illustrating an example of a behavior of the time sharing in this variation. As shown in the figure, in this variation, during a series of time slots indicated by "7" to "10" in the figure (corresponding to Step S400 in FIG. 30) in the writing mode processing, the time slot by the interruption read-out mode processing indicated by "8" is executed.

FIG. 36 is a flowchart illustrating a detailed procedure of the information writing at the above-mentioned Step S400 executed by the CPU 111 in this variation and corresponds to FIG. 15. The same reference numerals are given to the portions equivalent to those in FIG. 15 and the description will be omitted as appropriate.

In FIG. 36, in addition to the procedure in FIG. 15, Step S2432, Step S2434, Step S2436, Step S2438, and Step S2466, Step S2467, Step S2468 and Step S2469 are newly provided in this flow.

That is, Step S405 to Step S415 similar to those in FIG. 15 are executed, and if the determination at Step S420 is not satisfied, the routine goes to Step S425, and it is determined if M=5 or not at Step S430, and if the determination is not satisfied, the routine goes to newly provided Step S2432.

At Step S2432, it is determined if the time slot which has been started in response to the antenna unit 9 and the like has been finished or not as mentioned above. If the time slot has not been finished yet, the determination is not satisfied, the routine returns to Step S405, and the similar procedure is repeated from the transmission of the tag ID read-out command signal (using the same loop antenna LC1 of the antenna unit 9 and the like). If the time slot has been finished, the determination at Step S2432 is satisfied, the routine goes to Step S2434, and a flag Fc indicating that the single time slot has already elapsed (=information writing started) after the information writing is started (hereinafter referred to as slot counter flag as appropriate) is set to Fc=1. After that, the above-mentioned interruption flag Fr=1 is set at Step S2436 (thereby the interruption read-out processing, which will be described later, is started), and the routine goes to Step S2438.

At Step S2438, the standby is continued till the slot counter flag Fc set to one at Step S2434 is changed to zero at Step S2365 of the interruption read-out processing in FIG. 37, which will be described later, and if it becomes Fc=0 (=if one time slot by the interruption read-out processing is finished. The details will be described later), the determination at Step S2438 is satisfied, the routine returns to Step S405, and the similar procedure is repeated.

On the other hand, if the determination at Step S420 is satisfied, Step S440 to Step S455 similar to FIG. 15 is carried out, while if the determination at Step S455 is not satisfied, the routine goes to Step S460, where it is determined if N=5 at Step S465, and if the determination is not satisfied, the routine goes to newly provided Step S2466.

Step S2466 to Step S2469 are similar to the above-mentioned Step S2432 to Step S2438. That is, at Step S2466, it is determined if the time slot has been finished or not, and if the determination is satisfied, the routine goes to Step S2467, where the slot counter flag Fc=1 is set. After that, at Step S2468, the interruption flag Fr=1 is set, and when it is Fc=0 and the determination at the subsequent Step S2469 is satisfied, the routine returns to Step S2466, and the similar procedure is repeated.

Since the procedures and their transition modes and the like not particularly described are the same as those in FIG. 15, detailed description will be omitted.

FIG. 37 is a flowchart illustrating a detailed procedure of the interruption read-out processing executed by the CPU 111 in this variation and corresponds to FIGS. 31 and 33. The same reference numerals are given to the portions equivalent to those in FIGS. 31 and 33, and the description will be omitted as appropriate.

In FIG. 37, in addition to the procedures in the flow shown in FIG. 33, Step S2308, Step S2309, Step S2360 and Step S2365 are newly provided in this flow.

That is, via Step S2301, Step S2302, Step S2303', Step S2305, Step S2310, and Step S2330 similar to the above, it is determined if the reply signal has been received or not at Step S2340. If the determination at Step S2340 is not satisfied, and moreover, if the determination is not satisfied at Step S2335, the routine goes to Step S2337. Then, at Step 2337, it is determined if the time slot has been already finished or not as mentioned above, and if the determination is not satisfied, the routine returns to Step S2330 similarly to the above and the similar procedure is repeated. If the time slot is finished and the determination at Step S2337 is satisfied, the routine goes to newly provided Step S2308.

At Step S2308, it is determined if the slot counter flag Fc=1 is set at Step S2434 or Step S2467 in the above-mentioned FIG. 36 or not (=if one time slot has already elapsed or not since the information writing is started). If it is not Fc=1 but still Fc==0, the determination is not satisfied, the routine goes to Step S2310 and the similar procedure is repeated. If it is Fc=1, the determination at Step S2308 is satisfied, the routine goes to newly provided Step S2309, the slot counter flag Fc and the interruption flag Fr are returned to zero, respectively, and the routine returns to Step S2302, where the similar procedure is repeated.

On the other hand, if the determination at Step S2340 is satisfied and the determination at Step S2351 is not satisfied after Step S2350, the routine goes to newly provided. Step S2360. At Step S2360, similarly to Step S2308, it is determined if the slot counter flag Fc=1 is set at Step S2434 or Step S2467 in the above-mentioned FIG. 36 or not (=if one time slot has already elapsed or not since the information writing is started) similarly to Step S2308. If it is not Fc=1 but still Fc=0, the determination is not satisfied, the routine goes to Step S2310 and the similar procedure is repeated. If it is Fc=1, the determination at Step S2360 is satisfied, the routine goes to Step S2365 similar to the newly provided S2309, the slot counter flag Fc and the interruption flag Fr are returned to zero, respectively, and the routine returns to Step S2302, where the similar procedure is repeated.

Since the procedures and their transition modes and the like not particularly described are the same as those in FIGS. 31 and 33, detailed description will be omitted.

In FIG. 35, each time slot indicated by "1", "2", "3" and "4" in the figure corresponds to the communication with the first RFID circuit element To via the first radio communication executed in the read-out mode processing shown in FIG. 32 while the antenna units 9, 9', 9" are sequentially switched similarly to FIG. 34.

Each time slot indicated by "5" to "13" in the figure corresponds to a procedure executed in the writing mode processing. First, each time slot indicated by "5" and "6" in the figure corresponds to the communication with the first RFID circuit element To via the first radio communication executed in the interruption read-out mode processing shown in FIG. 37, while the antenna unit 9 and the like (an order of the antenna unit 9', the antenna unit 9" in this example) are sequentially switched similarly to the above. On the side of the apparatus main body 2, it corresponds from Step S115 in the flow of FIG. 29 to Step S220 shown in FIG. 30.

Each of the subsequent time slots indicated by "7", "9" and "10" in the figure corresponds to Step S400 in the flow shown in FIG. 30 on the side of the apparatus main body 2. At this time, the time slot of "7" in the figure corresponds to the state before the determination at Step S2432 (or Step S2466) is satisfied in FIG. 36. The time slot of "8" in the figure corresponds to the communication with the first RFID circuit element To by the first radio communication using any one of the antenna unit 9 and the like (the antenna unit 9 in this example) till the determination of Fc=1 is satisfied (it is Fc=1 at Step S2434 or Step S2467 in FIG. 36) at Step S2308 (or Step S2360) in FIG. 37 in the flow started from Step S2302 of Step S24" by Fr=1 at Step S2436 (or Step S2468) in FIG. 36.

The subsequent time slot indicated by "9" and "10" corresponds to the state where the second radio communication with the second RFID circuit element is resumed by returning to Step S405 or Step S440 since Step S2438 or Step S2469 in FIG. 36 is satisfied by Fc=0 at Step S2309 or Step S2365 in FIG. 37 (In this example, a case in which the information writing is completed at the "9" time slot and the "10" time slot without the retry number of times reaching M=5, N=5 is used as an example).

Each time slot indicated by "11", "12" and "13" in the figure corresponds to the communication with the first RFID circuit element To by the first radio communication executed in the interruption read-out mode processing shown in FIG. 37, while the antenna unit 9 and the like (an order of the antenna unit 9', the antenna unit 9'' in this example) is sequentially switched. On the side of the apparatus main body 2, it corresponds from Step S230 in the flow of FIG. 30 to Step S160 shown in FIG. 29.

Also, each time slot indicated by "14", "15" and "16" corresponds to the communication with the first RFID circuit element To by the first radio communication executed in the read-out mode processing shown in FIG. 32, while the antenna units 9, 9', 9'' are sequentially switched.

In the above, Step S225 in FIG. 30 and Step S2305 in FIG. 31 constitute a selection connecting portion configured to selectively connect the unit antenna or the apparatus antenna to the information creating device according to the processing status during the tag label production processing described in each claim and also constitute a selection processing portion. Also, all the steps shown in the flow of FIGS. 29 and 37 constitute a coordination control portion configured to control the feeding device and the information creating device in coordination according to the label production instruction signal and to produce a RFID label by transmitting the access information created by the information creating device to the second RFID circuit element through the apparatus antenna.

In the second variation constituted as above, too, the effect similar to that of the first variation (2-1) is obtained. Also, by conducting the first radio communication with the first RFID circuit element To with a low frequency during the second radio communication to the second RFID circuit element To, a blank period of the first radio communication can be shortened, by which convenience can be further improved.

(2-3) When a refusal function of a mode instruction signal is provided and the like:

That is, in the second embodiment, as mentioned using the flow of FIG. 12 similar to the first embodiment, if a label production instruction is output from the PC 118 by the operation of the operator, the routine goes to the writing mode processing and if not, the read-out mode processing is carried out automatically, but not limited to that, it may be so configured that the routine goes to the read-out mode processing only if the read-out instruction is output (such as simply waiting if no instruction is given and the like).

Also, in this case, during the tag access processing shown in FIG. 30 of the second embodiment, while the antenna LC2 is connected to the transmission circuit 306 at Step S225 and the radio communication (second radio communication) is carried out with the second RFID circuit element To at Step S400, even if a read-out instruction is output by the operation from the PC 118, it may be so configured that this is ignored and connection is not made to the antenna LC1 of the antenna unit 9. Moreover, at this time, a response signal indicating that instruction is not allowed (since a label is being produced) may be returned to the PC 118 in response to the read-out instruction signal. As a result, misrecognition of the result of the information writing communication with the second RFID circuit element To at the label production as a result of the reader communication with the first RFID circuit element To can be surely prevented.

(2-4) Others:

Though not particularly described in the above, for example, it may be so configured that lighting display device LD (See a virtual line in FIG. 7) made of an LED and the like is provided at an appropriate spot in the housing 200, and a light control signal is output from the CPU 111 so as to light the lighting display device LD during execution of the read-out mode processing or execution of the interruption read-out processing for visual recognition. Alternatively, when the transmission/reception with the first RFID circuit element To at the read-out spot is completed (when the determination at Step S2340 in each figure is satisfied and the like, for example), too, the lighting display device LD may be lighted so as to make visual notification (notifying device). Not limited to the visual notification, audio notification may be made by sound.

In the above, using a loop antenna as the apparatus antennas LC1, LC2 and the antenna 152 on the side of the RFID circuit element To, information transmission/reception is made by magnetic induction (including electromagnetic induction, magnetic coupling and other non-contact methods through an electromagnetic field), but not limited to that, as the above antenna, a dipole antenna, a patch antenna and the like may be used as the transmission/reception device so that information transmission/reception is made via radio-wave communication using reflection, for example.

Also, in the above, the apparatus for producing RFID labels having the opening/closing lid 3 on the upper side of the apparatus main body 2 and the cartridge 7 attached to the upper side in the lateral state (so-called laterally-attached cartridge type) is described as an example, but not limited to that, the present invention may be applied to an apparatus for producing RFID labels having the opening/closing lid on the side face side of the apparatus main body and the cartridge 7 attached on the side face side in the longitudinal state (so-called longitudinally-attached cartridge type).

Also, in the above, cable connection is made between the antenna unit 9 and the apparatus main body 2 using the cable 223, but not limited to that, a signal may be transmitted/received via radio communication between the antenna unit 9 and the apparatus main body 2.

Also, in the above, a case in which the RFID label T is produced by transmitting the RFID tag information to the RFID circuit element To and writing it in the IC circuit part 151 is described, but not limited to that. That is, as having been already described, the present invention may be applied to a case in which the RFID label T is produced by reading out the RFID tag information from the read-only RFID circuit element To in which predetermined RFID tag information is stored and held in advance non-rewritably and by applying the corresponding print, and in this case, too, the effect similar to the above can be obtained.

Also, in the above, such a method is employed that a print is applied on the cover film 103 separate from the base tape 101 provided with the RFID circuit element To and they are affixed to each other, but not limited to that, the present invention may be applied to a method in which the print is applied on a print region of a print-receiving layer provided at the tag tape, for example (not affixing type).

Also, in the above, a case in which the tag label tape 109 with print for which the print and access to the RFID circuit element To (for information writing or information read-out) have been finished is cut off by the cutting mechanism 15 so as to produce the RFID label T is described as an example, but not limited to that. That is, if label mounts (so-called die-cut labels) separated in advance to a predetermined size corresponding to the label are sequentially arranged on the tape fed out of the roll, the RFID label T may be produced by peeling off only the label mount (on which the accessed RFID circuit element To is provided and the corresponding print has been applied) from the tape after the tape is discharged from the label carry-out exit 11 without cutting it by the cutting mechanism 15, and the present invention can also be applied to such a case.

In the above, a case in which the first roll 102 is constituted by winding the base tape 101 around the reel member 102a, the roll is arranged in the cartridge 7 and the base tape 101 is fed out thereof is described as an example, but not limited to that. For example, a lengthy flat sheet or strip state tape or sheet on which at least one RFID circuit element To is located (including those formed by cutting it to an appropriate length after the tape wound around a roll is fed out) is stacked in a predetermined storage portion (flatly stacked in a tray-state container, for example) to be made into a cartridge, and the cartridge may be attached to a cartridge holder on the side of the apparatus for producing RFID labels so that transfer and transport are made from the storage portion for the print and writing and the RFID label is produced.

Moreover, there may be such configurations that the roll is directly attached to the apparatus for producing RFID labels detachably or the lengthy flat sheet or strip state tape or sheet is transferred from outside the apparatus for producing RFID labels one by one and supplied into the apparatus for producing RFID labels by a predetermined feeder mechanism, or furthermore, not even limited to those detachably attached on the side of the apparatus main body for producing RFID labels such as the cartridge 7, the first roll 102 may be provided as a so-called installed type or integral type non-detachably attached to the side of the apparatus main body. In this case, too, the same effect can be obtained.

In the RFID tag information system described in the first and second embodiments and the variations thereof, the switching of connection to the loop antenna LC2 on the side of the apparatuses 1, 1' for producing RFID labels and the loop antenna LC1 on the side of the antenna unit 9 (that is, selection processing of the transmission path of the information for access or access acquisition information) is made by switching connection in terms of hardware in the apparatus main body 2, but the present invention is not limited to that. That is, for example, the selection processing of the transmission path of the information may be made by address designation through the network such as LAN connected outside the apparatus main body. In the following, a third embodiment of the RFID tag information system in which the selection processing of the transmission path of the information is made through the network will be described.

The RFID tag information system according to the third embodiment of the present invention will be described below referring to the attached drawings. The same reference numerals are given to the portions equivalent to those in the first and second embodiments, and the description will be omitted or simplified as appropriate.

FIG. 38 is a system configuration diagram illustrating an entire configuration of the RFID tag information system of the third embodiment.

In FIG. 38, a RFID tag information reading system 3001, which is the RFID tag information system of the third embodiment has an apparatus 3300 for producing RFID labels (management server for RFID tag information), a plurality of (two units in this example) readers 3200 (reader for RFID tag information), a plurality of (two units in this example) PC terminals 3100 (operation terminals), and a hub 3030 (delivery connection device).

The apparatus 3300 for producing RFID labels produces a RFID label T having the RFID circuit element To (See the above-mentioned FIG. 8) provided with the IC circuit part 151 storing information and the antenna 152 (tag antenna) connected to the IC circuit part 151 and has a function as RIS (Registration Information Server) configured to store and deliver the RFID tag information read out of the RFID circuit element To of the RFID label T to a predetermined transmission destination.

The reader 3200 has an antenna 3210, which is a patch antenna, and reads out the RFID tag information from the RFID circuit element To of the RFID label T.

The PC terminal 3100 has a display portion 3101 and an operation portion 3102, and to the PC terminal 3100, the RFID tag information read out by the corresponding reader 3200 among the plurality of readers 3200 is transmitted.

The hub 3030 (delivery connection device) constitutes a network by connecting the apparatus 3300 for producing RFID labels, the plurality of readers 3200, and the plurality of PC terminals 3100 capable of transmission/reception of information.

In this third embodiment, the RFID tag information reading system 3001 is used for attendance management of employees. That is, each reader 3200 is placed at a desk D on which the PC 3110 and the like of each employee (in this example, subordinates a, b) is provided, and by communicating with the RFID circuit element To provided at an employee identification card each employee holds, attendance information (sign-in time, sign-out time and the like) of each employee is gotten. Moreover, in operation files used by the employee and various materials and the like, the RFID label storing the files and the contents of the materials (file names, material names and the like) is provided, and by communicating with the RFID label of the operation files and materials used by each employee at the desk D, work information of each employee is obtained. The attendance management information read out as above (including the sign in/out information and work information) is transmitted to the PC terminal 3100 of a boss of each employee (a boss A of the subordinate a and a boss B of the subordinate b in this example) through the hub 3030, respectively.

At this time, a region capable of communication conducted through the antenna 3210 of each reader 3200 (shown by regions X, Y in the figure) is set so as to sufficiently cover the desk of each employee so that read-out is not missed, and thus, a duplicated region Z in which the plurality of readers 3200 (the reader 3200 of the subordinate a and the reader 3200 of the subordinate b in this example) can make communication is generated.

As the hub 3030, a switching hub that can interpret address information of data and transmit the data only to an appropriate destination is used, for example. Not limited to that, a usual hub not having a switching function, a router relaying data from a network to another network or a server and the like may be used.

The transmission destination of the RFID tag information read out through the antenna 3210 of the reader 3200 may be set by reading out the RFID label T for setting the transmission destination when the reader 3200 is connected to the hub 3030, for example (the details will be described later).

The PC terminal 3100 has the display portion 3101 and the operation portion 3102 as mentioned above, and a user (boss A, B and the like) can input various commands or various types of information to the apparatus 3300 for producing RFID labels using the operation portion 3102 referring to a display screen displayed on the display portion 3101.

FIG. 39 is an entire configuration diagram conceptually illustrating an entire configuration of the reader 3200 and the apparatus 3300 for producing RFID labels. Arrows in the figure show an example of a flow of signals and do not limit the flow direction of the signals.

In FIG. 39, the apparatus 3300 for producing RFID labels includes a function as RIS and a function to produce a RFID label as mentioned above. That is, the apparatus 3300 for producing RFID labels has a roll 3304 of a tape with RFID tags around which a tag tape 3303 (tag medium) provided with RFID circuit elements To with a predetermined interval is wound, a print head 3305 configured to apply a desired print on a region corresponding to each RFID circuit element To in the tag tape 3303 fed out of the roll 3304 of a tape with RFID tags, a feeding roller 3308 (feeding device) configured to feed the tag tape 3303, an antenna 3306 (antenna for label production) and a radio frequency circuit 3301 configured to carry out information transmission/reception via radio communication with the RFID circuit element To and to write the RFID tag information, a cutter 3307 configured to cut the tag tape 3303 for which the print on the tag tape 3303 and the information writing in the RFID circuit element To have been finished to a predetermined length to have the above-mentioned RFID label T, an interface control portion 3309 configured to execute control of communication made with the plurality of PC terminals 3100 through the hub 3030, a nonvolatile storage portion 3310 (read-out information storage device, access information processing device) configured to store transmission destination information of the RFID tag information read out through the reader 3200 and the like, and a control circuit 3311 configured to control the radio frequency circuit 3301, the print head 3305, the cutter 3307, the feeding roller 3308, the interface control portion 3309, and the storage portion 3310 and the like. Here, as the apparatus 3300 for producing RFID labels a type of direct printing on the tag tape 3303 (not affixing type) is shown as an example, but not limited to that.

On the other hand, the reader 3200 has the antenna 3210 (antenna for read-out, transmission/reception antenna) configured to transmit/receive a signal via radio communication with the antenna 152 of the RFID circuit element To provided at the RFID label T provided in the files, materials and the like, respectively, a radio frequency circuit 3201 configured to access (for reading in this example) the IC circuit part 151 of the RFID circuit element To through the antenna 3210 and to process a signal read out of the RFID circuit element To, a control circuit 3202 configured to include functions to process the signal read out of the IC circuit part 151 of the RFID circuit element To through the radio frequency circuit 3201 and read out information and including a function to create the access information to access the IC circuit part 151 of the RFID circuit element To and to control an operation of the entire reader 3200, a storage portion 3203 capable of storing the RFID tag information and the like read out of the RFID circuit element To, and an interface control portion 3204 configured to control communication with the apparatus 3300 for producing RFID labels and the PC 3100 through the hub 3030.

In this example, the RFID circuit element To provided at the RFID label T includes the antenna 152 constituted by a dipole antenna, and information transmission/reception is carried out via radio-wave communication with the antenna 3210 of the reader 3200 constituted by a patch antenna as mentioned above.

FIG. 40 is a functional block diagram illustrating a configuration of a control system of the reader 3200. Though not shown here, the radio frequency circuit 3301 of the apparatus 3300 for producing RFID labels has a configuration equivalent to that of the radio frequency circuit 3201, which will be described below. Also, the arrows in the figure show an example of a flow of the signals and do not limit the flow direction of the signals.

In FIG. 40, the radio frequency circuit 3201 is constituted by a transmission portion 3212 configured to transmit a signal to the RFID circuit element To through the antenna 3210, a receiving portion 3213 into which a reflective wave from the RFID circuit element To received by the antenna 3210 is input, and a transmit-receive splitter 3214.

The transmission portion 3212 includes a crystal oscillator 3230 configured to generate a carrier wave for reading out the RFID tag information in the IC circuit part 151 of the RFID circuit element To, a PLL (Phase Locked Loop) 3231 and a VCO (Voltage Controlled Oscillator) 3232 that generate a signal with a predetermined frequency by control of the control circuit 3202, a transmission multiplying circuit 3216 (however, it may be replaced by an amplitude factor variable amplifier or the like in the case of "TX_ASK" signal) that modulates (in this case, amplitude modulation based on the "TX_ASK" signal supplied from the control circuit 3202) the carrier wave generated on the basis of a signal supplied from the control circuit 3202, and a transmission amplifier 3217 that amplifies the modulated waves modulated by the transmission multiplying circuit 3216 (with an amplification factor determined according to a "TX_PWR" signal from the control circuit 3202 in this example). The carrier wave generated as above preferably uses a frequency of a UHF band, a microwave band or a short wave band, and the output from the transmission amplifier 3217 is transmitted to the antenna 3210 through the transmit-receive splitter 3214 and is supplied to the IC circuit part 151 of the RFID circuit element To. The RFID tag information is not limited to a signal modulated as above but may be a mere carrier wave depending on the case.

The receiving portion 3213 includes an I-phase receiving signal multiplying circuit 3218 that multiplies and demodulates the reflected wave from the RFID circuit element To received at the antenna 3210 with the carrier wave generated as above, an I-phase bandpass filter 3219 that extracts only the signals within a necessary band range from the output of the I-phase receiving signal multiplying circuit 3218, an I-phase receiving signal amplifier 3221 that amplifies the output of the I-phase bandpass filter 3219, an I-phase limiter 3220 that further amplifies the output of the I-phase receiving signal amplifier 3221 and converts it to a digital signal, a Q-phase receiving signal multiplying circuit 3222 that multiplies the reflected wave from the RFID circuit element To received at the antenna 3210 with the carrier wave that is delayed by a phase shifter 3227 by 90° after having been generated as above, a Q-phase bandpass filter 3223 that extracts only the signals within the necessary band range from the output of the Q-phase receiving signal multiplying circuit 3222, and a Q-phase receiving signal amplifier 3225 that amplifies the output of the Q-phase bandpass filter 3223, and a Q-phase limiter 3224 that further amplifies the output of the Q-phase receiving signal amplifier 3225 and converts it to a digital signal. A signal "RXS-I" output from the I-phase limiter 3220 and a signal "RXS-Q" output from the Q-phase limiter 3224 are input to the control circuit 3202 for processing.

Also, the outputs from the I-phase receiving signal amplifier 3221 and the Q-phase receiving signal amplifier 3225 are input to an RSSI (Received Signal Strength Indicator) circuit 3226 as a strength detection device and a signal "RSSI" indicating the strength of these signals is input to the control circuit 3202. As a result, the reader 3200 can detect the signal strength from the RFID circuit element To during communication with the RFID circuit element To.

Also, the control circuit 3202 carries out information transmission/reception with the apparatus 3300 for producing RFID labels and the plurality of PC terminals 3100 through communication control of the interface control portion 3204 as well as writing and reading-out of various types of information with respect to the storage portion 3203.

FIG. 41 is a functional block diagram illustrating a detailed function of the control circuit 3311 of the apparatus 3300 for producing RFID labels.

In FIG. 41, the control circuit 3311 is a so-called microcomputer and is constituted by a CPU 3311A, which is a central processing unit, a ROM 3311B, a RAM 3311C, a circuit control portion 3311D for signal transmission/reception with the radio frequency circuit 3301 and the like and configured to carry out signal processing according to a program stored in the ROM 3311B in advance while using a temporary storing function of the RAM 3311C.

In the RFID tag information reading system 3001 with the above configuration, the attendance management information of each employee is read out by the reader 3200 provided on the desk of each employee and transmitted to the PC terminal 3100 of the boss of each employee through the hub 3030, respectively. At this time, since the duplicated region Z is present in the communicable region executed through the antenna 3210 of each reader 3200 as mentioned above, the RFID tag information might be read out by the plurality of readers 3200 depending on the position of the employee, file or material. In this case, receiving signal strength at each reader 3200 is compared with each other and the reader with larger signal strength is considered as an appropriate reader, and the RFID tag information is transmitted to a transmission destination corresponding to the reader.

When the transmission destination of the RFID tag information read out is to be set for each reader 3200, the reader 3200 for which the setting is to be made is connected to the hub 3030 and then, a user (the boss A, B and the like, for example) first inputs necessary information using the operation portion 3102 of the PC terminal 3100 so as to produce the RFID label T for setting in which the transmission destination information is written (hereinafter described as "setting tag T" as appropriate) by the apparatus 3300 for producing RFID labels. Subsequently, by bringing the produced RFID label T closer to the reader 3200 as a setting target of the information transmission destination (the reader 3200 of the subordinates a, b in this example) so as to read out the RFID tag information, the information transmission destination of the reader 3200 is set in the apparatus 3300 for producing RFID labels, and the reader 3200 and the transmission destination information are stored in association with each other. As a result, the RFID tag information read out from the RFID label T for information reading attached to the employee ID card, file, material and the like (hereinafter described as "general tag T" as appropriate) by the reader 3200 for which the information transmission destination is set is transmitted to the set transmission destination after that.

FIG. 42 is a flowchart illustrating a control procedure executed by the control circuit 3311 of the apparatus 3300 for producing RFID labels when the RFID label T for setting is to be produced.

In FIG. 42, first, at Step S3105, it is determined if a production instruction of the setting tag T has been input or not. The determination is made by determining if a command signal has been input or not when a user (boss A, B and the like, for example) makes a production instruction input of the setting tag using the operation portion 3102 of the PC terminal 3100. This step is repeated till a production start instruction is input, and if there is an input, the determination is satisfied, and the routine goes to the subsequent Step S3110.

At Step S3107, the transmission destination information indicating the transmission destination of the RFID tag information read out by the reader 3200 is input. This input is made, for example, by having an input screen of the transmission destination information (network address, for example) displayed on the display portion 3101 of the PC terminal 3100 and by receiving the transmission destination information input by the user using the operation portion 3102 through the hub 3030 according to the display. In the third embodiment, as the information transmission destination, the PC terminal 3100 arranged corresponding to the reader 3200 for setting (that is, the transmission destination of the reader 3200 of the subordinate a is the PC terminal 3100 of the boss A, and the transmission destination of the reader 3200 of the subordinate b is the PC terminal 3100 of the boss B) is set.

The transmission destination information is input by the user here, but not limited to that. By connecting the PC terminal 3100 through the hub 3030, for example, the apparatus 3300 for producing RFID labels can obtain an IP address (Internet Protocol Address) of the PC terminal 3100, and the information transmission destination may be automatically set using the obtained IP address. In this case, since a labor of the user to input the transmission destination information through the PC terminal 3100 is saved, the operation burden on the user can be further reduced, and the convenience can be further improved.

At the subsequent Step S3110, a setting tag flag indicating that the RFID label T having the RFID circuit element To to be a writing target is for setting the information transmission destination of the reader 3200 is created, and tag writing information for writing it with the input transmission destination information in the RFID circuit element To is created.

At the subsequent Step S3113, print information to be printed on the label surface of the setting tag T is input. The print information is identification information that can identify the reader for which the information transmission destination is to be set and is constituted by an identification number of the reader or a name of the employee corresponding to the reader and the like, for example. The input of the print information is made by having the input screen of the print information displayed on the display portion 3101 of the PC terminal 3100 and by receiving the print information input by the user using the operation portion 3102 through the communication line NW according to the display.

Note that, the print information is input by the user in the above, but not limited to that, the print information may be automatically set on the basis of the contents of the tag writing information set at Step S3110.

At the subsequent Step S3115, a control signal is output to the feeding roller 3308, for example, so as to feed the tag tape 3303 out of the roll 3304 of a tape with RFID tags by a driving force of a motor to drive cartridge shaft (not shown).

After that, the routine goes to Step S3120, where it is determined if the tag tape 3303 has been fed by a predetermined value C (for example, a feeding distance for which the RFID tag information writing to the preceding RFID circuit element To is finished and the subsequent RFID circuit element To reaches a position substantially opposed to the antenna 3306) or not. This feeding distance determination may be made only by detecting marking provided at the tag tape 3303 by a known tape sensor (not shown), for example. If the determination is satisfied, the routine goes to Step S3200.

At Step S3200, the tag information writing/print processing is carried out, a transmission signal including the RFID tag information is transmitted to the RFID circuit element To on the tag tape 3303 for writing, and a print is applied on the corresponding print region (not shown) on the tag tape 3303 by the print head 3305 (for the detailed procedure, see FIG. 43, which will be described later). If this Step S3200 is finished, the routine goes to Step S3135.

At Step S3135, it is checked if all the prints on the print region corresponding to the RFID circuit element To to be processed at this time in the tag tape 3303 have been completed or not, and then, the routine goes to Step S3140.

At Step S3140, it is determined if the tag tape 3303 has been further fed by a predetermined amount (for example, the feeding distance for which the RFID circuit element To as a target and all the print regions exceed the cutter 3307 by a predetermined length (margin amount)) or not. The feeding distance determination at this time may be also made only similarly to the above-mentioned Step S3120, for example. If the determination is satisfied, the routine goes to Step S3145.

At Step S3145, a control signal is output to the feeding roller 3308 so as to stop driving of the motor to drive shaft, and feeding-out and transport of the tag tape 3303 from the roll 3304 of a tape with RFID tags are stopped.

After that, at Step S3150, a control signal is output to a solenoid driving circuit, not shown, so as to drive a solenoid for cutter (not shown), for example, and the tag tape 3303 is cut by the cutter 3307. As mentioned above, all the tag tape 3303 including the RFID circuit element To to be processed and the region S, for example, have sufficiently exceeded the cutter 3307 at this time, and by the cutting by this cutter 3307, the RFID tag information is written in the RFID circuit element To and the label-shaped RFID label T on which the corresponding desired print has been applied is produced.

After that, the routine goes to Step S3155, where the RFID label T produced in the label shape at Step S3150 is discharged to outside the apparatus 3300 for producing RFID labels (a roller for discharge provided separately may be driven and controlled or the operator may take it out manually). As a result, the flow is finished.

By means of the above control, the RFID label T for setting in which the transmission destination information corresponding to the reader 3200 as transmission destination setting target is written is produced by the apparatus 3300 for producing RFID labels.

Note that, the above flow does not limit this embodiment to the procedure shown in the flow, but the procedures may be changed within a scope not departing from the gist and technical idea such as switching Step S3107 and Step S3110 with Step S3113, for example.

FIG. 43 is a flowchart illustrating a detailed procedure of Step S3200.

In FIG. 43, first, at Step S3235, a control signal is output to a print-head driving circuit, not shown, for example, so as to supply current to the print head 3305, and printing of the print information input at the above-mentioned Step S3113 is started on the print region corresponding to the RFID circuit element To as processing target in the tag tape 3303.

Then, the routine goes to Step S3240, where a signal for writing desired data (tag writing information created at Step S3110 here) in the memory portion 3155 of the RFID circuit element To (Write command signal in this example) is generated and transmitted to the RFID circuit element To as information writing target through the radio frequency circuit 3301, and the information is written in the memory portion 3155. At this time, the Write command signal includes the transmission destination information indicating the transmission destination of the RFID tag information read out through the reader 3200, and moreover, the setting tag flag indicating that the RFID label T is for setting the information transmission destination of the reader 3200 is also included as mentioned above.

After that, at Step S3245, a signal for reading out data recorded in the memory part 157 of the applicable tag (Read command signal in this example) is generated for checking availability of a communication result and transmitted to the RFID circuit element To as information writing target through the radio frequency circuit 3301, and a reply is prompted.

After that, at Step S3250, the reply signal transmitted from the RFID circuit element To as writing target in response to the Read command signal is received through the antenna 3306 and taken in through the radio frequency circuit 3301.

Subsequently, at Step S3255, on the basis of the reply signal, the information stored in the memory portion 3155 of the RFID circuit element To is checked, and it is determined if the above-mentioned transmitted predetermined information is normally stored in the memory portion 3155 or not. If the determination is satisfied, this routine is finished. As a result, the information writing in the RFID circuit element To as writing target is completed. If the determination is not satisfied, the routine returns to Step S3240, where the similar procedure is repeated.

By means of the above routine, the corresponding information is written in the RFID circuit element To as writing target on the tag tape 3303, and the desired print can be printed on the corresponding print region on the tag tape 3303.

The above flow does not limit this embodiment to the procedure shown in the flow, but the procedures may be changed within a scope not departing from the gist and technical idea such as arranging Step S3235 after Step S3255, for example.

FIG. 44 is a diagram conceptually illustrating data contents stored in the memory portion 3155 of the IC circuit part 151 in the RFID circuit element To provided at the RFID label T produced as above.

In FIG. 44, the RFID circuit element To of the RFID label T stores and holds the tag ID as the tag identification information, the setting tag flag indicating that it is the tag for setting information transmission destination of the reader 3200, and the transmission destination information indicating the transmission destination of the RFID tag information (network address, for example) read out through the reader 3200.

FIG. 45 is a flowchart illustrating a control procedure executed by the control circuit 3202 of the reader 3200 when the RFID tag information is read out by the reader 3200. The following flow is executed independently in each of the readers 3200, but the flow may be executed every certain cycle at the same timing in the plurality of readers 3200, for example.

In FIG. 45, first, at Step S3510, an inquiry signal that reads out information stored in the IC circuit part 151 of the RFID circuit element To of the RFID label T, respectively, is generated and transmitted to the RFID circuit element To provided at the above-mentioned employee ID card, file, material and the like present in the communicable region through the radio frequency circuit 3201 and the antenna 3210, and a reply is prompted.

After that, the routine goes to Step S3520, where it is determined if the reply signal transmitted (returned) from the RFID circuit element To of the RFID label T in response to the inquiry signal has been received or not through the antenna 3210 and the radio frequency circuit 3201. If no reply signal is received from any of the RFID labels T, the determination is not satisfied and the routine returns to Step S3510, where the transmission of the inquiry signal is repeated again. On the other hand, if the reply signal has been received from the RFID label T, the determination is satisfied, and the routine goes to the subsequent Step S3530.

At Step S3530, on the basis of the received reply signal, the RFID tag information of the RFID label T that transmitted (returned) the reply signal is read out and gotten. In the RFID tag information, if the RFID label T that transmitted (returned) the reply signal is the setting tag, the transmission destination information indicating the transmission destination of the RFID tag information read out through the antenna 3210 of the reader 3200 and the setting tag flag indicating that the RFID label T is for setting the information transmission destination of the reader 3200 are included as mentioned above. On the other hand, if the RFID label T that transmitted (returned) the reply signal is not the setting tag but the general tag, the information (it may be data itself or may be identification information such as a tag ID and the like associated with the data) is included. Incidentally, the RFID tag information is temporarily stored in the storage portion 3203.

At the subsequent Step S3540, a signal "RSSI" indicating strength of the received reply signal is input from the RSSI circuit 3226.

At the subsequent Step S3550, the RFID tag information gotten and stored at Step S3530 is transmitted to the apparatus 3300 for producing RFID labels through the interface control portion 3204 and the hub 3030 together with signal strength information input at Step S3540. Then, this flow is finished.

The above flow does not limit this embodiment to the procedure shown in the flow, but the procedures may be changed within a scope not departing from the gist and technical idea such as switching between Step S3530 and Step S3540, for example.

FIG. 46 is a flowchart illustrating a control procedure executed by the control circuit 3311 of the apparatus 3300 for producing RFID labels when the RFID tag information is received from the reader 3200.

First, at Step S3310, it is determined if a signal output from the reader 3200 through the hub 3030 and the interface control portion 3309 has been received or not. If received, the determination is satisfied, and the routine goes to the subsequent Step S3315.

At Step S3315, on the basis of the received signal, the RFID tag information of the RFID label T read out by the reader 3200 and the receiving signal strength information are gotten. Moreover, the identification information (IP address and the like) that can specify the reader 3200 having transmitted the signal is gotten. The gotten information is temporarily stored in the storage portion 3310. At this time, if the signal is received from the plurality of readers 3200, the RFID tag information and the receiving signal strength information are gotten in association with each of the readers.

At the subsequent Step S3320, it is determined if the signal has been received from the plurality of readers 3200 at the same time at Step S3310 or not. The same time here does not refer to complete simultaneity only but includes a case in which a difference in receiving time is included in a time range set in advance. If the signal has been received from the plurality of readers 3200 at the same time, the determination is satisfied and the routine goes to Step S3400.

At Step S3400, the receiving signal strengths are compared, and information sorting processing to specify the transmission destination of the information is carried out (for the details, see FIG. 47, which will be described later), and then, this flow is finished.

On the other hand, at Step S3320, if the signal has not been received from the plurality of readers 3200 at the same time, the determination is not satisfied and the routine goes to the subsequent Step S3325.

At Step S3325, on the basis of the RFID tag information gotten at Step S3315, it is determined if the RFID label T from which the information is read out is the setting tag or not. That is, if the setting tag flag is included in the gotten RFID tag information, the tag is considered to be the setting tag, the determination is satisfied, and the routine goes to the subsequent Step S3330.

At Step S3330, the transmission destination information is gotten from the RFID tag information read out and stored from the RFID label T at Step S3315 (sorting-destination information acquisition portion).

At the subsequent Step S3335, the transmission destination information gotten at Step S3330 and the identification information of the reader 3200 from which information read-out is carried out from the RFID circuit element To of the RFID label T are associated with each other, and the associated information is stored in the storage portion 3310 (or may be the RAM 3311C provided of the control circuit 3311). At this time, if the information has been stored in the past, the information is updated and stored. Then, this flow is finished.

At Step S3325, if the setting tag flag is not included in the gotten RFID tag information, the tag is considered as the general tag for reading out the information attached to the employee ID card, file, material and the like, the determination is not satisfied, and the routine goes to Step S3345.

At Step S3345, it is determined if the transmission destination information and the reader identification information are associated and stored in the storage portion 3310 at Step S3335 or not. If not stored, the determination is not satisfied and the routine goes to Step S3360, and a control signal is output to the PC terminal 3100 (of all the units, for example) through the hub 3030 and an error display ("Transmission destination setting has not been done yet!" and the like, for example) is made on the display portion 3101. The error notification is not limited to the display but may be made in sound. Alternatively, the notification may be made not by the PC terminal 3100 but by error notifying device, not shown, of the apparatus 3300 for producing RFID labels (lighting of an error lamp and the like, for example).

On the other hand, if the transmission destination information and the reader identification information are associated and stored in the storage portion 3310 and the determination at Step S3345 is satisfied, the determination is satisfied, and the routine goes to Step S3350.

At the subsequent Step S3350, on the basis of the transmission destination information and the reader identification information stored in the storage portion 3310, the transmission destination information corresponding to the reader 3200 from which the information is read out is extracted and read out, and the transmission destination is set (information sorting portion, selection processing portion).

At the subsequent Step S3355, the RFID tag information read out from the RFID circuit element To of the general tag T is transmitted to the transmission destination set at Step S3350 (the transmission destination of the reader 3200 of the subordinate a is the PC terminal 3100 of the boss A, and the transmission destination of the reader 3200 of the subordinate b is the PC terminal 3100 of the boss B in this example) (information sorting portion, selection processing portion). As a result, at the PC terminal 3100 of the transmission destination, the received information is processed as appropriate such as storage, display and the like. Then, this flow is finished.

If the information transmission destination of the reader 3200 is set once using the setting tag T by means of the above control, the setting is stored, and when the information is read out from the general tag T after that by the reader 3200 for which the setting has been made, the information is transmitted to the already set transmission destination without newly setting the information transmission destination. It is so configured here that each time the transmission destination information is newly gotten from the setting tag T, information is replaced by the new transmission destination information (setting is updated), but it may be so configured that once the information transmission destination is set once for the reader 3200, the transmission destination is not updated even if the setting tag T is read in the next time, for example.

Note that, the above flow does not limit this embodiment to the procedure shown in the flow, but the procedures may be changed within a scope not departing from the gist and technical idea.

FIG. 47 is a flowchart illustrating a detailed procedure of Step S3400.

In FIG. 47, first, at Step S3410, on the basis of the RFID tag information from the plurality of readers gotten and stored at the preceding Step S3315, it is determined if the RFID tag information is read out in duplication from the same RFID label T by the different readers 3200 or not. If the RFID tag information is not read out in duplication, the determination is not satisfied and the routine goes to Step S3430, which will be described later. On the other hand, if the RFID tag information is read out in duplication, the determination is satisfied, and the routine goes to the subsequent Step S3420.

At Step S3420, for the same RFID tag information read out by each reader 3200, the signal strength information gotten at the preceding Step S3315 is compared. Then, the reader 3200 with the larger strength is specified (information sorting portion, selection processing portion).

At the subsequent Step S3430, the RFID tag information read out from the RFID circuit element To of the general tag T is transmitted to the transmission destination corresponding to the reader specified at Step S3420 (information sorting portion, selection processing portion). As a result, at the PC terminal 3100 of the transmission destination, the received information is processed as appropriate such as storage, display and the like. Then, this routine is finished.

The above flow does not limit this embodiment to the procedure shown in the flow, but the procedures may be changed within a scope not departing from the gist and technical idea.

FIG. 48 is a diagram for explaining an example of information sorting executed by the above-described control.

In FIG. 48, the RFID labels T1, T2, T3 and T4 attached to appropriate file, material and the like are read out by the reader 3200 provided on the desk of the subordinate a. The signal strengths of the reply signals from the respective RFID labels are 10, 8, 9 and 2 (relative values when the signal strength of the RFID label T1 is set at 10). On the other hand, the RFID labels T4, T5, T6 attached to appropriate file, material and the like are read out by the reader 3200 provided on the desk of the subordinate b. The signal strengths of the reply signals from the respective RFID labels are 5, 8, and 7 (relative values when the signal strength of the RFID label T1 is set at 10). Here, the RFID label T4 is present in the above-mentioned duplicated region Z, and the information read-out is carried out in duplication by the readers 3200 of the both subordinates a, b.

At this time, by the information sorting processing shown in the above-mentioned FIG. 47, the signal strength of the RFID label T4 is compared, and the reader 3200 with the larger strength is specified. That is, the information of the RFID label T4 is considered to be read out by the reader 3200 of the subordinate b with the larger signal strength. As a result, the RFID tag information of the RFID labels T1, T2, T3 is transmitted to the PC terminal 3100 of the boss A, which is the transmission destination of the reader 3200 of the subordinate a, while the RFID tag information of the RFID labels T4, T5, T6 is transmitted to the PC terminal 3100 of the boss B, which is the transmission destination of the reader 3200 of the subordinate b.

In the above, the transmission destination information written in the RFID circuit element To of the RFID label T for setting corresponds to the sorting-destination information described in each claim.

In the RFID tag information reading system 3001 of the third embodiment described above, the RFID tag information (access acquisition information) is gotten from the RFID circuit element To for information read-out through the antenna 3210 of the reader 3200 arranged corresponding to the PC terminal 3100, and the gotten information is stored in the storage portion 3310 of the apparatus 3300 for producing RFID labels. Then, on the basis of the transmission destination information, by setting the transmission destination to the corresponding one in the plurality of the PC terminals 3100 in the apparatus 3300 for producing RFID labels, the information (access acquisition information) stored in the storage portion 3310 is output to the set PC terminal 3100.

As mentioned above, the plurality of PC terminals 3100 and the plurality of readers 3200 are connected to the apparatus 3300 for producing RFID labels through the hub 3030, and even if to which of the plurality of PC terminals 3100 the transmission destination of the information (access acquisition information) gotten from the RFID circuit element To for information read-out from the apparatus 3300 for producing RFID labels corresponds is not known, the corresponding PC terminal 3100 can be set as an output destination automatically without cumbersome manual setting by the user each time (in other words, the transmission path of the access acquisition information can be set). As a result, the operation burden on the user can be reduced, and the convenience can be improved.

Particularly, in the third embodiment, when the transmission destination of the RFID tag information read out from the RFID label T is to be set, if the information is read out through the plurality of readers 3200, the output destination is set according to the receiving signal strength at the time of acquisition. As a result, even if the RFID label T as read-out target is present in the above-mentioned duplicated region Z and the RFID tag information of the RFID label T is gotten through the plurality of readers 3200, which of the readers 3200 corresponds to the RFID tag information is specified (located at the closest distance and a spot suitable for communication and the like) according to the magnitude of the receiving signal strength, the PC terminal 3100 corresponding to the specified reader 3200 is considered as the terminal to be transmitted and can be set as the transmission destination. Therefore, misdelivery of the information can be prevented.

Note that, the third embodiment of the present invention is not limited to the above configuration but is capable of various variations within a scope not departing from the gist and technical idea thereof. The variations will be described below in order.

(3-1) When the information read-out is carried out by reader with plural types of transmission output:

In the third embodiment, by comparing the receiving signal strengths from the RFID labels T at the read-out of the RFID tag information by the reader 3200, the information is sorted to the transmission destination corresponding to the reader with the larger signal strength, but not limited to that. For example, it may be so configured that the information read-out is carried out by a reader with a plurality of types of transmission output, the reader is specified on the basis of the receiving result, and the information is sorted to the transmission destination corresponding to the reader.

FIG. 49 is a flowchart illustrating a control procedure executed by the control circuit 3202 of the reader 3200 in this variation and corresponds to the above-mentioned FIG. 45. In FIG. 49, the same reference numerals are given to the procedures similar to those in FIG. 45 and the description will be omitted. The following flow is executed independently in each of the readers 3200, but the flow may be executed every certain cycle at the same timing in the plurality of readers 3200, for example.

In FIG. 49, first at Step S3505, the "TX_PWR" signal is output to the transmission amplifier 3217 of the transmission portion 3212 in the above-mentioned radio frequency circuit 3201 so that a transmission output of an inquiry signal output to the RFID label T through the antenna 3210 is set at a large output value determined in advance.

The subsequent Step S3510 to Step S3530 are similar to those in the above-mentioned FIG. 45, and the inquiry signal is transmitted to the RFID circuit element To provided at the above-mentioned employee ID card, file, material and the like present in the communicable region with the transmission output set at Step S3505, and on the basis of the returned reply signal, the RFID tag information of the RFID label T that transmitted (returned) the reply signal is read out and gotten. The RFID tag information is temporarily stored in the storage portion 3203.

At the subsequent Step S3535, the "TX_PWR" signal is output to the transmission amplifier 3217 of the transmission portion 3212 in the above-mentioned radio frequency circuit 3201 so that a transmission output of the inquiry signal output to the RFID label T through the antenna 3210 is set at a small output value determined in advance.

The subsequent Step S3540 to Step S3547 are similar to Step S3510 to Step S3530, and the inquiry signal is transmitted to the RFID circuit element To provided at the above-mentioned employee ID card, file, material and the like present in the communicable region with the transmission output set at Step S3535, and on the basis of the returned reply signal, the RFID tag information of the RFID label T that transmitted (returned) the reply signal is readout and gotten. The RFID tag information is temporarily stored in the storage portion 3203.

At the subsequent Step S3550, the RFID tag information gotten and stored at Step S3530 and Step S3547 is transmitted to the apparatus 3300 for producing RFID labels through the interface control portion 3204 and the hub 3030. As a result, this flow is finished.

The above flow does not limit this embodiment to the procedure shown in the flow, but the procedures may be changed within a scope not departing from the gist and technical idea such as switching of Step S3505 to Step S3530 and Step S3535 to Step S3547 and the like.

FIG. 50 is a flowchart illustrating a control procedure executed by the control circuit 3311 of the apparatus 3300 for producing RFID labels when the RFID tag information is received from the reader 3200 in this variation and corresponds to the above-mentioned FIG. 46. In FIG. 50, the same reference numerals are given to the procedures similar to those in FIG. 46 and the description will be omitted.

In FIG. 50, first, at Step S3310, if a signal output from the reader 3200 is received, the determination is satisfied, and the routine goes to the subsequent Step S3315A, where on the basis of the received signal, the RFID tag information (including both cases of transmission output large/small) of the RFID label T read out by the reader 3200 is gotten. Also, the identification information (IP address and the like) that can specify the reader 3200 that transmitted the signal is gotten. The gotten information is temporarily stored in the storage portion 3310. At this time, if a signal is received from the plurality of readers 3200, the RFID tag information is gotten in association with each of the readers.

At the subsequent Step S3320, it is determined if the signal has been received from the plurality of readers 3200 at the same time at Step S3310 or not, and if the signal has been received from the plurality of readers 3200 at the same time, the determination is satisfied, and the routine goes to Step S3400A.

At Step S3400A, on the basis of the receiving results of the both cases in which the transmission output is set at large/small values in the plurality of readers 3200, the information sorting processing for specifying the information transmission destination (for details, See FIG. 51, which will be described later), and then, this flow is finished.

Since the procedure of Step S3325 to Step S3360 other than the above is similar to those in the above-mentioned FIG. 46, the description will be omitted.

The procedure of Step S3315A in the flow constitutes transmission/reception result input means that inputs the transmission/reception result of each output when the information transmission/reception is carried out with a plurality of types of transmission output to the RFID circuit element for information read-out from the plurality of readers for RFID tag information described in each claim.

Note that, the flow does not limit the variation to the procedure shown in the flow, but the procedure may be changed within a scope not departing from the gist and technical idea.

FIG. 51 is a flowchart illustrating a detailed procedure of Step S3400A and corresponds to the above-mentioned FIG. 47. In FIG. 51, the same reference numerals are given to the procedures similar to those in FIG. 47 and the description will be omitted.

In FIG. 51, first, at Step S3410A, on the basis of the RFID tag information received from the plurality of readers, it is determined if the RFID tag information is read out in duplication from the same RFID label T by the different readers 3200 or not. Here, the determination is made on the basis of the receiving result when the transmission output is set at a large value. If the RFID tag information is not read out in duplication, the determination is not satisfied and the routine goes to Step S3430, which will be described later. On the other hand, if the RFID tag information is read out in duplication, the determination is satisfied, and the routine goes to the subsequent Step S3420A.

At Step S3420A, for the RFID tag information read out in duplication, on the basis of the receiving results of the both cases in which the transmission output is set at large/small values in the plurality of readers 3200, the reader 3200 is specified (information sorting portion, selection processing portion). Specifically, the reader 3200 whose receiving results are not different between the case of the transmission output large and the case of the transmission output small is specified.

At the subsequent Step S3430, the RFID tag information read out from the RFID circuit element To of the general tag T is transmitted to the transmission destination corresponding to the reader specified at Step S3420 (information sorting portion, selection processing portion). As a result, at the PC terminal 3100 of the transmission destination, the received information is processed as appropriate such as storage, display and the like. Then, this routine is finished.

The flow does not limit the variation to the procedure shown in the flow, but the procedure may be changed within a scope not departing from the gist and technical idea.

FIG. 52 is a diagram for explaining an example of information sorting of this variation executed by the above-described control.

In FIG. 52, if the transmission output is large, the RFID labels T1, T2, T3 and T4 are read out by the reader 3200 provided on the desk of the subordinate a, while if the transmission output is small, the RFID labels T1, T2 and T3 are read out. On the other hand, by the reader 3200 provided on the desk of the subordinate b, the RFID labels T4, T5 and T6 are read out both if the transmission output is large and if the transmission output is small. Here, the RFID label T4 is present in the above-mentioned duplicated region Z, and the information read-out is carried out in duplication by the readers 3200 of the both subordinates a, b when the transmission output is large.

At this time, by the information sorting processing shown in the above-mentioned FIG. 51, on the basis of the both receiving results of the transmission output large/small in the readers 3200 corresponding to the subordinate a and the subordinate b, the reader 3200 whose receiving result is not different between the cases of the transmission output large and the transmission output small is specified. That is, the reader 3200 corresponding to the subordinate b whose receiving results are not different between the cases of the transmission output large and the transmission output small is specified here, and the information of the RFID label T4 is considered to be read out by the reader 3200 of the subordinate b. As a result, the RFID tag information of the RFID labels T1, T2 and T3 is transmitted to the PC terminal 3100 of the boss A, which is the transmission destination of the reader 3200 of the subordinate a, while the RFID tag information of the RFID labels T4, T5 and T6 is transmitted to the PC terminal 3100 of the boss B, which is the transmission destination of the reader 3200 of the subordinate b.

In the above-described variation, too, the effect similar to that in the third embodiment can be obtained.

In the above, the case in which the information is read out with two types of transmission outputs, which are large and small, is described as an example, but not limited to that, the information may be read out with the larger number of types of transmission outputs. As a result, the reader can be specified more finely.

(3-2) When the reader has the information transmission destination setting mode and the general mode:

In the third embodiment, the reader 3200 reads out information from all the types of RFID labels T (setting tag T and the general tag T, for example) and transmits it to the apparatus 3300 for producing RFID labels while the reader is in operation, but not limited to that, a mode in which only a specific type of tag is read out may be provided.

FIG. 53 is a flowchart illustrating a control procedure executed by the control circuit 3202 of the reader 3200 in this variation and corresponds to the above-mentioned FIG. 45 and the like. In FIG. 53, the same reference numerals are given to the procedures similar to those in FIG. 45 and the like and the description will be omitted. The control circuit 3202 starts this flow when the reader 3200 is powered on.

First, at Step S3501, an operation mode of the reader 3200 is set to a "setting mode" in which the transmission destination information is gotten from the setting tag T and transmitted to the apparatus 3300 for producing RFID labels.

At the subsequent Step S3600, setting mode processing in which the transmission destination information is gotten from the setting tag T and transmitted to the apparatus 3300 for producing RFID labels is carried out (for details, see FIG. 54, which will be described later).

At the subsequent Step S3503, it is determined if the setting mode processing has been completed or not. For example, if the setting mode processing is not completed such that the RFID tag information can not be read out favorably from the setting tag T due to communication failure and the like, for example, the determination is not satisfied, the routine returns to Step S3600, and the setting mode processing is carried out again. On the other hand, if the setting mode processing has been completed, the determination is satisfied and the routine goes to the subsequent Step S3507.

At Step S3507, the operation mode of the reader 3200 is set to a "usual mode" in which the RFID tag information is gotten from the general tag T and transmitted to the apparatus 3300 for producing RFID labels.

The subsequent Step S3510 to Step S3530 are similar to those in the above-mentioned FIG. 45, and the inquiry signal is transmitted to the RFID circuit element To provided at the above-mentioned employee ID card, file, material and the like present in the communicable region, and on the basis of the returned reply signal, the RFID tag information of the RFID label T that transmitted (returned) the reply signal is read out and gotten. The RFID tag information is temporarily stored in the storage portion 3203.

At the subsequent Step S3535, on the basis of the RFID tag information gotten at Step S3530, it is determined if the RFID label T from which the information is read out is the general tag or not. This determination is made by determining if the above-mentioned setting tag flag is included in the gotten RFID tag information or not. If the setting tag flag is included, the tag is considered as the setting tag and the routine goes to Step S3537, where a control signal is output to the PC terminal 3100 (of all the units, for example) through the hub 3030 and an error display ("Transmission destination setting has been already done!" and the like, for example) is made on the display portion 3101. Incidentally, the error notification is not limited to the display but may be made in sound. Alternatively, the notification may be made not by the PC terminal 3100 but by error notifying device, not shown, of the reader 3200. Then, the routine returns to the preceding Step S3510. On the other hand, if the setting tag flag is not included at Step S3535, the tag is considered to be the general tag, and the routine goes to the subsequent Step S3540.

Step S3540 and Step S3550 are similar to those in the above-mentioned FIG. 45, and the signal "RSSI" indicating the strength of the received reply signal is input from the RSSI circuit 3226, and the RFID tag information gotten and stored at Step S3530 is transmitted to the apparatus 3300 for producing RFID labels together with the signal strength information input at Step S3540 through the interface control portion 3204 and the hub 3030.

At the subsequent Step S3560, it is determined if the power of the reader 3200 has been turned OFF or not. If the power is not turned OFF, the routine goes to the preceding Step S3510, where the inquiry signal is transmitted to the RFID circuit element To present in the communicable region again. On the other hand, if the power is turned OFF, this flow is finished.

The flow does not limit the variation to the procedure shown in the flow, but the procedure may be changed within a scope not departing from the gist and technical idea.

FIG. 54 is a flowchart illustrating a detailed procedure of Step S3600.

In FIG. 54, first, at Step S3610, an inquiry signal that reads out the information stored in the IC circuit part 151 of the RFID circuit element To of the RFID label T, respectively, is generated and transmitted to the RFID circuit element To provided at the RFID label T present in the communicable region through the radio frequency circuit 3201 and the antenna 3210, and a reply is prompted.

After that, the routine goes to Step S3620, and it is determined if the reply signal transmitted (returned) from the RFID circuit element To of the RFID label T has been received through the antenna 3210 and the radio frequency circuit 3201 in response to the inquiry signal or not. If the reply signal has not been received from the RFID label T, the determination is not satisfied, and the routine returns to Step S3610, where the transmission of the inquiry signal is repeated again. On the other hand, if the reply signal has been received from the RFID label T, the determination is satisfied, and the routine goes to the subsequent Step S3630.

At Step S3630, on the basis of the received reply signal, the RFID tag information of the RFID label T that transmitted (returned) the reply signal is read out and gotten. The RFID tag information includes the transmission destination information indicating the transmission destination of the RFID tag information read out through the antenna 3210 of the reader 3200 and the setting tag flag indicating that the RFID label T is for setting the information transmission destination of the reader 3200 as mentioned above. The gotten RFID tag information is temporarily stored in the storage portion 3203.

At the subsequent Step S3635, on the basis of the RFID tag information gotten at Step S3630, it is determined if the RFID label T from which the information is read out is the setting tag or not. This determination is made by determining if the setting tag flag is included in the gotten RFID tag information or not. If the setting tag flag is not included, the tag is considered as the general tag and the routine goes to Step S3637, a control signal is output to the PC terminal 3100 (of all the units, for example) through the hub 3030, and an error display ("Set the transmission destination!" and the like, for example) is made on the display portion 3101. The error notification is not limited to the display but may be made in sound. Alternatively, the notification may be made not by the PC terminal 3100 but by error notifying device, not shown, of the reader 3200. Then, the routine returns to the preceding Step S3610. On the other hand, if the setting tag flag is included at Step S3635, the tag is considered to be the setting tag, and the routine goes to the subsequent Step S3640.

At the subsequent Step S3640, the RFID tag information gotten and stored at Step S3630 is transmitted to the apparatus 3300 for producing RFID labels through the interface control portion 3204 and the hub 3030. Then, the routine is finished.

The flow does not limit the variation to the procedure shown in the flow, but the procedure may be changed within a scope not departing from the gist and technical idea.

In the above-described variation, the information read-out is carried out from the setting tag T as the setting mode is automatically set immediately after the power is turned on, and on the basis of the read-out transmission destination information, the transmission destination can be automatically set in the apparatus 3300 for producing RFID labels. When the setting is finished, the information read-out can be automatically carried out from the general tag T in the usual mode. As a result, if the information is to be transmitted to a new transmission destination, wrong transmission of the information to an old transmission destination set before the power is turned on can be prevented. Particularly, this is effective if the user uses a handheld-type portable reader, since the information transmission destination is often changed due to a change of a place of use, and also since a frequency of power ON/OFF is high.

Incidentally, in the above, the case in which the two types of modes of the setting mode and the general mode are set is described as an example, but it may be configured such that more types of modes can be set.

(3-3) When used for attendance management of a plurality of employees:

In the above, the case in which the attendance management information of one employee is transmitted to his/her boss is described as an example, but not limited to that, the present invention may be applied to the attendance management system in which plural pieces of employee attendance management information is transmitted to their boss using a reader having a much wider communication range.

FIG. 55 is a system configuration diagram illustrating an entire configuration of the RFID tag information reading system 3001 in this case. Here, the attendance management information of subordinates a1 to a4 read out by the reader 3200 having a communication region X is transmitted to the PC terminal 3100 of the boss A, while the attendance management information of subordinates b1 to b4 read out by the reader 3200 having a communication region Y is transmitted to the PC terminal 3100 of the boss B. The RFID tag information read out in duplication by the both readers 3200 in the duplicated region Z is sorted appropriately by the above-mentioned control and transmitted to the PC terminal 3100 of the boss A or the boss B.

Also, not limited to the attendance management of employees in a company, the present invention can be applied to various scenes such as merchandise management in a shop, inventory management in a warehouse and the like, for example.

(3-4) Others:

In the above, the case in which a patch antenna is used as the antenna 3210 of the reader 3200 is described as an example, but not limited to that, a dipole antenna may be used, for example. Also, the case in which information transmission/reception is carried out by radio communication using the UHF band between the reader 3200 and the RFID circuit element To is described as an example, but not limited to that, the information transmission/reception may be carried out by magnetic induction (including electromagnetic induction, magnetic coupling and other non-contact methods through an electromagnetic field) using a coil-shaped loop antenna as the antenna 3210 on the side of the reader 3200 and the antenna 152 on the side of the RFID circuit element To similarly to the first and second embodiments, for example.

In the above, the case in which the RFID tag information reading/writing and printing are applied to the tag tape 3303 during movement in the apparatus 3300 for producing RFID labels is illustrated as an example, but not limited to that, the printing or reading/writing may be carried out by stopping the tag tape 3303 at a predetermined position (and for the reading/writing, the tape may be held by a predetermined feeding guide).

Also, in the above, the method of applying the print on the tag tape 3303 (not affixing type) is employed, but not limited to that, the present invention may be applied to a method in which the print is applied on a cover film separate from the tag tape 3303 provided with the RFID circuit element To and they are affixed to each other similarly to the first and second embodiments.

Other than those mentioned above, methods of the embodiments and each variation may be combined as appropriate for use.

Though not specifically exemplified, the present invention should be put into practice with various changes made within a scope not departing from its gist.

What is claimed is:

1. A RFID tag information system comprising:
    a transmission/reception antenna configured to carry out information transmission/reception via radio communication with a RFID circuit element provided with an IC circuit part storing information and a tag antenna that carries out information transmission/reception;
    an access information processing device configured to carry out predetermined processing relating to information for access that accesses said RFID circuit element or access acquisition information gotten by an access to said RFID circuit element; and a selection processing portion for select and process one transmission path among a plurality of transmission paths that transmit said information for access from said access information processing device or that transmit said access acquisition information to said access information processing device.

2. The RFID tag information system according to claim 1, further comprising:

an apparatus main body for producing RFID labels; and an antenna unit that can be connected to said apparatus main body for producing RFID labels, wherein, said antenna unit has a unit antenna as said transmission/reception antenna configured to carry out information transmission/reception with a first RFID circuit element via first radio communication;

said apparatus main body for producing RFID labels has:

a housing provided with a connection portion configured to connect said antenna unit;

a feeding device provided in said housing and configured to feed a tag medium in which a second RFID circuit element is arranged;

an apparatus antenna provided in said housing and configured to carry out information transmission/reception with said second RFID circuit element via second radio communication as said transmission/reception antenna;

an information creating device as said access information processing device configured to create said information for access to make an access to said first RFID circuit element or said second RFID circuit element; and a mode switching portion as said selection processing portion configured to selectively switch between a first mode in which information transmission/reception processing with said first RFID circuit element via said first radio communication is carried out by transmitting said information for access created by said information creating device to said unit antenna or a second mode in which tag label production processing is carried out by transmitting said information for access created by said information creating device to said apparatus antenna and carrying out information transmission/reception with said second RFID circuit element provided at said tag medium via said second radio communication.

3. The RFID tag information system according to claim 2, wherein:

said mode switching portion of said apparatus main body for producing RFID labels gives priority to said second mode over said first mode and switches to said first mode when said tag label production processing is not carried out.

4. The RFID tag information system according to claim 2, wherein:

said antenna unit includes a magnetic body on one side of said unit antenna.

5. The RFID tag information system according to claim 4, wherein:

said antenna unit includes a metal body on said one side of said magnetic body.

6. The RFID tag information system according to claim 2, wherein:

said antenna units are provided in plural numbers;

said connection portion of said apparatus main body for producing RFID labels is configured so that the plurality of said antenna units can be connected thereto; and a switching conducting device for selectively conducting any one of the plurality of antenna units connected to the connection portions to said information creating device is provided.

7. The RFID tag information system according to claim 6, wherein:

said information creating device of said apparatus main body for producing RFID labels outputs the corresponding information for access to each of said antenna units for each predetermined occupied period made by time division when information transmission/reception is carried out with said first RFID circuit element via said first radio communication using the plurality of antenna units at the same time.

8. The RFID tag information system according to claim 6, wherein:

said apparatus main body for producing RFID labels includes a matching circuit configured to match an impedance on the side of said information creating device to an impedance of each unit antenna corresponding to each of said plurality of antenna units provided with said unit antennas of different types from each other.

9. The RFID tag information system according to claim 8, wherein:

said apparatus main body for producing RFID labels includes signal output portion configured to output a matching signal corresponding to a value of a terminal voltage or a terminal current of a direct current resistor portion disposed in parallel connection with said unit antenna in said antenna unit; and said matching circuit matches impedance according to said matching signal from said signal output portion.

10. The RFID tag information system according to claim 1, further comprising:

an apparatus main body for producing RFID labels; and at least one antenna unit that can be connected to said apparatus main body for producing RFID labels, wherein, said antenna unit has a unit antenna as said transmission/reception antenna configured to carry out information transmission/reception with a first RFID circuit element via first radio communication;

said apparatus main body for producing RFID labels has:

a housing provided with a connection portion configured to connect said antenna unit;

a feeding device provided in said housing and configured to feed a tag medium in which a second RFID circuit element is arranged;

an apparatus antenna provided in said housing and configured to carry out information transmission/reception with said second RFID circuit element via second radio communication as said transmission/reception antenna;

an information creating device as said access information processing device configured to create said information for access to make an access to said first RFID circuit element or said second RFID circuit element; and a coordination control portion configured to control said feeding device and said information creating device in coordination according to a label production instruction signal and transmit access information created by said information creating device to said second RFID circuit element through said apparatus antenna so as to produce a RFID label, wherein:

said coordination control portion includes a selection connecting portion as said selection processing portion configured to selectively connect said unit antenna or said apparatus antenna to said information creating device according to the processing status during production processing of said RFID label.

11. The RFID tag information system according to claim 10 wherein:
said selection connecting portion selectively connects said unit antenna or said apparatus antenna to said information creating device so that an occupied rate of an execution period of said second radio communication becomes larger than an occupied rate of an execution period of said first radio communication during production processing of said RFID label.

12. The RFID tag information system according to claim 11, wherein:
said selection connecting portion selectively connects said unit antenna or said apparatus antenna to said information creating device so that said first radio communication is not executed during the execution period of said second radio communication during production processing of said RFID label.

13. The RFID tag information system according to claim 11, wherein:
said selection connecting portion selectively connects said unit antenna or said apparatus antenna to said information creating device so that said first radio communication is executed with a lower frequency than that of said second radio communication during the execution period of said second radio communication during production processing of said RFID label.

14. The RFID tag information system according to claim 11, further comprising a printing device configured to make a desired print on said tag medium or a print-receiving medium to be bonded to the tag medium, wherein:
said coordination control portion controls said printing device, said feeding device, and said information creating device in coordination so as to produce said RFID label with print; and
said selection connecting portion selectively connects said unit antenna or said apparatus antenna to said information creating device so that said second radio communication is not executed but said first radio communication is executed during the execution period of the print by said printing device during the production processing of said RFID label.

15. The RFID tag information system according to claim 10, further comprising a lighting display device that is lighted during information transmission/reception with said first RFID circuit element via said first radio communication.

16. The RFID tag information system according to claim 10, further comprising a notifying device configured to make notification to an operator when information transmission/reception with said first RFID circuit element via said first radio communication is completed.

17. The RFID tag information system according to claim 10, further comprising a storage device configured to temporarily store information gotten from said first RFID circuit element by said unit antenna via said first radio communication.

18. The RFID tag information system according to claim 17, wherein:
said coordination control portion has first transmission control portion configured to transmit the information stored in said storage device according to a transmission instruction signal from an operation terminal provided outside the apparatus to said operation terminal.

19. The RFID tag information system according to claim 17, wherein:
said coordination control portion has second transmission control portion configured to automatically transmit the information stored in said storage device to an operation terminal provided outside the apparatus at predetermined timing.

20. The RFID tag information system according to claim 1, further comprising:
a management server for RFID tag information;
a plurality of readers for RFID tag information;
a plurality of operation terminals provided corresponding to said plurality of readers for RFID tag information; and
a delivery connection device configured to connect said management server for RFID tag information, said plurality of readers for RFID tag information, and said plurality of operation terminals through a network, capable of delivery to a signal output destination, wherein:
said reader for RFID tag information includes said antenna for reading as said transmission/reception antenna that carries out radio communication with said RFID circuit element; and
said management server for RFID tag information has:
a read-out information storage device as said access information processing device configured to store said access acquisition information gotten from said RFID circuit element for information reading through said reader for RFID tag information connected by said delivery connection device; and
an information sorting portion as said selection processing portion configured to sort and output said access acquisition information stored in said read-out information storage device or information corresponding to the access acquisition information to the corresponding operation terminal among said plurality of operation terminals connected by said delivery connection device on the basis of sorting-destination information.

21. The RFID tag information system according to claim 20, wherein:
said management server for RFID tag information has a sorting-destination information acquisition portion configured to get sorting-destination information from said RFID circuit element for information sorting-destination setting through said reader for RFID tag information; and
said information sorting portion sorts and outputs said access acquisition information stored in said read-out information storage device or the information corresponding to the access acquisition information to said corresponding operation terminal on the basis of the sorting-destination information gotten by said sorting-destination information acquisition portion.

22. The RFID tag information system according to claim 21, wherein:
said sorting-destination information acquisition portion of said management server for RFID tag information gets, from said RFID circuit element for information sorting-destination setting, said sorting-destination information that associates the information gotten through one of said readers for RFID tag information with one of said operation terminals corresponding to the one reader for RFID tag information; and
said information sorting portion sets said output destination so as to output said access acquisition information stored in said read-out information storage device or the information corresponding to the access acquisition information to said one operation terminal corresponding to said one reader for RFID tag information on the basis of the gotten sorting-destination information.

23. The RFID tag information system according to claim 22, wherein:
said information sorting portion of said management server for RFID tag information sets, when said output destination is to be set on the basis of said sorting-destination information that associates said one reader for RFID tag information with said one operation terminal, the output destination according to receiving signal strength at acquisition if the information to be output has been gotten from said RFID circuit element for information reading through the plurality of said readers for RFID tag information.

24. The RFID tag information system according to claim 22, wherein:
said plurality of readers for RFID tag information carries out information transmission/reception to said RFID circuit element for information reading with a plurality of types of transmission outputs and outputs a transmission/reception result for each output to said management server for RFID tag information; and
said information sorting portion of said management server for RFID tag information sets, when said output destination is to be set on the basis of said sorting-destination information that associates said one reader for RFID tag information with said one operation terminal, the output destination according to a transmission/reception result for said each output input from said reader for RFID tag information if the information to be output has been gotten from said RFID circuit element for information reading through the plurality of said readers for RFID tag information.

* * * * *